(12) United States Patent
Tatsuzawa et al.

(10) Patent No.: US 10,920,300 B2
(45) Date of Patent: Feb. 16, 2021

(54) TITANIUM COMPOSITE MATERIAL AND TITANIUM MATERIAL FOR HOT ROLLING

(71) Applicant: NIPPON STEEL & SUMITOMO METAL CORPORATION, Tokyo (JP)

(72) Inventors: Yoshitsugu Tatsuzawa, Tokyo (JP); Tomonori Kunieda, Tokyo (JP); Koji Mitsuda, Tokyo (JP); Kenichi Mori, Tokyo (JP); Kazuhiro Takahashi, Tokyo (JP); Hideki Fujii, Tokyo (JP); Tomoyuki Kitaura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 377 days.

(21) Appl. No.: 15/747,453

(22) PCT Filed: Jul. 29, 2016

(86) PCT No.: PCT/JP2016/072330
§ 371 (c)(1),
(2) Date: Jan. 25, 2018

(87) PCT Pub. No.: WO2017/018508
PCT Pub. Date: Feb. 2, 2017

(65) Prior Publication Data
US 2018/0216211 A1    Aug. 2, 2018

(30) Foreign Application Priority Data

Jul. 29, 2015    (JP) .............................. JP2015-149389

(51) Int. Cl.
*B32B 15/01*    (2006.01)
*C22C 14/00*    (2006.01)
(Continued)

(52) U.S. Cl.
CPC ................ *C22C 14/00* (2013.01); *B21B 1/02* (2013.01); *B21B 3/00* (2013.01); *B32B 15/01* (2013.01);
(Continued)

(58) Field of Classification Search
None
See application file for complete search history.

(56) References Cited

U.S. PATENT DOCUMENTS 4,725,509 A * 2/1988 Ryan .................. B23K 35/0238
428/607
5,579,988 A    12/1996 Schutz et al.
(Continued)

FOREIGN PATENT DOCUMENTS

CN    101011706    8/2007
CN    201250198    6/2009
(Continued)

OTHER PUBLICATIONS

"Chitan No Kakou Gijyutsu" ("Fabrication Technique of Titanium"), (SHA) Nihon Chitan Kyoukai Hen (Japan Titanium Society), Nikkan Kougyou Shinbunsha, p. 214-230, Nov. 1992.

*Primary Examiner* — Seth Dumbris
(74) *Attorney, Agent, or Firm* — Clark & Brody LP

(57) ABSTRACT

A titanium composite material 1 is provided that includes: an inner layer 5 consisting of a commercially pure titanium or a titanium alloy; an outer layer 3 formed on at least one surface of the inner layer 5 and having a chemical composition that is different from a chemical composition of the inner layer 5; and an intermediate layer formed between the inner layer 5 and the outer layer 3 and having a chemical composition that is different from the chemical composition of the inner layer 5. The thickness of the outer layer 3 is 2 μm or more, and occupies no more than 40% of the overall thickness per side. The thickness of the intermediate layer is
(Continued)

0.5 μm or more. Despite being inexpensive, this titanium composite material has desired characteristics.

10 Claims, 5 Drawing Sheets

(51) Int. Cl.
*B21B 1/02* (2006.01)
*B21B 3/00* (2006.01)
*C22F 1/18* (2006.01)
*B23K 15/00* (2006.01)
*B23K 20/04* (2006.01)
*C22F 1/00* (2006.01)

(52) U.S. Cl.
CPC .............. *C22F 1/183* (2013.01); *B21B 3/003* (2013.01); *B23K 15/00* (2013.01); *B23K 20/04* (2013.01); *C22F 1/00* (2013.01); *C22F 1/18* (2013.01); *Y10T 428/12806* (2015.01)

(56) References Cited

U.S. PATENT DOCUMENTS

| | | | |
|---|---|---|---|
| 5,972,521 | A | 10/1999 | Huskamp et al. |
| 6,857,558 | B2 * | 2/2005 | Ferry, III .............. B23K 20/023 228/190 |
| 2011/0315278 | A1 * | 12/2011 | Yashiki .................. C22F 1/183 148/421 |
| 2014/0161660 | A1 * | 6/2014 | Kaminaka ............... C22C 14/00 420/417 |
| 2014/0348697 | A1 | 11/2014 | Fujii et al. |
| 2015/0240332 | A1 * | 8/2015 | Kaminaka ............... C22C 14/00 420/421 |

FOREIGN PATENT DOCUMENTS

| | | |
|---|---|---|
| CN | 101757689 | 6/2010 |
| CN | 101528956 | 8/2011 |
| CN | 102303977 | 1/2012 |
| CN | 103173716 | 6/2013 |
| JP | 50-146557 | 11/1975 |
| JP | 51-019819 | 6/1976 |
| JP | 58-006704 | 1/1983 |
| JP | 62-124265 | 6/1987 |
| JP | 62-270277 | 11/1987 |
| JP | 63-080904 | 4/1988 |
| JP | 63-207401 | 8/1988 |
| JP | 01-168833 | 7/1989 |
| JP | 02-187282 | 7/1990 |
| JP | 03-197630 | 8/1991 |
| JP | 05-142392 | 6/1993 |
| JP | 08-141754 | 6/1996 |
| JP | 09-136102 | 5/1997 |
| JP | 11-057810 | 3/1999 |
| JP | 11-170076 | 6/1999 |
| JP | 11-179566 | 7/1999 |
| JP | 2001-038413 | 2/2001 |
| JP | 2001-089821 | 4/2001 |
| JP | 2001-131609 | 5/2001 |
| JP | 2001-234266 | 8/2001 |
| JP | 2002-311190 | 10/2002 |
| JP | 2004-056090 | 2/2004 |
| JP | 2005-290548 | 10/2005 |
| JP | 2006-095589 | 4/2006 |
| JP | 2008-195994 | 8/2008 |
| JP | 2009-068026 | 4/2009 |
| JP | 2011-042828 | 3/2011 |
| JP | 2012-077346 | 4/2012 |
| JP | 2013-076110 | 4/2013 |
| JP | 2013-142183 | 7/2013 |
| JP | 2013-163840 | 8/2013 |
| JP | 2014-019945 | 2/2014 |
| JP | 2014-233753 | 12/2014 |
| JP | 2015-045040 | 3/2015 |
| RU | 2555259 | 7/2015 |
| WO | 2014/163086 | 10/2014 |
| WO | 2014/163087 | 10/2014 |
| WO | 2014/163089 | 10/2014 |

* cited by examiner

TITANIUM COMPOSITE MATERIAL AND TITANIUM MATERIAL FOR HOT ROLLING

TECHNICAL FIELD

The present invention relates to a titanium composite material and a titanium material for hot rolling.

BACKGROUND ART

A titanium material is excellent in properties such as corrosion resistance, oxidation resistance, fatigue resistance, hydrogen embrittlement resistance, and neutron shielding properties. These properties can be attained by adding various alloying elements to titanium.

Because a titanium material is light weight and excellent in corrosion resistance, for example, a titanium material is utilized for seawater-cooled condensers at power generating plants, heat exchangers for ocean water desalinization plants, reaction vessels of chemical plants and also for coolers and the like.

Commercially pure titanium exhibits excellent corrosion resistance particularly in environments including nitrate or chromate or the like, and environments including seawater or chloride ions and the like. However, in environments including hydrochloric acid, sulfuric acid or the like, a high corrosion resistance cannot be expected, and in environments including chlorine ions or the like, crevice corrosion sometimes occurs.

Therefore, various kinds of alloys, such as Ti-0.2Pd (ASTM Grade 7, 11), are being developed in which trace amounts of platinum group elements (Ru, Rh, Pd, Os, Ir, Pt and the like) are added to titanium. Further, corrosion resistant titanium alloys that are inexpensive and excellent in corrosion resistance, such as Ti-0.5Ni-0.05Ru in which Ni and Ru are substituted for Pd, are also being developed.

A titanium material is excellent in specific strength and corrosion resistance, and hence utilization of titanium material in the field of aircraft construction is progressing, and titanium material is also being widely used for exhaust systems of automobiles and two-wheeled vehicles. In particular, from the viewpoint of reducing the weight of vehicles, a commercially pure titanium material of JIS Class 2 is being used instead of the conventional stainless steel material for vehicle production centering on two-wheeled vehicles. In addition, in recent years, a heat-resistant titanium alloy having a higher heat resistance is being used in place of commercially pure titanium material of JIS Class 2. Furthermore, titanium material is also being used for mufflers in which a catalyst that is used at a high temperature is mounted for the purpose of removing harmful components in exhaust gas.

The temperature of exhaust gas exceeds 700° C., and in some cases the temperature temporarily reaches 800° C. Consequently, material to be used for an exhaust system is required to have strength, oxidation resistance and the like at a temperature of around 800° C., and furthermore, importance is placed on the index of high-temperature heat resistance with respect to the creep rate at 600 to 700° C.

On the other hand, to improve the high temperature strength of such heat-resistant titanium alloys, it is necessary to add elements that improve high temperature strength and oxidation resistance such as Al, Cu and Nb, and the cost of the heat-resistant titanium alloys is high in comparison to commercially pure titanium.

JP2001-234266A (Patent Document 1) discloses a titanium alloy that is excellent in cold workability and high temperature strength, and that contains Al: 0.5 to 2.3% (in the present description, unless otherwise specified, "%" with respect to chemical composition means "mass percent").

JP2001-89821A (Patent Document 2) discloses a titanium alloy that is excellent in oxidation resistance and corrosion resistance, and that contains Fe: more than 1% to 5% and O (oxygen): 0.05 to 0.75%, and also contains Si: $0.001 \cdot e^{0.5[Fe]}$ to $5 \cdot e^{-0.5[Fe]}$ ([Fe] represents content (mass %) in the alloy, and "e" represents base of natural logarithm).

JP22005-290548A (Patent Document 3) discloses a heat-resistant titanium alloy sheet that is excellent in cold workability and that contains Al: 0.30 to 1.50% and Si: 0.10 to 1.0%, and a method for producing the heat-resistant titanium alloy sheet.

JP2009-68026A (Patent Document 4) discloses a titanium alloy that contains Cu: 0.5 to 1.8%, Si: 0.1 to 0.6%, and O: 0.1% or less, and as necessary contains Nb: 0.1 to 1.0%, with the balance being Ti and unavoidable impurities, and having a protective film coated on the surface thereof.

In addition, JP2013-142183A (Patent Document 5) discloses a titanium alloy that is excellent in high temperature strength at 700° C. and in oxidation resistance at 800° C. that contains Si: 0.1 to 0.6%, Fe: 0.04 to 0.2% and O: 0.02 to 0.15% and in which the total content of Fe and O is 0.1 to 0.3%, with the balance being Ti and unavoidable impurity elements.

A commercially titanium cold-rolled sheet or plate (for example, a commercially pure titanium cold-rolled sheet or plate) is used, for example, by forming a sheet or plate (hereinafter referred to as "sheet") into a predetermined shape such as in the case of a sheet-type heat exchanger or an FC separator, and the uses thereof are expanding. Consequently, in addition to formability, thinning that is achieved by an improvement in fatigue strength, as well as a high loading environment (under a high load) are also required for titanium cold-rolled sheets for industrial use.

On the other hand, similarly to other metallic materials, in the case of pure titanium, there is a contrary relation between ductility, which governs formability, and strength (fatigue strength).

JP2008-195994A (Patent Document 6) discloses a method that performs surface modification of a product made of titanium to improve fatigue strength by performing a plasma nitriding process that performs plasma nitriding which takes a product made of any of pure titanium, an α-type titanium alloy, a β-type titanium alloy and an α+β-type titanium alloy as a treatment object to form a hardened layer on the surface of the treatment object, and then removes a compound layer that is present on the surface of the hardened layer by performing a fine particle bombardment treatment in which the treatment object is subjected to bombardment with one or more kinds of fine particles after the plasma nitriding process.

JP2013-76110A (Patent Document 7) discloses a surface treatment method for treating a surface of a substrate consisting of a titanium alloy and titanium, the method including a step A of subjecting the surface of a substrate made of titanium alloy and titanium to a fine particle peening process, a step B of performing a first heat treatment in a temperature range T1, a step C of performing a second heat treatment in a temperature range T2, and a step D of performing a third heat treatment in a temperature range T3 which are performed in the order mentioned, which satisfies the relation T1>T2>T3, and in which T1 is made a temperature from 900 to 1000° C. That is, this surface treatment method improves fatigue strength by forming, in a region in the vicinity of the surface of a titanium material, an amorphous layer, a fine grain layer (α phase; grain size: approximately 300 nm), a sub-micron grain layer (α phase; grain size: approximately 500 nm), and a micron grain layer (β phase; grain size: approximately 3000 inn) in the order from the surface side.

A commercially pure titanium contains the α phase of an hcp (hexagonal close-packed) structure as a main constituent, and it is known that if a large amount of hydrogen is absorbed in the α phase, hydrides will be formed and the commercially pure titanium will become brittle. Therefore, depending on the usage environment, in some cases accidents occur in which commercially pure titanium absorbs hydrogen and becomes brittle and ruptures. In "CHITAN NO KAKOU GIJYUTSU" (Non-Patent Document 1), for example, accidents caused by absorption of hydrogen at a plant handling a nonoxidizing acid or in a urea-ammonia environment and a hydrogen gas environment are reported. Therefore, a titanium alloy material that is excellent in hydrogen embrittlement resistance is proposed.

JP2013-163840A (Patent Document 8) discloses a titanium alloy that exhibits large breaking elongation and that contains 50% or more by volume of β phase and contains 500 to 6000 ppm of hydrogen, and an example is described in which embrittlement does not occur even when a large amount of hydrogen is contained.

A neutron shielding sheet that is capable of shielding from thermal neutrons is used at facilities that handle radioactive waste such as facilities related to nuclear power generation. A neutron shielding effect is highest in boron 10 ($^{10}$B) whose abundance is 19.9% in natural B. Stainless steel or the like containing B is generally used as material for a neutron shielding sheet.

JP58-6704B (Patent Document 9) discloses a neutron shielding material that contains 5% by mass or more of B, which is a cured compact formed by kneading and molding a borate aggregate containing crystal water such as kurnakovite ($2MgO.3B_2O_2.13H_2O$), Meyerhof-ferite ($3CaO.3B_2O_2.7H_2O$), or colemanite ($2CaO.3B_2O_2.5H_2O$), hemihydrate gypsum, and an inorganic adhesive agent such as a calcium aluminate-based cement with water. Patent Document 9 discloses, however, the neutron shielding material including cement, there are problems in terms of corrosion resistance, producibility and also workability.

The use of a boron-containing titanium alloy that is superior in corrosion resistance to stainless steel as a neutron shielding material is also being studied. For example, JP1-168833B (Patent Document 10) discloses the use of a heat-rolled sheet made of a boron-containing titanium alloy which contains 0.1 to 10% by mass of B with the balance being titanium and unavoidable impurities.

In addition, JPS-142392A (Patent Document 11) discloses a radiation shielding material in which a fluid of a boron-containing substance ($NaB_4O_7$, $B_2O_3$ or PbO, $Fe_2O_3$ or the like) and metallic oxides that are mixed therein are filled inside a hollow metal casing and made into a solidified state. According to Patent Document 11, neutrons are blocked by mainly boron and hydrogen, and gamma rays are blocked by the casing, the metal and the like therein.

A titanium material is normally produced by the following method. First, using the Kroll process, titanium oxide as the raw material is chlorinated to form titanium tetrachloride, and thereafter is reduced using magnesium or sodium to produce sponge-like titanium metal (titanium sponge) in a lump-like shape. The titanium sponge is subjected to press-forming to form a consumable titanium electrode, and a titanium ingot is produced by vacuum arc remelting that adopts the consumable titanium electrode as an electrode. At such time, alloying elements are added as required to produce a titanium alloy ingot. Thereafter, the titanium alloy ingot is bloomed, forged and rolled to form a titanium slab, and the titanium slab is further subjected to hot rolling, annealing, pickling, cold rolling, and a vacuum heat treatment to produce a titanium sheet.

Further, as a method for producing a titanium sheet, a method is also known in which a titanium ingot is subjected to blooming, hydrogenation-crushing, dehydrogenation, pulverization and classifying to produce a titanium powder, and thereafter the titanium powder is subjected to powder rolling, sintering and cold rolling to produce a titanium sheet.

JP2011-42828A (Patent Document 12) discloses a method for producing a titanium sheet, in which a titanium powder is produced directly from titanium sponge and not a titanium ingot, and in order to produce a titanium sheet from the obtained titanium powder, a pre-sintering compact in which a viscous composition containing a titanium metal powder, a binding agent, a plasticizer and a solvent is formed in a sheet shape is sintered to produce a sintered sheet, the sintered sheet is consolidated to produce a sintered and consolidated sheet, and the sintered and consolidated sheet is then re-sintered, in which the breaking elongation of the sintered sheet is 0.4% or more, the density ratio of the sintered sheet is 80% or more, and the density ratio of the sintered and consolidated sheet is 90% or more.

JP2014-19945A (Patent Document 13) discloses a method for producing a titanium alloy that is excellent in quality by a powder method, in which a suitable amount of iron powder, chromium powder or copper powder is added to a titanium alloy powder for which titanium alloy scrap or a titanium alloy ingot is adopted as a raw material to thereby form a composite powder, the composite powder is extruded from a carbon steel capsule, and the capsule is melted and removed from the surface of an obtained round bar, and thereafter a solution treatment or a solution treatment and aging treatment are performed.

JP2001-131609A (Patent Document 14) discloses a method for producing a titanium compact, in which a copper capsule is filled with a titanium sponge powder and thereafter subjected to a hot extrusion process at an extrusion ratio of 1.5 or more and an extrusion temperature of 700° C. or less and formed, an outer circumference process is performed to remove copper from the outside, and thereby obtain a titanium compact in which 20% or more of the total length of the grain boundary of the compact is in contact with a metal.

When subjecting hot rolling material to hot rolling, in a case where the hot rolling material is a so-called "difficult-to-process material" which lacks ductility and has a high hot deformation resistance value during hot processing, such as pure titanium or a titanium alloy, a pack-rolling method is known as a technique for rolling such materials into a sheet. The pack-rolling method is a method in which a core material such as a titanium alloy that has poor workability is covered with a cover material such as carbon steel that has good workability and is inexpensive, and hot rolling is then performed.

Specifically, for example, a release agent is coated on the surface of the core material, and at least the upper and lower two faces thereof are covered with a cover material, or in addition to the upper and lower faces, the four peripheral faces are covered by a spacer material, and the circumference is welded and assembled and hot rolling is performed. In pack rolling, the core material that is the material to be rolled is covered with a cover material and subjected to hot rolling. Therefore, because the core material surface is not directly touched by a cold medium (atmospheric air or a roll) and therefore a decrease in the temperature of the core material can be suppressed, production of a sheet is possible even from a core material that has poor workability.

JP63-207401A (Patent Document 15) discloses a method for assembling a sealed covered pack, JP09-136102A (Patent Document 16) discloses a method for producing a sealed covered pack which is sealed with a cover material at a degree of vacuum of the order of $10^{-3}$ torr or more, and JP11-057810A (Patent Document 17) discloses a method for producing a sealed covered pack which is covered with a carbon steel (cover material) and sealed by high-energy density welding under a vacuum of the order of $10^{-2}$ torr or less.

On the other hand, as a method for inexpensively producing material having high corrosion resistance, a method is known for joining a titanium material to the surface of material that serves as a base metal.

JP08-141754A (Patent Document 18) discloses a method for producing a titanium clad steel sheet, in which a steel material is used as a base metal and titanium or a titanium alloy is used as a cladding material, and in which assembled slabs for rolling that were assembled by welding the joining surfaces of the base metal and cladding material after being evacuated of air, are bound by hot rolling.

JP11-170076A (Patent Document 19) discloses a method for producing a titanium covered steel material by laminating and disposing a titanium foil material on the surface of a steel material as a base metal that contains 0.03% by mass or more of carbon with, interposed therebetween, an insert material having a thickness of 20 μm or more that consists of any one of low-carbon steels in which the content of pure nickel, pure iron and carbon is 0.01% by mass or less, and thereafter irradiating a laser beam from any one side in the lamination direction to melt and join at least the vicinity of the edges of the titanium foil material and the steel material as the base metal over the entire circumference.

JP2015-045040A (Patent Document 20) exemplifies a method for producing, using very little energy, dense titanium material (a titanium ingot) including a porous portion formed by forming a porous titanium raw material (titanium sponge) into an ingot shape, and a dense coating portion that is constituted by dense titanium and that covers the entire surface of the porous portion, by producing a titanium ingot by melting the surface of the porous titanium raw material formed in an ingot shape using an electron beam under vacuum to turn a surface layer portion into dense titanium, and subjecting the titanium ingot to hot rolling and cold rolling.

JP62-270277A (Patent Document 21) describes that a surface effect treatment of an engine member for an automobile is performed by spraying.

LIST OF PRIOR ART DOCUMENTS

Patent Documents

Patent Document 1: JP2001-234266A
Patent Document 2: JP2001-89821A
Patent Document 3: JP2005-290548A
Patent Document 4: JP2009-68026A
Patent Document 5: JP2013-142183A
Patent Document 6: JP2008-195994A
Patent Document 7: JP2013-76110A
Patent Document 8: JP2013-163840A
Patent Document 9: JP58-6704B
Patent Document 10: JP1-168833B
Patent Document 11: W5-142392A
Patent Document 12: JP2011-42828A
Patent Document 13: JP2014-19945A
Patent Document 14: JP2001-131609A
Patent Document 15: JP63-207401A
Patent Document 16: JP09-136102A
Patent Document 17: JP11-057810A
Patent Document 18: JP08-141754A
Patent Document 19: JP11-170076A
Patent Document 20: JP2015-045040A
Patent Document 21: JP62-270277A Non Patent Document Non-Patent Document 1; CHITAN NO KAKOU GIJYUTSU, (SHA) NIHON CHITAN KYOUKAI HEN, NIKKAN KOUGYOU SHINBUNSHA, p. 214-230, published November 1992

SUMMARY OF INVENTION

Technical Problem

As described in the foregoing, because titanium alloys in which corrosion resistance is improved contain platinum group elements which are scarce and expensive, the production cost of the titanium alloys increases significantly.

Patent Document 1 discloses the titanium alloy to which Al is added, there is an adverse effect on forming workability, particularly on stretch formability when the working occurs in a direction in which the wall thickness decreases.

Patent Document 2 discloses the titanium alloy the total content of Fe and O of which is large, the strength at room temperature is more than 800 N/mm² which is a value that is too strong, and consequently the formability is poor, with elongation being not more than 20%.

Patent Document 3 discloses the titanium alloy to which Al is added, similarly to the titanium alloy described above, there is a risk of adversely affecting cold workability, particularly on stretch formability when the working occurs in a direction in which the wall thickness decreases.

Patent Document 4 discloses the titanium alloy having sufficient workability and oxidation resistance properties, because the titanium alloy contains a large amount of Nb which is expensive, the alloy cost increases.

In addition, Patent Document 5 discloses the titanium alloy having sufficient high-temperature oxidation properties, the alloy cost increases because the entire sheet surface is alloyed.

Patent Document 6 discloses the method, in which although C and N which have a high solid-solution strengthening ability are used for formation of a hardened layer and consequently the titanium hardens and the fatigue strength can be improved when the C and N are dissolved, this results in a rapid decrease in ductility, and hence the formability is poor.

Further, according to the results of studies conducted by the present inventors, Patent Document 7 discloses the surface treatment method, by means of which is not easy to improve formability.

In addition, Patent Document 6 and Patent Document 7 disclose the inventions, in which it is necessary to perform a special surface treatment on a titanium material, and an increase in the production cost is unavoidable.

As a measure to counter embrittlement caused by hydrogen, generally a surface treatment that provides hydrogen absorption resistance is performed after working into a end product, or electrolytic protection is carried out with respect to the end product. However, both of these cases involve an increase in product working or in the man-hours for working and the like, and consequently an increase in cost is unavoidable, and a titanium material that is excellent in hydrogen embrittlement resistance cannot be provided at a low cost.

Further, Patent Document 8 discloses the method in which, in order to make 50% or more by volume of the entire material β phase, it is necessary for a large amount of expensive additional elements to be contained, and hence the cost increases.

Patent Document 10 discloses the heat-rolled sheet the B content in which is high, it cannot be denied that the cost increases, and the workability is also not favorable, and the use thereof as a neutron shielding sheet is difficult in practice.

In addition, Patent Document 11 discloses the radiation shielding material in which a casing material made of metal is filled with a boron-containing substance, and working thereof is difficult after the boron-containing substance has been supplied.

Conventionally, when producing a titanium material by way of hot working, titanium sponge is press-formed to form a consumable titanium electrode, a titanium ingot is produced by performing vacuum arc remelting that adopts the consumable titanium electrode as an electrode, the titanium ingot is then subjected to blooming, forging and rolling to form a titanium slab, and the titanium slab is subjected to hot rolling, annealing, pickling and cold rolling to produce the titanium material.

In this case, a process of melting titanium to produce a titanium ingot has been invariably added. Although a method for producing a titanium material by subjecting titanium powder to powder rolling, sintering, and cold rolling is also known, a method for producing titanium powder from a titanium ingot has also included a process of melting titanium.

In a method for producing a titanium material from titanium powder, even if a melting process is not undergone, the obtained titanium material is extremely expensive because expensive titanium powder is used as raw material. Patent Document 15 and Patent Document 16 disclose the methods with respect to which the situation similarly applies.

In pack rolling, a core material to be covered by a cover material is merely a slab or an ingot, and undergoes a melting process or adopts expensive titanium powder as a raw material, and hence the production cost cannot be reduced.

According to Patent Document 20, although a dense titanium material can be produced using an extremely small amount of energy, according to this method the surface of titanium sponge formed in an ingot shape is melted and the surface layer portion and internal components of the dense titanium are specified as pure titanium or a titanium alloy of the same grade, and for example it is not possible to reduce the production cost by forming a titanium alloy layer uniformly over a wide range on only the surface layer portion.

On the other hand, with respect to a material obtained by joining titanium or a titanium alloy to the surface of a base metal as a method that can produce an inexpensive corrosion-resistant material, in many cases steel is selected as the base metal. Therefore, if the titanium layer on the surface is lost, the corrosion resistance will also be lost. Even if a titanium material is adopted as the base metal, as long as a titanium material is used that is produced by undergoing a normal production process, a dramatic improvement in cost cannot be expected. Therefore, the present inventors conceived of obtaining a titanium material that is inexpensive and excellent in a specific performance, in which an alloy layer containing specific alloying elements is provided on an outer layer of a slab made from commercially pure titanium or a titanium alloy.

As described in Patent Document 21, spraying is a method in which metal or a ceramic or the like is melted and sprayed onto a titanium material surface to form a film. When a film is formed by this method, formation of pores in the film cannot be avoided. Normally, when performing spraying, the spraying is performed while shielding with inert gases to avoid oxidation of the film. These inert gases are drawn into pores in the film. The pores that contain the inert gases do not compressively bond when subjected to hot working or the like. Further, although a vacuum heat treatment is generally performed when producing titanium, at the time of such treatment the inert gas inside the pores expands and there is a risk that the film will peel off. The experiences of the present inventors have shown that the abundance ratio of pores (porosity) generated by spraying becomes several volume percent or more, and depending on the spraying conditions may be more than 10 vol % in some cases. A titanium material in which the porosity inside a film is high in this manner has a risk of peeling off during the production process, and there is also a concern that a defect such as a crack will arise during working.

A cold spraying process is available as a method for forming a film. When forming a film on a surface by this method also, an inert high pressure gas is used. According to this method, although it is possible to make the porosity less than 1 vol % depending on the conditions, it is extremely difficult to completely prevent the occurrence of pores. Further, similarly to the case of spraying, since the pores contain inert gas, the pores are not destroyed by working carried out thereafter. Furthermore, in a case where a heat treatment is performed in a vacuum, there is a risk that the inert gas in the pores will expand and the film will crack.

To suppress surface defects when performing hot rolling, a melting and resolidification process is available as a process that melts the outer layer of a slab using an electron beam and resolidifies the outer layer. Normally, the outer layer that was melted and resolidified is removed by a pickling process after hot rolling. Consequently, in the conventional melting and resolidification process, absolutely no consideration has been given to segregation of alloying components in a surface layer portion.

Therefore, the present inventors conceived of obtaining a titanium material that is inexpensive and excellent in a specific performance by adopting a material obtained by attaching a titanium sheet containing specific alloying elements to the surface of a slab made from commercially pure titanium or a titanium alloy, as material for hot rolling.

An objective of the present invention is to inexpensively obtain a titanium composite material and a titanium material for hot rolling having desired characteristics, by reducing the content of alloying elements (usage amount of specific alloying elements that exhibit target characteristics) added to improve various characteristics required of a titanium material such as corrosion resistance, oxidation resistance, fatigue resistance, hydrogen embrittlement resistance, and neutron shielding properties, and to reduce the production cost of the titanium material.

Solution to Problem

The present invention was conceived to solve the problems described above, and the gist of the present invention is a titanium composite material and a titanium material for hot rolling which are described hereunder.

(1) A titanium composite material, including:
an inner layer consisting of a commercially pure titanium or a titanium alloy;
an outer layer formed on at least one rolling surface of the inner layer, the outer layer having a chemical composition that is different from a chemical composition of the inner layer; and
an intermediate layer formed between the inner layer and the outer layer, the intermediate layer having a chemical composition that is different from the chemical composition of the inner layer;
wherein:
the outer layer has a thickness of 2 µm or more, and a proportion of the outer layer with respect to the overall thickness is no more than 40% per side; and
a thickness of the intermediate layer is 0.5 µm or more.

(2) The titanium composite material according to (1) above, wherein a chemical composition of the outer layer is, by mass %:
platinum group elements: 0.01 to 0.25%,
rare earth element: 0 to 0.2%,
Co: 0 to 0.8%,
Ni: 0 to 0.6%, and
a balance: titanium and impurities.

(3) The titanium composite material according to (2) above, wherein:
the platinum group elements are Pd and/or Ru.

(4) The titanium composite material according to (2) or (3) above, wherein the chemical composition contains, by mass %:
rare earth element: 0.001 to 0.2%.

(5) The titanium composite material according to any one of (2) to (4) above, wherein the chemical composition contains, by mass %:
Co: 0.05 to 0.8%, and/or
Ni: 0.05 to 0.6%.

(6) The titanium composite material according to any one of (2) to (4) above, wherein a chemical composition of the commercially pure titanium is, by mass %,
C: 0.1% or less,
H: 0.015% or less,
O: 0.4% or less,
N: 0.07% or less,
Fe: 0.5% or less, and
a balance: Ti and impurities.

(7) The titanium composite material according to any one of (1) to (6) above, wherein:
another outer layer is formed on a face other than a rolling surface of the inner layer, and
the other outer layer has a same chemical composition as the outer layer.

(8) A titanium material for hot rolling, including:
a base metal consisting of a commercially pure titanium or a titanium alloy;
an outer layer material that is bound to at least one rolling surface of the base metal; and
a weld zone that joins peripheries of the base metal and the outer layer material;
wherein:
the outer layer material has a chemical composition that is different from a chemical composition of the base metal, and
the weld zone blocks off an interface between the base metal and the outer layer material from external air.

(9) The titanium material for hot rolling according to (8) above, wherein:
another outer layer material is bound to a face other than a rolling surface of the base metal, and
the other outer layer material has a same chemical composition as the outer layer material.

(10) The titanium material for hot rolling according to (8) or (9) above, wherein:
the base metal consists of a directly cast slab.

(11) The titanium material for hot rolling according to (10) above, wherein:
the directly cast slab is a slab in which a melted resolidified layer is formed in at least one portion of a surface.

(12) The titanium material for hot rolling according to (11) above, wherein:
a chemical composition of the melted resolidified layer is different from a chemical composition at a center of a sheet thickness of the directly cast slab.

Advantageous Effects of Invention

A titanium composite material according to the present invention includes an inner layer consisting of a commercially pure titanium or a titanium alloy, and an outer layer having a chemical composition that is different from the chemical composition of the inner layer, and therefore, although having equivalent characteristics to a titanium material that consists entirely of the same titanium alloy, the titanium composite material according to the present invention can be inexpensively produced in comparison to the titanium material that consists entirely of the same titanium alloy.

DESCRIPTION OF EMBODIMENTS

To solve the problems described above, the present inventors conducted intensive studies with respect to decreasing the usage amount of specific alloying elements that exhibit target characteristics by alloying only an outer layer of a titanium sheet of an end product and reducing the cost of producing the titanium material. As a result, the present inventors discovered a titanium material for hot rolling in which a base metal consisting of a commercially pure titanium or a titanium alloy, and a periphery of an outer layer material having a different chemical composition to the base metal are welded such that external air is blocked from an interface between the base metal and the outer layer material. A titanium composite material obtained by subjecting the titanium material for hot rolling to hot working is an inexpensive titanium material having excellent characteristics.

The present invention was made based on the above findings. Hereunder, the titanium composite material and a titanium material for hot rolling thereof according to the present invention are described while referring to the accompanying drawings. Note that, in the following description, unless otherwise specified, "%" relating to the content of each element means "mass percent".

1. Titanium Composite Material 1-1. Overall Structure

Figure 1:
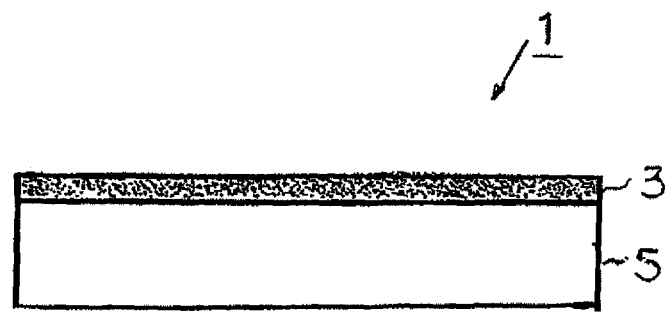
FIG. 1 is an explanatory drawing illustrating one example of the structure of a titanium composite material according to the present invention.
Figure 2:
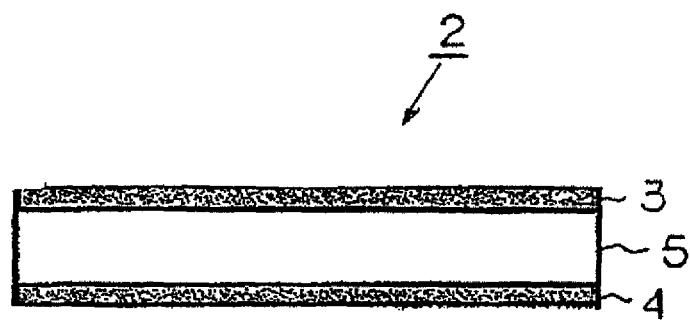
FIG. 2 is an explanatory drawing illustrating one example of the structure of a titanium composite material according to the present invention.

As illustrated in FIGS. 1 and 2, titanium composite materials 1 and 2 include an inner layer 5 consisting of a commercially pure titanium or a titanium alloy, outer layers 3 and 4 formed on at least one rolling surface of the inner layer 5 and having a chemical composition which is different from the chemical composition of the inner layer 5, and an intermediate layer (omitted from the drawings) formed between the inner layer 5 and the outer layers 3 and 4 and having a chemical composition which is different from the chemical composition of the inner layer 5. Note that, although FIGS. 1 and 2 illustrate examples in which an outer layer is formed on one or both of the rolling surfaces of the inner layer 5, another outer layer (omitted from the drawings) may be provided on faces (side faces in the examples illustrated in FIGS. 1 and 2) other than the rolling surfaces of the inner layer 5. Hereunder, the outer layer, the inner layer and the intermediate layer are described in order.

If the thickness of the outer layer is too thin, desired characteristics will not be adequately obtained. On the other hand, if the outer layer is too thick, the cost benefit will decrease because the proportion occupied by titanium alloy with respect to the overall titanium composite material will increase. Therefore, the thickness of the outer layer is made 2 μm or more, and the proportion occupied by the outer layer with respect to the overall thickness is made 40% or less per side.

1-2. Outer Layer

As described above, the outer layer is a titanium alloy. A particular limit is not set with respect to the chemical composition of the titanium alloy. It is known that titanium alloys are generally classified into α type, α+β type and β type. Further, it is known that Al, O, N and the like are available as α stabilizing elements, V, Mo, Cr, Fe, Nb, Ta and the like are available as β stabilizing elements, and Zr, Sn, Hf and the like are available as neutral elements that do not belong to either the α stabilizing elements or β stabilizing elements.

Table 1 shows elements which, when contained in a titanium alloy, are known to contribute to improving the characteristics of the titanium alloy. A titanium alloy according to the present invention can impart a target function to the surface of a titanium material by containing, for example, by mass %, more than 0% of one or more types of element selected from the group consisting of: O: 0 to 0.5%, N: 0 to 0.2%, C: 0 to 2.0%, Al: 0 to 8.0%, Sn: 0 to 10.0%, Zr: 0 to 20.0%, Mo: 0 to 25.0%, Ta: 0 to 5.0%, V: 0 to 30.0%, Nb: 0 to 40.0%, Si: 0 to 2.0%, Fe: 0 to 5.0%, Cr: 0 to 10.0%, Cu: 0 to 3.0%, Co: 0 to 3.0%, Ni: 0 to 2.0%, platinum group elements: 0 to 0.5%, rare earth element: 0 to 0.5%, B: 0 to 5.0%, and Mn: 0 to 10.0%.

Elements which can be contained in titanium which are other than the above elements are elements that can improve strength by solid-solution strengthening or precipitation strengthening (there are cases where elements do not dissolve and cases where elements cause a precipitate to form), or depending on the element that is contained, can improve creep characteristics, which are known as common knowledge pertaining to metal materials. Elements from, in terms of atomic number, hydrogen (1) to astatine (85) (however, excluding the noble gas elements that are Group 18 elements) are exemplified as these elements, and up to approximately 5% in total of these elements is allowed.

The balance other than the above elements is Ti and impurities. The impurities can be contained in a range that does not inhibit the target characteristics, and other impurities are impurity elements that mainly get mixed in from the raw material or scrap and elements that get mixed in during production, with C, N, O, Fe, H, and the like being elements that are representative examples thereof, and in addition there are elements such as Mg and Cl that get mixed in from raw material, and elements such as Si, Al and S that get mixed in during production. It is considered that a range in which these elements do not inhibit the target characteristics of the present application is not more than approximately 2%.

Further, as shown in Table 1, the titanium alloy according to the present invention may contain, for example, by mass %, one or more types of element selected from the group consisting of O: 0.01 to 0.5%, N: 0.01 to 0.2%, C: 0.01 to 2.0%, Al: 0.1 to 8.0%, Sn: 0.1 to 10.0%, Zr: 0.5 to 20.0%, Mo: 0.1 to 25.0%, Ta: 0.1 to 5.0%, V: 1.0 to 30.0%, Nb: 0.1 to 40.0%, Si: 0.1 to 2.0%, Fe: 0.01 to 5.0%, Cr: 0.1 to 10.0%, Cu: 0.3 to 3.0%, Co: 0.05 to 3.0%, Ni: 0.05 to 2.0%, platinum group elements: 0.01 to 0.5%, rare earth element: 0.001 to 0.5%, B: 0.01 to 5.0%, and Mn: 0.1 to 10.0%.

More preferably, the titanium alloy according to the present invention contains one or more types of element selected from the group consisting of: O: 0.02 to 0.4%, N: 0.01 to 0.15%, C: 0.01 to 1.0%, Al: 0.2 to 6.0%, Sn: 0.15 to 5.0%, Zr: 0.5 to 10.0%, Mo: 0.2 to 20.0%, Ta: 0.1 to 3.0%, V: 2.0 to 25.0%, Nb: 0.15 to 5.0%, Si: 0.1 to 1.0%, Fe: 0.05 to 2.0%, Cr: 0.2 to 5.0%, Cu: 0.3 to 2.0%, Co: 0.05 to 2.0%, Ni: 0.1 to 1.0%, platinum group elements: 0.02 to 0.4%, rare earth element: 0.001 to 0.3%, B: 0.1 to 5.0%, and Mn: 0.2 to 8.0%, and further preferably contains one or more types of element selected from the group consisting of: O: 0.03 to 0.3%, N: 0.01 to 0.1%, C: 0.01 to 0.5%, Al: 0.4 to 5.0%, Sn: 0.2 to 3.0%, Zr: 0.5 to 5.0%, Mo: 0.5 to 15.0%, Ta: 0.2 to 2.0%, V: 5.0 to 20.0%, Nb: 0.2 to 2.0%, Si: 0.15 to 0.8%, Fe: 0.1 to 1.0%, Cr: 0.2 to 3.0%, Cu: 0.3 to 1.5%, Co: 0.1 to 1.0%, Ni: 0.1 to 0.8%, platinum group elements: 0.03 to 0.2%, rare earth element: 0.001 to 0.1%, B: 0.2 to 3.0%, and Mn: 0.2 to 5.0%.

TABLE 1

| | (mass %) | | | |
|---|---|---|---|---|
| Element | Preferable range | More preferable range | Further preferable range | Main role Purpose |
| O | 0.01~0.5 | 0.02~0.4 | 0.03~0.3 | Strength improvement |
| N | 0.01~0.2 | 0.01~0.15 | 0.01~0.1 | Strength improvement |
| C | 0.01~2.0 | 0.01~1.0 | 0.01~0.5 | Strength improvement |
| Al | 0.1~8.0 | 0.2~6.0 | 0.4~5.0 | Strength improvement |
| Sn | 0.1~10.0 | 0.15~5.0 | 0.2~3.0 | Strength improvement |
| Zr | 0.5~20.0 | 0.5~10.0 | 0.5~5.0 | Strength and workability improvement |
| Mo | 0.1~25.0 | 0.2~20.0 | 0.5~15.0 | High-temperature strength and corrosion resistance improvement |
| Ta | 0.1~5.0 | 0.1~3.0 | 0.2~2.0 | Heat resistance, corrosion resistance improvement |
| V | 1.0~30.0 | 2.0~25.0 | 5.0~20.0 | Strength improvement, microstructure control |
| Nb | 0.1~40.0 | 0.15~5.0 | 0.2~2.0 | Heat resistance, strength improvement |
| Si | 0.1~2.0 | 0.1~1.0 | 0.15~0.8 | Heat resistance improvement |
| Fe | 0.01~5.0 | 0.05~2.0 | 0.1~1.0 | Strength improvement, microstucture control |
| Cr | 0.1~10.0 | 0.2~5.0 | 0.2~3.0 | Strength improvement |
| Cu | 0.3~3.0 | 0.3~2.0 | 0.3~1.5 | Strength and workability improvement |
| Co | 0.05~3.0 | 0.05~2.0 | 0.1~1.0 | Corrosion resistance improvement, strength improvement |
| Ni | 0.05~2.0 | 0.1~1.0 | 0.1~0.8 | Corrosion resistance improvement, strength improvement |
| Platinum group elements such as Pt and Pd | 0.01~0.5 | 0.02~0.4 | 0.03~0.2 | Corrosion resistance improvement |
| Rare earth metals such as Sc and Y, mixed rare earth elements (misch metal) | 0.001~0.5 | 0.001~0.3 | 0.001~0.1 | Corrosion resistance improvement |
| B | 0.01~5.0 | 0.1~5.0 | 0.2~3.0 | Neutron shielding performance improvement |
| Mn | 0.1~10.0 | 0.2~8.0 | 0.2~5.0 | Strength improvement |

Further, for example, titanium alloys specified in HS Standards that are described hereunder can also be used.

JIS Class 11 to JIS Class 23 (JIS 4600 (2012) Titanium and titanium alloys—Sheets, plates and strips): include Pd, Ru, Ni, Co or the like, and are excellent in corrosion resistance and crevice corrosion resistance.

JIS Class 50 (JIS 4600 (2012) Titanium and titanium alloys—Sheets, plates and strips): is Ti-1.5Al, and is excellent in corrosion resistance, hydrogen absorption resistance and heat resistance.

JIS Class 60 (JIS 4600 (2012) Titanium and titanium alloys—Sheets, plates and strips): is Ti-6Al-4V, and is a high strength titanium alloy with a high degree of versatility.

JIS Class 61 (JIS 4600 (2012) Titanium and titanium alloys—Sheets, plates and strips): is Ti-3Al-2.5V, and provides favorable weldability and formability and favorable machinability.

JIS Class 80 (JIS 4600 (2012) Titanium and titanium alloys—Sheets, plates and strips): is Ti-4Al-22V, and is a high strength titanium alloy that is excellent in cold workability.

Furthermore, apart from the above described titanium alloys, a titanium alloy having a chemical composition that is not specified in JIS Standards can also be used. Examples of such titanium alloys are listed below.

Titanium alloys having heat resistance: Ti-6Al-2Sn-4Zr-2Mo-0.08Si, Ti-6Al-5Zr-0.5Mo-0.2Si, Ti-8Al-1Mo-1V, and the like.

Low-alloy, high-strength titanium alloys: Ti-1 to 1.5Fe-0.3 to 0.50-0.01 to 0.04N and the like.

Low-alloy titanium alloys having heat resistance: Ti-1Cu, Ti-1Cu-0.5Nb, Ti-1Cu-1Sn-0.35Si-0.5Nb, and the like.

Titanium alloys excellent in creep resistance: Ti-6Al-2Sn-4Zr-6Mo and the like.

Titanium alloys having high strength and good cold workability: Ti-15V-3Cr-3Sn-3Al, Ti-20V-4Al-1Sn, and the like.

Titanium alloys having high strength and high toughness: Ti-10V-2Fe-3Al and the like.

Titanium alloys excellent in wear resistance: Ti-6Al-4V-10Cr-1.3C and the like.

Preferably, at least one outer layer (at least an outer layer that contacts the external environment) contains alloying elements that exhibit a target characteristic, with the balance being titanium and impurities. The following elements are exemplified as alloying elements that exhibit a target characteristic, although the present invention is not limited to these elements.

(a) Alloying elements exhibiting corrosion resistance: by mass %, 0.01 to 0.25% of platinum group elements (Pd and/or Ru), and as required, 0.2% or less of rare earth element, and furthermore, one or more types of element selected from Co: 0.8% or less and Ni: 0.6©% or less, and the like.

(b) Alloying elements exhibiting oxidation resistance: one or more types of element selected from 0.1 to 0.6% of Si, 0.1 to 1.0% of Nb, 0.3 to 1.0% of Ta, and 0.3 to 1.5% of Al, and as required, one or more types of element selected from 1.5% or less of Sn, 1.5% or less of Cu, and 0.5% or less of Fe (however, in an amount of 2.5% or less in total).

(c) Alloying elements exhibiting fatigue resistance: one or more types of element selected from Fe, Cr, Ni, Al and Zr in a total amount of 0.08 to 1.0%.

(d) Alloying elements exhibiting hydrogen embrittlement resistance: one or more types of element selected from Mo, V and Nb in a range of 8.0<Mo equivalent<20.0 (where, Mo equivalent=Mo content (mass %)+V content (mass %)/1.5 Nb content (mass %)/3.6).

(e) Alloying element exhibiting neutron shielding properties: 0.1 to 3.0% of B.

The respective cases described in the foregoing (a) to (e) will now be individually described.

(a) Case of Containing Alloying Elements Exhibiting Corrosion Resistance (Thickness)

If the thickness of an outer layer contacting the external environment among the outer layers is too thin, corrosion resistance will not be adequately obtained. Although the thickness of the outer layers changes depending on the thickness of the material that is used for production and also on a working ratio thereafter, a sufficient effect is exerted if the thickness is 2 μm or more. Therefore, the thickness of each outer layer is preferably 2 μm or more, and more preferably is 5 μm or more.

On the other hand, although there is not a problem with respect to corrosion resistance if the outer layers are thick, the cost benefit will decrease since the proportion that the titanium alloy occupies with respect to the entire titanium composite material will increase. Therefore, the thickness of the outer layers with respect to the overall thickness of the titanium composite material 1 is preferably 40% or less, respectively, and more preferably is 30% or less.

(Chemical Composition)

The titanium composite material 1 according to the present invention may contain various alloying elements described hereunder to increase the corrosion resistance of at least one of the outer layers (at least an outer layer that contacts the external environment).

Platinum Group Elements: 0.01 to 0.25%

A platinum group element has an effect that lowers the hydrogenation voltage of a titanium alloy and maintains the spontaneous potential in an immobile zone, and can be contained as an alloying element that exhibits corrosion resistance. The corrosion resistance will be insufficient if the content of the platinum group element (total content in a case where a plurality of platinum group elements is contained) is less than 0.01%. Even if the content is more than 0.25%, a significant improvement in corrosion resistance cannot be expected, and a content of more than 0.25% leads to a steep rise in the raw material cost. In the case of containing platinum group elements, the content thereof is made 0.01 to 0.25%. Preferably the content of platinum group elements is 0.03% or more, and more preferably is 0.05% or more. Further, a content of 0.20% or less is preferable, and more preferably is 0.15% or less.

Although the platinum group elements that may be used in the present invention are each useful elements that have an effect that increases corrosion resistance of the titanium alloy, in particular it is preferable to contain Pd for which the advantageous effect of improving corrosion resistance is high per percentage content. Further, Ru which is relatively inexpensive can be used as a substitute for Pd.

If a rare earth element is added to a titanium alloy containing a platinum group element, the Ti and platinum group element will be rapidly eluted when exposed to a corrosive environment, and the concentration of the platinum group element in a solution in the vicinity of the titanium alloy will increase. As a result, precipitation of the platinum group element in the titanium alloy will be promoted, and the platinum group element can be efficiently precipitated even if the dissolved amount of titanium alloy is small, and this leads to an improvement in corrosion resistance.

Rare Earth Element: 0 to 0.2%

Rare earth elements include Sc, Y, light rare earth elements (La to Eu), and heavy rare earth elements (Gd to Lu), and the above effect can be expected when any of the rare earth elements are added. The same effect can also be expected in a case where a mixture or compound of rare earth elements is used, such as a mixed rare earth element before separation and refining (misch metal, hereinafter simply referred to as "Mm") or a didymium alloy (Nd—Pr alloy).

Taking into account the circumstances described above, it is not necessary for the rare earth element that is added to be of only one kind, and it is considered that corrosion resistance will be improved by the above effect even if a plurality of elements are contained at the same time. In such a case, the total content of rare earth element means the total content of the aforementioned elements.

If the content of rare earth element is excessive, the above effect is saturated, and hence not only will a further advantageous effect of improving corrosion resistance not be obtained, but the economic efficiency will also decrease. Therefore, in the case of containing rare earth element, the content thereof is preferably 0.2% or less and more preferably is 0.02% or less. On the other hand, in order to adequately obtain an advantageous effect of eluting Ti and platinum group elements in an active state area of the titanium alloy and to promote precipitation of the platinum group elements onto the alloy surface, it is preferable to contain 0.001% or more of rare earth element.

Co: 0 to 0.8%

Ni: 0 to 0.6%

Co and Ni are elements that improve the corrosion resistance of the titanium alloy by changing a hydrogenation voltage, and extremely high corrosion resistance is obtained by adding Co and Ni in combination with a platinum group element and/or a rare earth element. However, even if the Co content is more than 0.8% or the Ni content is more than 0.6%, the effect is saturated, and this is not preferable from a viewpoint of economic efficiency also. Therefore, when these elements are contained, the Co content is made 0.8% or less and the Ni content is made 0.6% or less. The Co content is preferably 0.7% or less, and the Ni content is preferably 0.5% or less. To reliably obtain the above effect, it is preferable to contain 0.05% or more of each of Co and Ni, and containing 0.2% or more of each of Co and Ni is more preferable.

The balance other than the above elements is impurities. The impurities can be contained in a range that does not inhibit the target characteristics, and other impurities include Cr, Ta, Al, V, Cr, Nb, Si, Sn, Mn, Mo, Cu, and the like as impurity elements that get mixed in mainly from scrap, and impurities are allowed as long as the amount thereof together with C, N, Fe, O and H that are the common impurity elements is 0.5% or less.

(b) Case of Containing Alloying Elements Exhibiting Oxidation Resistance (Thickness)

If the thickness of an outer layer contacting the external environment among the outer layers is too thin, oxidation resistance will not be adequately obtained. Although the thickness of the outer layers changes depending on the thickness of the material that is used for production and also on a working ratio thereafter, a sufficient effect is exerted if the thickness is 2 μm or more. Therefore, the thickness of each outer layer is preferably 2 μm or more, more preferably 5 μm or more, and further preferably is 10 μm or more.

On the other hand, although there is not a problem with respect to oxidation resistance if the outer layers are thick, the cost benefit will decrease since the proportion that the titanium alloy occupies with respect to the entire titanium composite material will increase. Therefore, the proportion of the thickness of the outer layer with respect to the overall thickness of the titanium composite material is preferably 40% or less per side, and more preferably is 30% or less.

(Chemical Composition)

The titanium composite material 1 according to the present invention may contain various alloying elements described hereunder to increase the oxidation resistance of at least one of the outer layers (at least an outer layer that contacts the external environment).

Si: 0.1 to 0.6%

Si has an action that improves oxidation resistance at a high temperature of 600 to 800° C. If the Si content is less than 0.1%, the degree of improvement in oxidation resistance will be small. On the other hand, if the Si content is more than 0.6%, the influence on oxidation resistance will be saturated and workability will noticeably decline not only at room temperature but also at a high temperature. Hence, in a case where Si is to be contained, the content thereof is made 0.1 to 0.6%. An Si content of 0.15% or more is preferable, and an Si content of 0.20% or more is more preferable. Further, the Si content is preferably 0.55% or less, and more preferably is 0.50% or less.

Nb: 0.1 to 2.0%

Nb also has an action that improves oxidation resistance at a high temperature. In order to improve oxidation resistance, the Nb content is made 0.1% or more. On the other hand, even if the Nb content contained in the titanium alloy is more than 2.0%, the effect will be saturated, and this will also cause an increase in the alloy cost since Nb is an expensive additional element. Hence, in a case where Nb is to be contained, the content thereof is made 0.1 to 2.0%. The Nb content is preferably 0.3% or more, and more preferably is 0.5% or more. Further, the Nb content is preferably 1.5% or less, and more preferably is 1.0% or less.

Ta: 0.3 to 1.0%

Ta also has an action that improves oxidation resistance at a high temperature. In order to improve oxidation resistance, the Ta content is made 0.3% or more. On the other hand, if the Ta content contained in the titanium alloy is more than 1.0%, not only will this cause an increase in the alloy cost since Ta is an expensive additional element, but formation of β phase by a heat treatment temperature is also a concern. Hence, in a case where Ta is to be contained, the content thereof is made 0.3 to 1.0%. The Ta content is preferably 0.4% or more, and more preferably is 0.5% or more. Further, the Ta content is preferably 0.9% or less, and more preferably is 0.8% or less.

Al: 0.3 to 1.5%

Al is also an element that improves oxidation resistance at a high temperature. On the other hand, if Al is contained in a large amount, ductility at room temperature noticeably decreases. An oxidation resistance property is sufficiently exhibited if the Al content is 0.3% or more. Further, if the Al content is 1.5% or less, working performed as cold processing can be sufficiently ensured. Hence, in a case where Al is to be contained, the content thereof is made 0.3 to 1.5%. The Al content is preferably 0.4% or more, and more preferably is 0.5% or more. Further, the Al content is preferably 1.2% or less.

Note that, although oxidation resistance is improved if any one of Si, Nb, Ta and Al is individually contained, high temperature oxidation resistance can be further improved by containing a combination of these elements.

In addition to the above elements, one or more types of element selected from Sn, Cu and Fe may be contained.

Sn: 0 to 1.5%

Sn is an α phase stabilizing element, and similarly to Cu, is an element that increases high temperature strength. However, if the Sn content is more than 1.5%, the Sn inhibits twinning deformation and reduces workability at room temperature. Therefore, in a case where Sn is to be contained, the content thereof is made 1.5% or less. The Sn content is preferably 1.3% or less, and more preferably is 1.2% or less. When it is desired to obtain the aforementioned effect, the Sn content is preferably 0.2% or more, and more preferably is 0.5% or more.

Cu: 0 to 1.5%

Cu is an element that increases high temperature strength. Further, since Cu dissolves to a fixed degree in α phase, Cu does not form β phase even when used at a high temperature. However, if the Cu content is more than 1.5%, the Cu may form β phase depending on the temperature. Therefore, in a case where Cu is to be contained, the content thereof is made 1.5% or less. The Cu content is preferably 1.4% or less, and more preferably is 1.2% or less. When it is desired to obtain the aforementioned effect, the Cu content is preferably 0.2% or more, and more preferably is 0.4% or more.

Fe: 0 to 0.5%

Although Fe is a β phase stabilizing element, if Fe is contained in a small amount, there is little formation of β phase, and the Fe will not significantly affect oxidation resistance. However, if the Fe content is more than 0.5%, the formed amount of β phase is large, causing oxidation resistance to deteriorate. Therefore, in a case where Fe is to be contained, the content thereof is made 0.5% or less. Preferably the Fe content is 0.4% or less, and more preferably is 0.3% or less.

If the total content of Sn, Cu and Fe is more than 2.5%, these elements will decrease the workability at room temperature, and depending on the temperature, β phase may be formed. Therefore, in a case where one or more types of element selected from Sn, Cu and Fe is to be contained, preferably the total content thereof is not more than 2.5%.

The balance other than the above elements is impurities. The impurities can be contained in a range that does not inhibit the target characteristics, and other impurities include Cr, V, Mn, Mo, and the like as impurity elements that get mixed in mainly from scrap, and impurities are allowed as long as the amount thereof together with C, N, O and H that are the common impurity elements is 5.0% or less.

(c) Case of Containing Alloying Elements Exhibiting Fatigue Resistance (Thickness)

If the thickness of an outer layer contacting the external environment among the outer layers is too thin, fatigue resistance will not be adequately obtained. Although the thickness of the outer layers changes depending on the thickness of the material that is used for production and also on a working ratio thereafter, a sufficient effect is exerted if the thickness is 2 μm or more. Therefore, the thickness of an outer layer is preferably 2 μm or more, more preferably 5 μm or more, and further preferably is 10 μm or more. Further, the proportion of the thickness of the outer layer with respect to the overall thickness of the titanium composite material is preferably 1% or more per side.

On the other hand, although there is not a problem with respect to fatigue resistance if the outer layers are thick, formability will decrease. Further, because the proportion that the titanium alloy occupies with respect to the entire titanium composite material will increase, the cost benefit will decrease. Therefore, the thickness of each outer layer is preferably 100 µm or less, and more preferably is 50 µm or less. Further, the proportion of the thickness of the outer layer with respect to the overall thickness of the titanium composite material 1 is preferably 40% or less per side, and more preferably is 30% or less. In particular, the thickness is preferably 20% or less, and more preferably is 10% or less.

(Chemical Composition)

The titanium composite material 1 according to the present invention may contain various alloying elements described hereunder to increase the fatigue resistance of at least one of the outer layers (at least an outer layer that contacts the external environment).

One or more types of element selected from Fe, Cr, Ni, Al and Zr: 0.08 to 1.0%

Because the origin of fatigue fracture is the surface of a sheet, it is preferable to make the α-phase grain size 15 µm or less to obtain high fatigue resistance while maintaining formability. The α-phase grain size is more preferably made 10 µm or less, and further preferably is made 5 µm or less.

In order to make the α-phase grain size 15 µm or less and obtain high fatigue resistance, the total content of Fe, Cr, Ni, Al and Zr is made 0.08% or more. On the other hand, if the total content of these elements is more than 1.0%, in some cases the ductility such as elongation and formability significantly decreases. Therefore, the total content of one or more types of element selected from Fe, Cr, Ni, Al and Zr is made 0.08 to 1.0%.

The balance other than the above elements is impurities. The impurities can be contained in a range that does not inhibit the target characteristics, and other impurities include Sn, Mo, V, Mn, Nb, Si, Cu, Co, Pd, Ru, Ta, Y, La, Ce, and the like as impurity elements that get mixed in mainly from scrap, and impurities are allowed as long as the amount thereof together with C, N, O and H that are the common impurity elements is 5.0% or less.

(Mechanical Properties)

The titanium composite material 1 has high fatigue strength while also maintaining excellent formability, with the fatigue strength ratio ($10^7$ cycles fatigue strength/tensile strength) being 0.65 or more. The higher that the fatigue strength ratio is, the more excellent the material is in fatigue characteristics, and since this value is generally from 0.5 to 0.6 for a titanium material, it can be said that if the value is 0.65 or more the fatigue characteristics are superior in comparison to a common titanium material, and if the value is 0.70 or more it can be said that the fatigue characteristics are further superior.

In addition, in the titanium composite material 1, breaking elongation in a direction perpendicular to the rolling direction is 25% or more. Elongation has a significant influence on forming, and the greater the elongation is, the more excellent the formability that is exhibited.

(d) Case of Containing Alloying Elements Exhibiting Hydrogen Embrittlement Resistance (Thickness)

If the thickness of an outer layer contacting the external environment among the outer layers is too thin, hydrogen absorption resistance will not be adequately obtained. On the other hand, although there is not a problem with respect to hydrogen absorption resistance if the titanium alloy in the outer layers is thick, since the proportion that the titanium alloy in the outer layers occupies with respect to the entire material will increase, the production cost will rise. The thickness of the outer layers is preferably 5 µm or more, and more preferably is 10 µm or more. Therefore, the proportion of the thickness of the outer layer with respect to the overall thickness of the titanium composite material is preferably 40% or less per side, more preferably is 30% or less, and in particular it is favorable to make the thickness from 2 to 20%.

(Chemical Composition)

The titanium composite material 1 according to the present invention may contain various alloying elements described hereunder to increase the hydrogen absorption resistance of at least one of the outer layers (at least an outer layer that contacts the external environment).

8.0<Mo Equivalent<20.0

Where, Mo equivalent=Mo content (mass %)+V content (mass %)/1.5+Nb content (mass %)/3.6.

A layer that obtains hydrogen absorption resistance is a titanium alloy layer containing β stabilizing elements in a fixed range. The reason for defining formation of the β phase is that, while the α phase of titanium forms hydrides with even a very small hydrogen concentration of several 10 ppm, the β phase of a titanium alloy can dissolve hydrogen of approximately 1000 ppm or more, and hence has a characteristic such that it is difficult for embrittlement that is caused by hydrogen to occur.

In a case where eutectoid β stabilizing elements such as Fe and Cr are contained, there is a risk of titanium and these elements forming a compound and causing embrittlement. However, in a case where, among the β stabilizing elements, Mo, V and Nb are contained within a range that satisfies "8.0<Mo equivalent<20.0", even if Fe and Cr or the like are simultaneously present, embrittlement does not occur because the β phase is stable and does not form a compound phase.

Here, the lower limit of the Mo equivalent is an alloy amount required to obtain a sufficient amount of β phase. The upper limit is set based on the fact that a titanium alloy in which the amount of added alloying elements is large is not suitable for use from a cost aspect since the price thereof is high.

An existing β-type titanium alloy can be utilized for formation of an alloy layer as an outer layer. Examples thereof include Ti-15V-3Cr-3Al-3Sn, Ti-8V-3Al-6Cr-4Mo-4Zr (BetaC) and Ti-11.5Mo-6Zr-4.5Sn (BetaIII). In the case of using such an existing β-type titanium alloy, such elements are allowed if the amount thereof together with the content of additional elements, such as Cr, Sn, Al and Zr, that are other than the aforementioned elements is 15% or less. These elements are elements which are contained for adjusting heat treatability, strength and cold workability in an existing β-type titanium alloy, and do not reduce the Mo equivalent defined in the present invention. Further, elements such as Si and Fe, for example, may also be contained.

The balance other than the above elements is impurities. Impurities can be contained in a range that does not inhibit the target characteristics, and other impurities include Ta, Si, Mn, Cu, and the like as impurity elements that get mixed in mainly from scrap, and the impurities are allowed as long as the amount thereof together with C, N, Fe, O and H that are the common impurity elements is 5% or less.

(e) Case of Containing Alloying Elements Exhibiting Neutron Shielding Properties (Thickness)

If the thickness of an outer layer contacting the external environment among the outer layers is too thin, a neutron shielding effect will not be adequately obtained. On the other hand, in a case where the outer layers are thick, although a neutron shielding effect improves, since the proportion that the titanium alloy occupies with respect to the entire material increases, the production cost rises. The thickness of the outer layers is preferably 5 μm or more, and more preferably is 10 μm or more. The proportion of the thickness of the outer layer with respect to the overall thickness of the titanium composite material is preferably 40% or less per side, and more preferably is 30% or less. In particular, it is favorable to make the thickness from 5 to 40%.

(Chemical Composition)

The titanium composite material 1 according to the present invention contains an alloying element for providing a neutron shielding effect in an outer layer. Hereunder, reasons for selecting an additional element, and reasons for limiting a range of an added amount of the additional element are described in detail.

B: 0.1 to 3.0%

The natural abundance of $^{10}B$ in B is 19.9%, and $^{10}B$ has a large absorption cross section for thermal neutrons and a neutron shielding effect thereof is large. A neutron shielding effect is not adequately obtained if the B content is less than 0.1%, and if the B content is more than 3.0% there is a risk of causing cracks and a deterioration in workability during hot rolling.

In this case, it is possible to manufacture a titanium alloy containing B by adding 13 or a boride such as $TiB_2$ to titanium. Furthermore, if material containing $^{10}B$ enriched boron ($^{10}B$ content is approximately 90% or more) such as $H_3{}^{10}BO_3$, $^{10}B_2O$ or $^{10}B_4C$ is used, since the neutron shielding effect is large even if the B content is small, the titanium alloy is extremely useful.

In the case of using $H_3{}^{10}B_3$, $^{10}B_2O$ or $^{10}B_4C$, although H and O also concentrate in the alloy layer, the H does not constitute a problem since the H comes out from the material during a heat treatment such as vacuum annealing, and with respect to O and C, if the content of O is 0.4 percent by mass or less and the content of C is 0.1 percent by mass or less which are not more than the respective upper limits contained in a commercially pure titanium, production can be performed without a problem.

The balance other than the above elements is impurities. The impurities can be contained in a range that does not inhibit the target characteristics, and other impurities include Cr, Ta, Al, V, Cr, Nb, Si, Sn, Mn, Mo, Cu and the like as impurity elements that get mixed in mainly from scrap, and impurities are allowed as long as the amount thereof together with C, N, Fe, O and H that are the common impurity elements is 5% or less.

(Applications)

In facilities in which radiation therapy such as particle radiotherapy and BNCT (boron neutron capture therapy) is performed, a polyethylene material is used in which the B content is 3.0 to 4.0 percent by mass and the sheet thickness is 10 to 100 mm. Further, in facilities related to nuclear energy, stainless steel sheets in which the B content is 0.5 to 1.5 percent by mass and the sheet thickness is 4.0 to 6.0 mm are used in nuclear fuel storage racks. By using the titanium composite material 1 in which the B content and thickness of an outer layer (thickness of a B-concentrated layer) are adjusted, it is possible to exert characteristics that are equal to or superior to the characteristics of the aforementioned materials.

1-3. Inner Layer

The inner layer 5 consists of commercially pure titanium or a titanium alloy. For example, when commercially pure titanium is used in the inner layer 5, the workability thereof at room temperature is superior to a titanium material that consists entirely of the same titanium alloy.

Here, the term "commercially pure titanium" includes commercially pure titanium as specified for Class 1 to Class 4 of the JIS Standards, and commercially pure titanium corresponding thereto that is specified for Grades 1 to 4 of the ASTM standards and 3.7025, 3.7035 and 3.7055 of the DIN standards That is, the commercially pure titanium that is the object of the present invention, for example, consists of C: 0.1% or less, H: 0.015% or less, O: 0.4% or less, N: 0.07% or less and Fe: 0.5% or less, with the balance being Ti.

Further, when the titanium composite material 1 is to be provided for an intended use in which strength is also required in addition to a specific performance, a titanium alloy may be used in the inner layer 5. By increasing the B content of the outer layer and using a titanium alloy to form the inner layer 5, the alloy cost can be significantly reduced and high strength can be obtained.

Depending on the required use, it is possible to use any of an α-type titanium alloy, an α+β-type titanium alloy and a β-type titanium alloy for the titanium alloy forming the inner layer 5.

Here, for example, high corrosion resistant alloys (titanium materials specified for ASTM Grades 7, 11, 16, 26, 13, 30 and 33, or JIS Classes corresponding to the ASTM Grades, or titanium materials obtained by adding various elements thereto in small amounts), Ti-0.5Cu, Ti-1.0Cu, Ti-1.0Cu-0.5Nb, Ti-1.0Cu-1.0Sn-0.3Si-0.25Nb, Ti-0.5Al-0.45Si, Ti-0.9Al-0.35Si, Ti-3Al-2.5V, Ti-5Al-2.5Sn, Ti-6Al-2Sn-4Zr-2Mo, Ti-6Al-2.75Sn-4Zr-0.4Mo-0.45Si and the like can be used as α-type titanium alloys.

As α+β-type titanium alloys, for example, Ti-6Al-4V, Ti-6Al-6V-2Sn, Ti-6Al-7V, Ti-3Al-5V, Ti-5Al-2Sn-2Zr-4Mo-4Cr, Ti-6Al-2Sn-4Zr-6Mo, Ti-1Fe-0.35O, Ti-1.5Fe-0.5O, Ti-5Al-1Fe, Ti-5Al-1Fe-0.3Si, Ti-5Al-2Fe, Ti-5Al-2Fe-0.3Si, Ti-5Al-2Fe-3Mo, Ti-4.5Al-2Fe-2V-3Mo and the like can be used.

Further, as β-type titanium alloys, for example, Ti-11.5Mo-6Zr-4.5Sn, Ti-8V-3Al-6Cr-4Mo-4Zr, Ti-10V-2Fe-3Mo, Ti-13V-11Cr-3Al, Ti-15V-3Al-3Cr-3Sn, Ti-6.8Mo-4.5Fe-1.5Al, Ti-20V-4Al-1Sn, Ti-22V-4Al and the like can be used.

However, if the 0.2% yield stress of the inner layer 5 is more than 1000 MPa, the workability deteriorates and, for example, there is a risk of cracks occurring during bending. Therefore, the 0.2% yield stress of the titanium and titanium alloy used in the inner layer 5 is preferably not more than 1000 MPa.

1-4. Intermediate Layer

The titanium composite material of the present invention includes an intermediate layer between the inner layer and the outer layer. That is, although a titanium material for hot rolling which is described later is a titanium material in which an outer layer material is attached to a base metal and the periphery is welded, during subsequent hot rolling heating and in a heat treatment process after cold rolling, diffusion occurs at an interface between the base metal and the outer layer material, and when the titanium composite material is ultimately finished, an intermediate layer is formed between an inner layer that originates from the aforementioned base metal and an outer layer that originates from the aforementioned outer layer material. The intermediate layer has a chemical composition that is different from the chemical composition of the base metal. The intermediate layer is metallically bonded to the inner layer and the outer layer and thereby firmly bound to the inner layer and outer layer. Further, since consecutive element gradients are generated in the intermediate layer, a strength difference between the inner layer and the outer layer can be moderated and the occurrence of cracking during working can be suppressed.

Note that the thickness of the intermediate layer can be measured using EPMA or GDS. A detailed measurement is possible by using GDS. In the case of GDS, after the outer layer is removed by polishing to a certain extent, it is possible to measure the thickness of the intermediate layer by performing GDS analysis in the depth direction from the surface. The term "intermediate layer" means, when the amount of increased content from the base metal (in the ease of an element that is not contained in the base metal, the content thereof, and in the case of an element that is contained in the base metal, the amount of increase in the content thereof from the base metal) is taken as $C_{MID}$, and the average of the increased content in a surface layer portion is taken as $C_{AVE}$, a region represented by $0 < C_{MID} \leq 0.8 \times C_{AVE}$.

The thickness of the intermediate layer is made 0.5 μm or more. On the other hand, if the thickness of the intermediate layer is too great, the alloy layer at the outer layer becomes thinner by a corresponding amount, and in some cases does not exhibit the effect thereof. Hence, it is good to set 15 μm as the upper limit of the thickness of the intermediate layer.

2. Titanium Material for Hot Rolling

The titanium material for hot rolling of the present invention is material (a cast piece such as a slab, bloom or billet) that is provided for hot working, and after the hot working, is subjected as required to cold rolling, a heat treatment and the like, and worked into a titanium composite material. Hereunder, the titanium material for hot rolling of the present invention is described using the accompanying drawings. In the following description, "%" in relation to the content of each element means "mass percent".

2-1. Overall Structure

Figure 3:
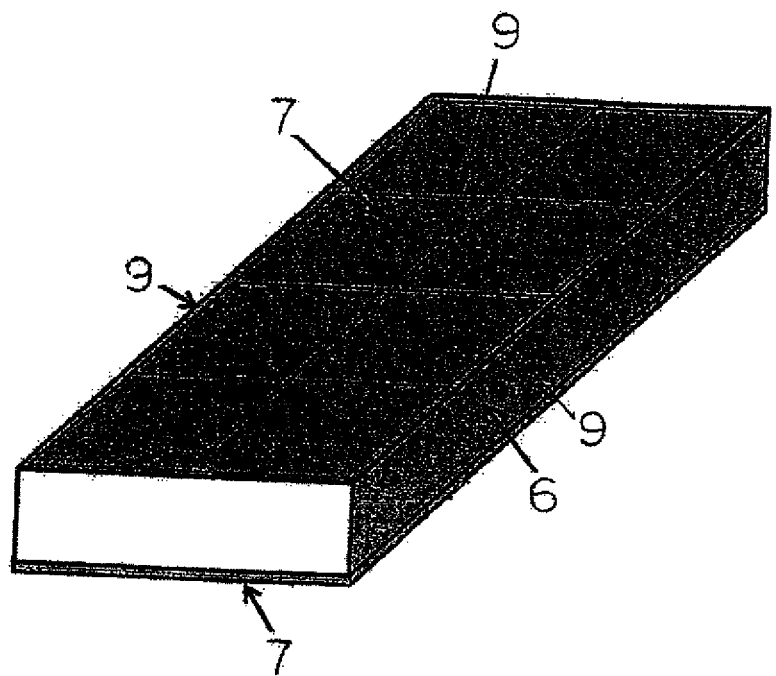
FIG. 3 is an explanatory drawing schematically illustrating that a rectangular titanium cast piece and a titanium sheet are bonded together by welding in a vacuum.
Figure 4:
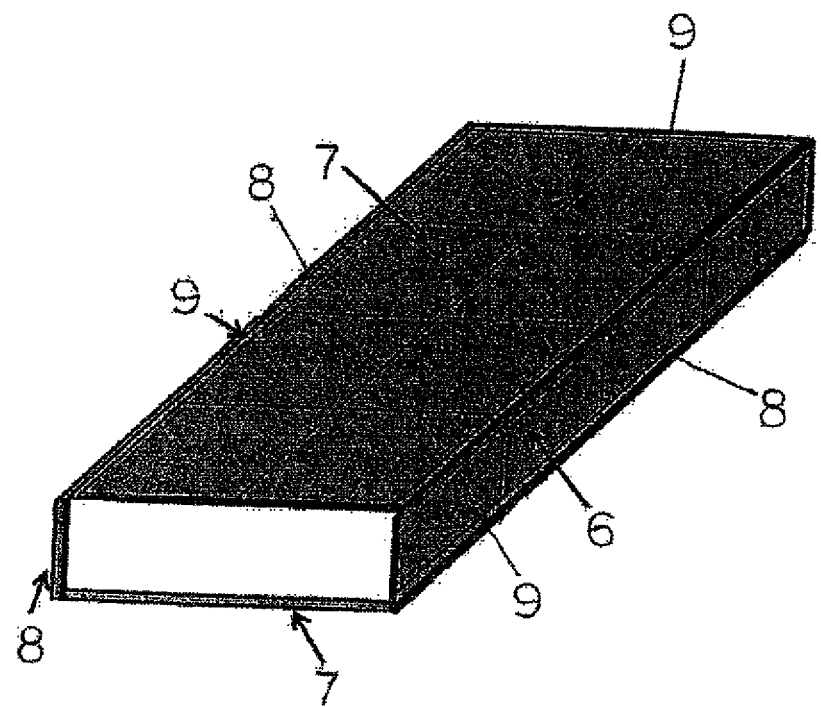
FIG. 4 is an explanatory drawing schematically illustrating that a rectangular titanium cast piece and a titanium sheet are bonded together by welding the titanium sheet to not only surfaces of the rectangular titanium cast piece but also to side faces thereof.

FIG. 3 is an explanatory drawing schematically illustrating that a base metal (rectangular titanium cast piece; slab) 6 and an outer layer material (titanium sheet) 7 are attached together by welding in vacuum. FIG. 4 is an explanatory drawing schematically illustrating that outer layer materials (titanium sheets) 7 and 8 are also attached by welding to side faces (faces other than rolling surfaces) and not only to surfaces (rolling surfaces) of the base metal (rectangular titanium cast piece; slab) 6.

In the present invention, as illustrated in FIGS. 3 and 4, after the titanium sheets 7 and 8 which contain alloying elements that exhibit characteristics are attached to the surfaces of the slab 6 that is the base metal, the outer layers of the titanium composite materials 1 and 2 are alloyed by being bound by a hot-rolled cladding method.

In the case of producing the titanium composite material 1 illustrated in FIG. 1, it is sufficient to attach the titanium sheet 7 to only one side of the slab 6 in vacuum as illustrated in FIG. 3, and the slab 6 may be subjected to hot rolling without attaching the titanium sheet 7 to the other one side thereof.

As illustrated in FIG. 4, as well as being attached to the one side of the slab 6, the titanium sheet 7 may also be attached to the other one side thereof. By this means, the occurrence of hot rolling defects in a hot rolling process as described above can be suppressed.

In addition, when producing the titanium composite material 2 shown in FIG. 2, it is sufficient to attach a sheet containing alloying elements to both rolling surfaces of the slab 6 as illustrated in FIG. 4.

Further, as illustrated in FIG. 4, with respect to both side faces of the slab 6 that serve as edge sides when performing hot rolling, similarly to the rolling surfaces, titanium sheets 8 of the same specifications may be attached and welded in vacuum to the side faces.

That is, during hot rolling, normally, the slab 6 is subjected to a rolling reduction, whereby at least a part of the side faces of the slab 6 goes around to a surface side of the hot-rolled sheet. Accordingly, if the micro-structure on the outer layer of the side faces of the slab 6 is coarse or many defects are present, there is a possibility that surface defects will arise on the surface close to both ends in the width direction of the hot-rolled sheet. Therefore, by also attaching and welding the titanium sheets 8 to the side faces of the slab 6 in vacuum, the occurrence of surface defects on the surface close to both ends in the width direction of the hot-rolled sheet can be effectively prevented.

Note that, although the amount by which each side face of the slab 6 goes around to the surface side during hot rolling differs depending on the production method, the amount is usually around 20 to 30 mm, and hence it is not necessary to attach the titanium sheet 8 to the whole area of the side face of the slab 6, and it is sufficient to attach the titanium sheet 8 at only a portion corresponding to the amount which goes around to the surface side that is calculated in accordance with the production method.

2-2. Outer Layer Material

When producing the titanium composite materials 1 and 2, in order to remove an oxidized layer formed by hot rolling, the titanium composite materials 1 and 2 are produced after undergoing a shot blasting and pickling process after hot rolling. However, if an outer layer that was formed by hot-rolled cladding is removed when performing this process, desired characteristics cannot be exhibited.

Further, if the thickness of the outer layers of the titanium composite materials 1 and 2 becomes too thin, the desired characteristics will not be exhibited as intended. On the other hand, if the thickness of the outer layers is too thick, the production cost will increase by a corresponding amount. Since it is good for the outer layers to have a thickness that conforms to the intended use of the titanium composite materials 1 and 2, it is not necessary to particularly limit the thickness of the titanium sheets 7 and 8 that are used as material, although preferably the titanium sheets 7 and 8 have a thickness that is within a range of 5 to 40% of the thickness of the slab 6.

A titanium sheet having a predetermined chemical composition that was described in the section relating to the outer layer of the titanium composite material is used as the outer layer material (titanium sheet). In particular, to suppress the occurrence of sheet ruptures during hot rolling, it is desirable that the chemical composition of the titanium sheet is based on the same composition as the aforementioned base metal, and is adjusted to a composition that, relative to the composition of the aforementioned base metal, further contains predetermined elements. Note that, in the case of a titanium sheet containing an alloying element that exhibits a neutron shielding property, attention should be given to the following point.

(e) Case of Containing Alloying Element Exhibiting Neutron Shielding Properties

A titanium alloy sheet containing a B content of 0.1% to not more than 3% is used as the outer layer material. That is, in order to suppress the occurrence of sheet ruptures during hot rolling, it is desirable that the chemical composition of the outer layer material is based on the same composition as the aforementioned base metal, and is adjusted to have a composition that, relative to the composition of the aforementioned base metal, further contains a B content of 0.1% to not more than 3%. Furthermore, to favorably maintain workability in hot/cold processing, a Ti-0.1 to 3% B alloy may be adopted as the outer layer material.

It is it is possible to produce this boron-containing titanium alloy sheet by adding B or a boride such as $TiB_2$ to titanium. Furthermore, if material containing 10B enriched boron ($^{10}B$ content is approximately 90% or more) such as $H_3{}^{10}BO_3$, $^{10}B_2O$ or $^{10}B_4C$ is used, since the titanium composite materials 1 and 2 will have a large neutron shielding effect even if the amount of B added to the outer layers 3 and 4 is small, the titanium alloy is extremely useful.

In the case of using $H_3{}^{10}BO_3$, $^{10}B_2O$ or $^{10}B_4C$, although H, O and C also concentrate in the alloy layer, the H does not constitute a problem since the H comes out from the material during a heat treatment such as vacuum annealing, and with respect to O and C, if the content of O is 0.4% or less and the content of C is 0.1% or less which are not more than the respective upper limits contained in commercially pure titanium, production can be performed without a problem.

2-3. Base Metal (Slab)

The commercially pure titanium or titanium alloy described in the section relating to the inner layer of the titanium composite material is used as a base metal. In particular, it is favorable to use a directly cast slab as the base metal. The directly cast slab may be a slab in which a melted resolidified layer is formed at least at one portion of the surface. Further, the directly cast slab may be a slab in which a melted resolidified layer is formed that has a chemical composition that is different from the chemical composition at a center of the sheet thickness of the directly cast slab, that is obtained by adding predetermined elements when performing a melting and resolidification process on the surface of the directly cast slab.

2-4. Weld Zone

After the titanium sheets containing alloying elements are attached to surfaces corresponding to rolling surfaces of the slab 6, at least the periphery is welded by means of a weld zone 9 inside a vacuum chamber to thereby seal the space between the slab 6 and the titanium sheets 7 and 8 in a vacuum and block external air and attach together the slab 6 and the titanium sheets 7 and 8. Weld zones that join the titanium sheets 7 and 8 to the slab 6 after being attached together, for example, as illustrated in FIGS. 3 and 4, weld the entire circumference so as to block off an interface between the slab 6 and the titanium sheets 7 and 8 from atmospheric air.

Because titanium is an active metal, a rigid passivation film forms on the surface if titanium is left to stand in atmospheric air. It is not possible to remove a concentrated oxidized layer of the aforementioned surface portion. However, unlike stainless steel or the like, because oxygen easily dissolves in titanium, if heated in a state in which the titanium is sealed in a vacuum and there is no supply of oxygen from outside, the oxygen on the surface will diffuse and dissolve inwardly, and hence the passivation film formed on the surface will disappear. Therefore, the slab 6 and the titanium sheets 7 and 8 on the surfaces thereof can be completely adhered together by the hot-rolled cladding method without inclusions or the like arising therebetween.

In addition, as the slab 6, if a slab is used as cast, surface defects that are caused by coarse grains that are formed during solidification will occur in a subsequent hot rolling process. In contrast, if the titanium sheets 7 and 8 are attached to rolling surfaces of the slab 6 as in the present invention, because the attached titanium sheets 7 have a fine micro-structure, the occurrence of surface defects in a hot rolling process can also be suppressed.

3. Method for Producing Titanium Material for Hot Rolling 3-1. Base Metal Production Method The base metal of the titanium material for hot rolling is generally produced by forming a slab that was obtained by breaking down an ingot into a billet shape, and thereafter subjecting the slab to cutting and finishing. Further, in recent years, in some cases a rectangular slab that can be directly subjected to hot rolling is produced when producing an ingot, and is provided for hot rolling. In a case where a slab is produced by a breakdown process, because the surface is made relatively flat by the breakdown process, it is easy for material containing alloying elements to disperse in a comparatively uniform manner, and it is easy to make the element distribution in an alloy phase uniform.

On the other hand, in a case where an ingot (directly cast slab) that was directly produced in the shape of material for hot rolling at the time of casting is used as the base metal, because a cutting and finishing process can be omitted, the titanium material can be produced at a lower cost. Further, after an ingot is produced, if a slab is used that is obtained after subjecting the surface of the ingot to cutting and finishing, the same effect as in a case where a slab is produced after undergoing a breakdown process can be expected. In the present invention, it is sufficient that an alloy layer can be stably formed at an outer layer, and the appropriate material may be selected in accordance with the circumstances.

For example, after assembling a slab and welding the periphery, preferably hot rolling is performed after heating the slab to 700 to 850° C. to perform joining rolling of 10 to 30% and thereafter heating for 3 to 10 hours at a temperature in the β region to cause components of the base metal to diffuse in a surface layer portion. This is because, by performing hot rolling at a temperature in the β region, deformation resistance is lowered and rolling can be easily performed.

A directly cast slab that is used as the base metal may be a slab in which a melted resolidified layer is formed at least at one portion of the surface. Further, the directly cast slab may be a slab in which a melted resolidified layer is formed that has a chemical composition that is different from the chemical composition at a center of a sheet thickness of the directly cast slab, that is obtained by adding predetermined elements when performing a melting and resolidification process on the surface of the directly cast slab. Hereunder, the melting and resolidification process will be described in detail.

Figure 5:
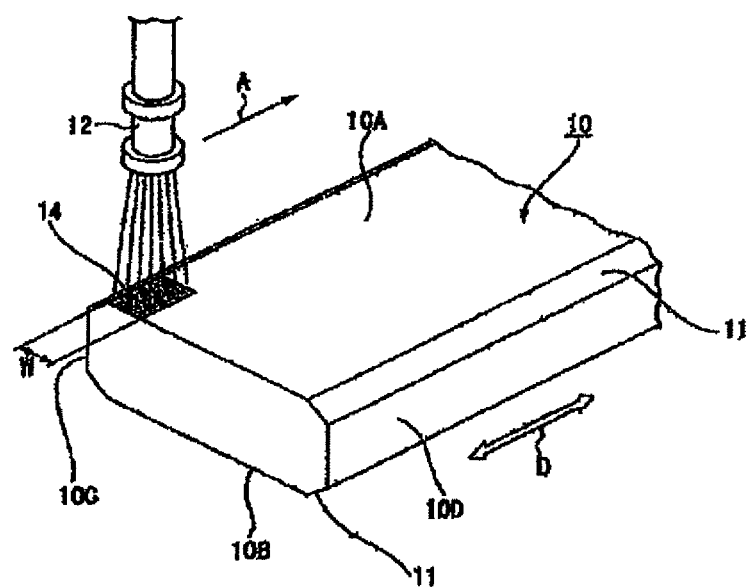
FIG. 5 is an explanatory drawing illustrating a method of melting and resolidifying.
Figure 6:
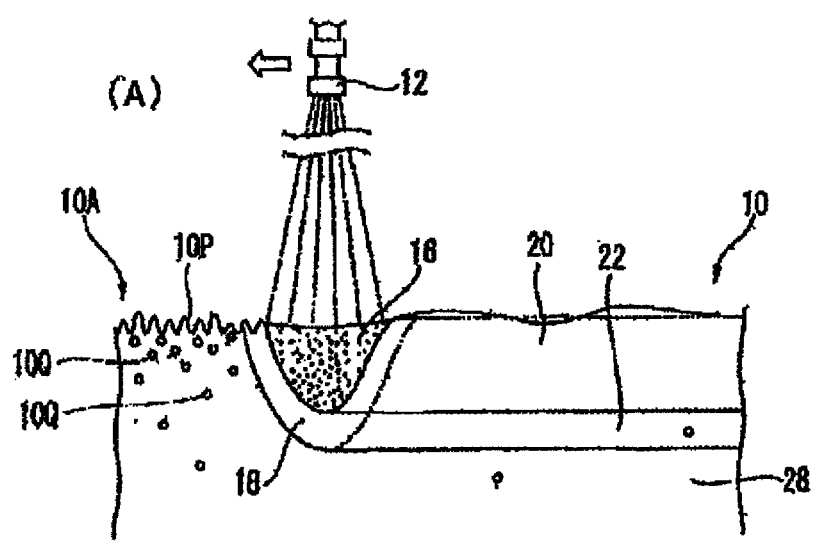
FIG. 6 is an explanatory drawing illustrating a method of melting and resolidifying.
Figure 7:
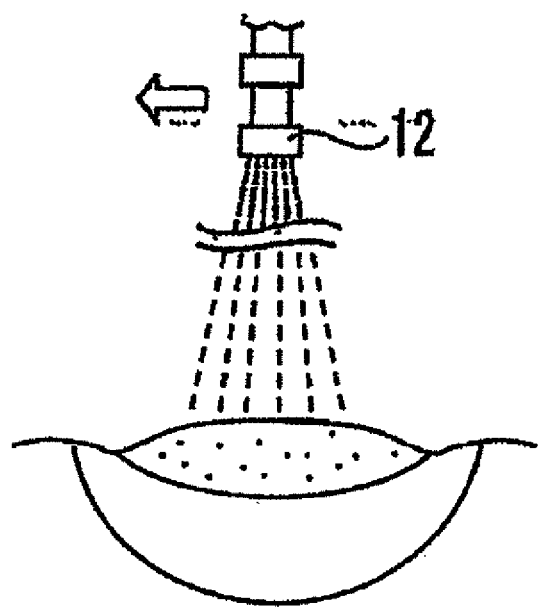
FIG. 7 is an explanatory drawing illustrating a method of melting and resolidifying.

FIGS. 5 to 7 are explanatory drawings that respectively illustrate a method of melting and resolidifying. Laser heating, plasma heating, induction heating, electron beam heating and the like are available as methods for melting and resolidifying the base metal surface of a titanium material for hot rolling, and any of these methods can be adopted for melting and resolidifying in the present invention. In particular, especially in the case of electron beam heating, since the heating is performed in a high vacuum, even if voids or the like are formed in the layer when performing the melting and resolidification process, because the process is performed in vacuum, the voids or the like can be made harmless by being pressed and integrated by rolling that is performed thereafter.

Furthermore, because the energy efficiency is high, even if a large area is processed, the surface can be melted deeply, and hence the method is particularly suited to production of a titanium composite material. The vacuum degree in the case of melting in vacuum is preferably higher than a vacuum degree of $3 \times 10^{-3}$ Torr or less. The number of times which the outer layer of the titanium material for hot rolling is subjected to melting and resolidification is not particularly limited. However, since the processing time lengthens and the cost increases as the number of times that melting and resolidification is performed increases, the number of times is preferably one or two times.

The method for melting and resolidifying the outer layer is carried out as illustrated in FIG. 5 in the case of a rectangular slab. That is, an electron beam is irradiated onto at least two surfaces 10A and 10B which are wide and which serve as rolling surfaces (surfaces that come in contact with the hot rolling rolls) in the hot rolling process among the outer surfaces of a rectangular slab 10, and only a surface layer on the relevant surfaces is melted. First, melting and resolidifying that is performed with respect to one surface 10A among the two surfaces 10A and 10B will be described.

In this case, as illustrated in FIG. 5, the area of an irradiation region 14 of the surface 10A of the rectangular cast piece 10 that is irradiated with an electron beam by one electron beam irradiation gun 12 is usually much smaller than the total area of the surface 10A that is to be irradiated, and therefore, in practice, it is usual to perform electron beam irradiation while continuously moving the electron beam irradiation gun 12 or continuously moving the rectangular cast piece 10. The shape and area of the irradiation region can be adjusted by adjusting the focus of the electron beam, or by using an electromagnetic lens to oscillate a small beam at a high frequency to form a beam flux.

The following description is given based on the assumption that the electron beam irradiation gun 12 is continuously moved as indicated by an arrow A in FIG. 5. Although the direction of movement of the electron beam irradiation gun is not particularly limited, in general the electron beam irradiation gun is continuously moved along the length direction (usually a casting direction D) or the width direction (usually a direction perpendicular to the casting direction D) of the rectangular cast piece 10 to thereby continuously irradiate, in a band shape, a width W (a diameter W in the case of a circular beam or a beam flux) of the aforementioned irradiation region 14. Further, an unirradiated band-shaped region adjacent to the irradiation region 14 is irradiated with an electron beam in a band shape while continuously moving the irradiation gun 12 in the opposite direction (or the same direction). Depending on the circumstances, a plurality of irradiation guns may be used to irradiate a plurality of regions with electron beams simultaneously. In FIG. 5, a case where a rectangular beam is continuously moved along the length direction (usually the casting direction D) of the rectangular cast piece 10 is illustrated.

When the surface of the rectangular titanium cast piece 10 (the surface 10A) is irradiated with an electron beam by such an outer layer heat treatment process to heat the surface so that the surface melts, as illustrated on the central left side in FIG. 6, the surface layer of the surface 10A of the rectangular titanium cast piece 10 is melted at the maximum to a depth that is in accordance with the heat input. However, as illustrated in FIG. 7, the depth from a direction perpendicular to the direction of electron beam irradiation is not uniform, and a downwardly convex curved shape in which a central portion of the electron beam irradiation is deepest and the thickness decreases toward the edge portion of the band shape is created.

Further, in a region on the inner side of the cast piece with respect to a melted layer 16 thereof also, the temperature is increased due to the thermal effect caused by electron beam irradiation, and a portion that reached a temperature that is not less than the β transformation point of pure titanium (a heat affected layer=HAZ layer) transforms to the β phase. The region that transformed to the β phase because of the thermal effect caused by electron beam irradiation in the outer layer heat treatment process in this way also becomes a downwardly convex curved shape similarly to the shape of the melted layer 16.

By performing melting and resolidification of the outer layer together with material that contains target alloying elements, the outer layer of the material for hot rolling can be alloyed and an alloy layer having a chemical composition that is different from the chemical composition of the base metal can be formed. One or more kinds of material among powder, chips, wire, thin film, machining chip, mesh and the like can be used as the material to be used at this time. With regard to the composition and amount of material to be arranged prior to melting, the composition and amount are determined so that the composition of an element concentrated region after being melted and solidified together with the material surface becomes a target composition.

However, if the amount of material that is added is too large, it causes segregation of alloying components. Further, if segregation of the alloying components occurs, the desired performance cannot be adequately exerted, or deterioration occurs prematurely. Therefore, it is important to make the amount of material a size such that melting of the alloy material ends while the region that is heated on the titanium base metal surface is in a melted state. Further, it is important to arrange the aforementioned alloy material evenly on the titanium base metal surface after taking into account the shape and width of a melted portion at a specific time. However, in the case of using an electron beam and continuously moving the irradiation position, because the melted portion is agitated while being continuously moved together with the melted titanium and alloy, the alloy material need not necessarily be arranged continuously. Furthermore, obviously the use of alloy material having a fusing point that is extremely higher than the fusing point of titanium must be avoided.

After the melting and resolidification process, it is good to maintain the resultant slab at a temperature in a range from 100° C. to less than 500° C. for not less than one hour. The reason is that, after melting and resolidification, if the slab is rapidly cooled there is a risk that fine cracks will occur in a surface layer portion due to strain during solidification. In a hot rolling process or a cold rolling process performed thereafter, there is a risk that the fine cracks will serve as the origin for peeling on the outer layer, and regions will arise in which the alloy layer is partially thin or the like, and the characteristics will deteriorate. Further, if the interior oxidizes due to fine cracks, it is necessary to remove the oxidization by a pickling process, in which case the thickness of the alloy layer will be further decreased. The occurrence of fine cracks in the surface can be suppressed by maintaining the slab at the aforementioned temperature. Further, at the aforementioned temperature, almost no atmospheric oxidation will occur even if the slab is maintained in atmosphere.

The titanium material for hot rolling can be produced by attaching titanium sheets containing predetermined alloying components to surfaces of a base metal having a surface layer portion formed by a melting and resolidification process.

3-2. Hot-Rolled Cladding Method

For the titanium material for hot rolling, it is favorable to use a hot-rolled cladding method to join the slab 6 and the titanium sheets 7 and 8 whose peripheries have been welded in advance.

As illustrated in FIGS. 3 and 4, after the titanium sheets 7 and 8 which contain alloying elements that exhibit characteristics are attached to the outer layers of the slab 6, the outer layers of the titanium composite material is alloyed by joining the titanium sheets 7 and 8 by the hot-rolled cladding method. That is, after the titanium sheet 7 containing alloying elements is attached to a surface corresponding to a rolling surface of the slab 6, at least the periphery is welded by means of the weld zone 9, preferably inside a vacuum chamber, to thereby seal the space between the slab 6 and the titanium sheet 7 in vacuum, and the titanium sheet 7 and the slab 6 are then attached together by rolling. The welding that attaches the titanium sheet 7 to the slab 6 is welding of the entire circumference so that atmospheric air does not enter between the slab 6 and the titanium sheet 7, as illustrated, for example, in FIGS. 3 and 4.

Because titanium is an active metal, a rigid passivation film forms on the surface if titanium is left to stand in the atmosphere. It is not possible to remove a concentrated oxidized layer of the aforementioned surface portion. However, unlike stainless steel or the like, because oxygen easily dissolves in titanium, if heated in a state in which the titanium is sealed in vacuum and there is no supply of oxygen from outside, the oxygen on the surface will diffuse and dissolve inwardly, and hence the passivation film formed on the surface will disappear. Therefore, the slab 6 and the titanium sheets 7 on the surface thereof can be completely adhered together by the hot-rolled cladding method without inclusions or the like arising therebetween.

In addition, as the slab 6, if a slab is used as cast, surface defects that are caused by coarse grains that are formed during solidification will occur in a subsequent hot rolling process. In contrast, if the titanium sheets 7 are attached to rolling surfaces of the slab 6 as in the present invention, because the attached titanium sheets 7 have a fine micro-structure, the occurrence of surface defects in a hot rolling process can also be suppressed.

As illustrated in FIG. 3, the titanium sheet 7 may be attached to both sides of the slab 6, and not just to one side thereof. By this means, the occurrence of hot rolling defects in a hot rolling process as described above can be suppressed. During hot rolling, normally, the slab 6 is subjected to a rolling reduction, whereby at least a part of the side faces of the slab 6 goes around to a surface side of the hot-rolled sheet. Accordingly, if the micro-structure on the outer layer of the side faces of the slab 6 is coarse or many defects are present, there is a possibility that surface defects will arise on the surface close to both ends in the width direction of the hot-rolled sheet. Therefore, as illustrated in FIG. 4, similarly to the rolling surfaces, it is favorable to also attach and weld the titanium sheets 8 of the same specifications to the side faces of the slab 6 that serve as edge sides during hot rolling. By this means, the occurrence of surface defects on the surface close to both ends in the width direction of the hot-rolled sheet can be effectively prevented. Preferably, this welding is performed in vacuum.

Note that, although the amount by which each side face of the slab 6 goes around to the surface side during hot rolling differs depending on the production method, the amount is usually around 20 to 30 mm, and hence it is not necessary to attach the titanium sheets 8 to the whole area of the side faces of the slab 6, and it is sufficient to attach the titanium sheets 8 at only portions corresponding to the amount which goes around to the surface side that is calculated in accordance with the production method. By performing high-temperature annealing for an extended time period after hot rolling, components originating from the base metal can be caused to be contained within the titanium composite material. For example, a heat treatment for 30 hours at 700 to 900° C. may be mentioned as an example of the high-temperature annealing for an extended time period.

Methods for welding the slab 6 and the titanium sheets 7 and 8 in vacuum include electron beam welding and plasma welding. In particular, because electron beam welding can be performed under a high vacuum, electron beam welding is desirable since a high vacuum can be achieved between the slab 6 and the titanium sheets 7 and 8. It is desirable that the vacuum degree when welding the titanium sheets 7 and 8 in vacuum is a higher vacuum degree than $3 \times 10^{-3}$ Torr or less.

Note that, welding of the slab 6 and the titanium sheet 7 need not necessarily be performed in a vacuum chamber, and for example a method may be adopted in which vacuum suction holes are provided within the titanium sheet 7 in advance, and after the titanium sheet 7 is superimposed on the slab 6, the slab 6 and the titanium sheet 7 are welded while evacuating the space between the slab 6 and the titanium sheet 7 using the vacuum suction holes, and the vacuum suction holes are then sealed after welding.

In the case of forming alloy layers at outer layers of the titanium composite materials 1 and 2 by hot-rolled cladding using the titanium sheets 7 and 8 having the target alloying elements on the surface of the slab 6 as cladding, the thickness and chemical composition of the outer layer depends on the thickness of the titanium sheets 7 and 8 prior to attaching as well as the distribution of the alloying elements. Naturally, when producing the titanium sheets 7 and 8, because an annealing treatment is performed in a vacuum atmosphere or the like to obtain strength and ductility that are ultimately required, diffusion arises at an interface, and a concentration gradient in the depth direction arises in the vicinity of the interface.

However, a diffusion distance with respect to elements that are diffused in a final annealing process is around several μm, and it is not the case that the entire thickness of the alloy layer diffuses, and there is no particular influence on the concentration of alloying elements in the vicinity of the outer layer that are important for exhibiting characteristics.

Therefore, uniformity of alloying components over the entire titanium sheets 7 and 8 leads to the stable exhibition of characteristics. In the case of hot-rolled cladding, since it is possible to use titanium sheets 7 and 8 that were produced as end products, the sheet thickness will be accurate and segregation of alloying components is easy to control, and it is possible to produce the titanium composite materials 1 and 2 including outer layers that have a uniform thickness and chemical composition after production, and thus stable characteristics can be exhibited.

Further, as described above, because inclusions do not arise between the outer layers and the inner layer 5 of the titanium composite materials 1 and 2, apart from an advantageous effect with respect to adhesiveness, inclusions also do not become the origin of cracks, fatigue or the like.

3. Method for Producing Titanium Composite Material

It is important that an alloy layer formed by attaching a titanium sheet onto the slab surface is allowed to remain as an end product, and it is necessary to suppress as much as possible the removal of the surface layer due to scale loss or surface defects. Specifically, the techniques for a hot rolling process described hereunder are achieved by optimizing and appropriately adopting the techniques in consideration of the characteristics and capabilities of the facilities to be used for production.

4-1. Heating Process

Although scale loss can be suppressed to a low amount by performing low-temperature, short-time heating when heating the material for hot rolling, the thermal conduction of the titanium material is small and there is the drawback that cracks are liable to occur if hot rolling is performed when the inside of the slab is in a low temperature state, and hence the heating process is optimized so as to suppress to a minimum the occurrence of scale in accordance with the performance and characteristics of the heating furnace to be used.

4-2. Hot Rolling Process

In the hot rolling process also, if the surface temperature is too high a large amount of scale will be generated when passing the sheet through the hot rolling process, and scale loss is large. On the other hand, if the surface temperature is too low, although scale loss decreases, surface defects are liable to occur, and hence it is necessary to remove the surface defects by pickling in a subsequent process, and accordingly it is desirable to perform hot rolling in a temperature range that can suppress the occurrence of surface defects. Therefore, it is desirable to perform rolling in an optimal temperature range. Further, because the surface temperature of the titanium material decreases during rolling, it is desirable to minimize roll cooling during rolling and thereby suppress a decrease in the surface temperature of the titanium material.

4-3. Pickling Process

Because an oxidized layer exists at the surface of the hot-rolled sheet, there is a process for descaling that removes the oxidized layer in a subsequent process. Generally, an oxidized layer is removed from titanium mainly by pickling using a nitric-hydrofluoric acid solution after shot blasting. Further, depending on the situation, the surface may be subjected to grinding with a grindstone after pickling. It is sufficient that the resulting structure after descaling has a two-layer or three-layer structure consisting of an inner layer and outer layer originating from a surface layer portion and the base metal of the titanium material for hot rolling.

Because scale that is generated in the hot rolling process is thick, normally, as preparation for a pickling treatment, a shot blasting treatment is performed to remove part of the scale on the surface and simultaneously cause cracks to form on the surface, and in a pickling process thereafter a solution is caused to infiltrate into the cracks to remove scale that also includes part of the base metal. At this time, it is important to perform a blasting treatment that is sufficiently weak so as not to generate cracks in the base metal surface, and it is necessary to select optimal blasting conditions in accordance with the chemical composition of the titanium material surface. Specifically, conditions such that cracks do not arise in the base metal are selected by, for example, selection of appropriate blast media and optimizing the projection velocity (can be adjusted using the rotational speed of the impeller). Since optimization of these conditions differs depending on the characteristics of the titanium sheet attached to the slab surface, it is good to determine respective optimal conditions for the different characteristics in advance.

Hereunder, the present invention is described specifically by way of examples, although the present invention is not limited to these examples.

EXAMPLE 1

Example 1-1

Rectangular slabs consisting of commercially pure titanium of JIS Class 1 were prepared by (a) vacuum arc remelting and breakdown and forging (VAR+breakdown and forging), (b) electron beam remelting and direct casting (EBR+DC), or (c) plasma arc melting and direct casting (PAR+DC) to form slabs 6 as illustrated in FIGS. 3 and 4. The thickness of each slab 6 was 100 mm or 250 mm.

A commercially alloy sheet composed of Ti-0.06% Pd (ASTM Grade 17) was used for the titanium alloy sheets 7 to be attached to the surfaces of the respective slabs 6. Note that, to make the thickness of the outer layers 3 and 4 of the titanium composite material 2 to be produced that is illustrated in FIG. 2 a predetermined thickness, the thickness of the titanium alloy sheets 7 was adjusted in advance by cutting before being joined to the respective slabs 6.

When joining the titanium alloy sheets 7 to the respective slabs 6, the titanium alloy sheets 7 were attached to surfaces corresponding to rolling surfaces of the slabs 6, and thereafter the periphery was subjected to electron beam (EB) welding in a vacuum chamber to form the weld zone 9. The vacuum degree at the time of the EB welding was not more than $3 \times 10^{-3}$ Torr. Note that in some of the slabs 6, the titanium alloy sheets 7 were also joined to surfaces corresponding to side faces.

The respective slabs 6 to which the titanium alloy sheets 7 were bound were heated to 850° C. in atmosphere and thereafter subjected to hot rolling, and after being formed into a hot-rolled clad sheet having a thickness of approximately 5 mm, the front and back surfaces were each subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 700° C. in vacuum or in an inert gas atmosphere and holding at that temperature for 240 minutes was performed to thereby produce the titanium composite material 2.

A test specimen with dimensions of 1 mm×30 mm×40 mm (thickness×width×length) was cut out from the titanium composite material 1, the cut surface and faces to which a corrosion-resistant titanium alloy sheet was not stuck to were covered with a corrosion prevention tape so as not to be exposed to a corrosive environment, and thereafter the test specimen was immersed for 96 hours in a 3% boiling hydrochloric acid solution (pH≈0 at normal temperature), and the corrosion rate was then calculated based on the change in weight between before and after the corrosion test.

To enable cross-sectional observation, the produced titanium composite material 1 was embedded in resin and subjected to polishing and etching, and thereafter was observed with an optical microscope and the thickness of the outer layers 3 and 4 was measured. The measured thickness of the outer layers 3 and 4 was divided by the overall thickness of the titanium composite material 1, and the calculated value was taken as an outer layer occupancy ratio.

For comparison with the titanium composite material 1 according to the present invention, a similar test was performed using 1-mm sheets composed of a commercially pure titanium (JIS Class 1) and a corrosion resistant titanium alloy (Ti-0.06% Pd, ASTM Grade 17).

A summary of the results of the above test is shown in Table 2.

TABLE 2

| Test Number | Slab Type | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
|---|---|---|---|---|---|---|
| Conventional Material 1 | JIS Class 1 | — | — | — | 4.12 | VAR + breakdown and forging slab; commercially product |
| Conventional Material 2 | ASTM Gr17 | — | 100 | — | 0.37 | VAR + breakdown and forging slab; commercially product |
| Inventive Example 1 | JIS Class 1 | 309 | 30.9 | 7.0 | 0.36 | EBR + DC stab |
| Inventive Example 2 | JIS Class 1 | 102 | 10.2 | 5.0 | 0.37 | EBR + DC slab |
| Inventive Example 3 | JIS Class 1 | 55 | 5.5 | 5.0 | 0.35 | EBR + DC slab |
| Inventive Example 4 | JIS Class 1 | 8.8 | 0.88 | 1.0 | 0.35 | EBR + DC slab |
| Inventive Example 5 | JIS Class 1 | 2.1 | 0.21 | 0.6 | 0.35 | EBR + DC slab |
| Comparative Example 1 | JIS Class 1 | <u>0.8</u> | 0.08 | <u>0.1</u> | 3.89 | EBR + DC slab |
| Inventive Example 6 | JIS Class 1 | 55 | 5.5 | 3.0 | 0.35 | EBR + DC slab, also attached to side faces |
| Inventive Example 7 | JIS Class 1 | 55 | 5.5 | 4.0 | 0.35 | PAR + DC slab |
| Inventive Example 8 | JIS Class 1 | 55 | 5.5 | 1.0 | 0.35 | VAR + breakdown and forging slab |
| Inventive Example 9 | JIS Class 1 | 55 | 5.5 | 9.0 | 0.37 | EBR + DC slab, attached to one side |

Conventional materials 1 and 2 were a pure titanium material (JIS Class 1) and a corrosion-resistant titanium material (Ti-0.06Pd, ASTM Grade 17) which are commercially that are produced through melting, breakdown and forging processes, and the results for these conventional materials 1 and 2 were adopted as benchmarks for the titanium composite material of the present invention that is described later.

Inventive Examples 1 to 9 of the present invention each exhibited superior corrosion resistance to conventional material 1, and had corrosion resistance equal to the corrosion resistance of the commercially corrosion-resistant titanium material produced through melting, breakdown and forging processes that is shown as conventional material 2.

At this time, the method of producing the slabs 6 as the material did not affect the corrosion resistance of the titanium composite material of the Inventive Examples 1 to 9 of the present invention, and the titanium composite material 1 that was excellent in corrosion resistance could be produced using any of the slabs 6.

In Comparative Example 1, the outer layer thickness and the intermediate layer were thin, and cracks partially occurred in the hot-rolled sheet, and furthermore, because the outer layer thickness was a thin thickness of 2 μm or less, the corrosion resistance was inferior to the corrosion resistance of the corrosion resistant titanium alloy of conventional material 2, and the corrosion rate was of the same level as the corrosion rate of conventional material 1.

Example 1-2

Rectangular slabs consisting of commercially pure titanium of JIS Class 1 were prepared by electron beam remelting and direct casting to form slabs 6 as illustrated in FIG. 4. The thickness of each slab 6 was 100 mm or 200 mm. Material having the same chemical composition as the target chemical composition for the outer layers 3 and 4 of the titanium composite material 2 to be produced was used for the titanium alloy sheets 7 to be attached to the surface of the slab 6.

Using the same method as in Example 1-1, welding, hot rolling and pickling of the slab 6 and titanium alloy sheets 7 were performed to thereby produce the titanium composite material 2 having a thickness of 5 mm. The method for evaluating the titanium composite material was the same as in Example 1-1.

Further, for the purpose of comparison with the titanium composite material 2 according to the present invention, corrosion-resistant titanium materials (ASTM Grade 7, Grade 17, Grade 19) and a sheet having a thickness of 5 mm composed of commercially pure titanium (JIS Class 1) for use as benchmarks were subjected to evaluation tests together with the titanium composite material 2 according to the present invention. Table 3 shows a summary of the results.

TABLE 3

| Test Number | Slab Type | Composition of Surface layer Portion (mass %) | | | | Outer Layer Thickness (µm) | Outer Layer Occupancy Ratio (%) | Intermediate Layer Thickness (µm) | Corrosion Rate (mm/year) 3% Boiling Hydrochloric Acid Solution | Remarks |
|---|---|---|---|---|---|---|---|---|---|---|
| | | Platinum Group Element(s) | Rare Earth Element | Co | Ni | | | | | |
| Conventional Material 3 | ASTM Gr17 | Pd: 0.06 | — | <0.01 | — | — | 100 | — | 0.36 | VAR + breakdown and forging slab; commercially product |
| Conventional Material 4 | ASTM Gr19 | Pd: 0.06 | — | 0.31 | — | — | 100 | — | 0.22 | VAR + breakdown and forging slab; commercially product |
| Conventional Material 5 | ASTM Gr7 | Pd: 0.14 | — | — | — | — | 100 | — | 0.04 | VAR + breakdown and forging slab; commercially product |
| Conventional Material 6 | JIS Class 1 | — | — | — | — | — | — | — | 4.15 | VAR + breakdown and forging slab; commercially product |
| Inventive Example 10 | JIS Class 1 | Pd: 0.25 | — | — | — | 195 | 5.5 | 3.0 | 0.02 | EBR + DC slab |
| Inventive Example 11 | JIS Class 1 | Pd: 0.14 | — | — | — | 165 | 4.9 | 7.0 | 0.04 | EBR + DC slab |
| Inventive Example 12 | JIS Class 1 | Pd: 0.06 | — | — | — | 200 | 5.6 | 5.0 | 0.37 | EBR + DC slab |
| Inventive Example 13 | JIS Class 1 | Pd: 0.02 | — | — | — | 205 | 5.7 | 4.0 | 0.69 | EBR + DC slab |
| Inventive Example 14 | JIS Class 1 | Pd: 0.01, Ru: 0.03 | — | — | — | 195 | 5.5 | 5.0 | 0.39 | EBR + DC slab |
| Inventive Example 15 | JIS Class 1 | Pd: 0.06 | — | 0.30 | — | 200 | 5.6 | 5.0 | 0.21 | EBR + DC slab |
| Inventive Example 16 | JIS Class 1 | Pd: 0.02 | — | 0.80 | — | 190 | 5.4 | 3.0 | 0.15 | EBR + DC slab |
| Comparative Example 2 | JIS Class 1 | Pd: 0.02 | Y: 0.25 | — | — | 230 | 6.2 | 0.3 | 0.45 | EBR + DC slab |
| Inventive Example 17 | JIS Class 1 | Pd: 0.02 | Y: 0.19 | — | — | 230 | 6.2 | 1.0 | 0.40 | EBR + DC slab |
| Inventive Example 18 | JIS Class 1 | Pd: 0.01 | Y: 0.02 | — | — | 215 | 5.9 | 1.0 | 0.28 | EBR + DC slab |
| Inventive Example 19 | JIS Class 1 | Pd: 0.02 | Y: 0.003 | — | — | 190 | 5.4 | 3.0 | 0.29 | EBR + DC slab |
| Inventive Example 20 | JIS Class 1 | Pd: 0.03 | Dy: 0.10 | — | — | 205 | 5.7 | 4.0 | 0.22 | EBR + DC slab |
| Inventive Example 21 | JIS Class 1 | Pd: 0.03 | La: 0.08 | — | — | 210 | 5.8 | 10.0 | 0.24 | EBR + DC slab |
| Inventive Example 22 | JIS Class 1 | Pd: 0.03 | Di: 0.04 | — | — | 215 | 5.9 | 7.0 | 0.23 | EBR + DC slab |
| Inventive Example 23 | JIS Class 1 | Pd: 0.03 | Pr: 0.04 | — | — | 200 | 5.6 | 5.0 | 0.22 | EBR + DC slab |

TABLE 3-continued

| Test Number | Slab Type | Composition of Surface layer Portion (mass %) | | | | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
|---|---|---|---|---|---|---|---|---|---|---|
| | | Platinum Group Element(s) | Rare Earth Element | Co | Ni | | | | | |
| Inventive Example 24 | JIS Class 1 | Pd: 0.02 | Ce: 0.09 | — | — | 215 | 5.9 | 1.0 | 0.23 | EBR + DC slab |
| Inventive Example 25 | JIS Class 1 | Pd: 0.02 | Mm: 0.05 | — | — | 215 | 5.9 | 11.0 | 0.24 | EBR + DC slab |
| Inventive Example 26 | JIS Class 1 | Ru: 0.04 | Y: 0.02 | — | — | 180 | 5.2 | 15.0 | 0.25 | EBR + DC slab |
| Inventive Example 27 | JIS Class 1 | Pd: 0.02 | Nd: 0.05 | 0.21 | — | 230 | 6.2 | 3.0 | 0.19 | EBR + DC slab |
| Inventive Example 28 | JIS Class 1 | Pd: 0.01 | Sm: 0.06 | 0.30 | — | 225 | 6.1 | 7.0 | 0.21 | EBR + DC slab |
| Inventive Example 29 | JIS Class 1 | Ru: 0.05 | — | — | 0.50 | 210 | 5.8 | 9.0 | 0.31 | EBR + DC slab |
| Inventive Example 30 | JIS Class 1 | Ru: 0.05 | — | — | 0.20 | 195 | 5.5 | 10.0 | 0.42 | EBR + DC slab |
| Inventive Example 31 | JIS Class 1 | Ru: 0.04 | Y: 0.02 | — | 0.30 | 210 | 5.8 | 11.0 | 0.30 | EBR + DC slab |
| Inventive Example 32 | JIS Class 1 | Pd: 0.02 | — | 0.30 | 0.19 | 230 | 6.2 | 5.0 | 0.24 | EBR + DC slab |
| Inventive Example 33 | JIS Class 1 | Pd: 0.02 | Y: 0.02 | 0.20 | 0.20 | 240 | 6.4 | 5.0 | 0.18 | EBR + DC slab |

Conventional materials 3 to 5 were commercially corrosion-resistant titanium materials produced through melting, breakdown and forging processes, and conventional material 6 was a commercially pure titanium material (JIS Class 1) produced through melting, breakdown and forging processes. The results for these conventional materials 3 to 6 were adopted as benchmarks for the titanium composite material of the present invention that is described later.

Inventive Examples 10 to 33 of the present invention are each had corrosion resistance equal to the corrosion resistance of the commercially corrosion-resistant titanium materials produced through melting, breakdown and forging processes that are shown as conventional materials 3 to 5, and also exhibited superior corrosion resistance to the corrosion resistance of the commercially pure titanium material produced through melting, breakdown and forging processes that is shown as conventional material 6.

Inventive Examples 10 to 13 of the present invention were provided with excellent corrosion resistance as a result of Pd that is a platinum group element being contained in the titanium alloy of the surface layer portions 3 and 4.

Inventive Example 14 of the present invention was provided with excellent corrosion resistance as a result of Pd and Ru that are platinum group elements being contained in the titanium alloy of the surface layer portions 3 and 4.

Inventive Examples 15 and 16 of the present invention were provided with excellent corrosion resistance as a result of Co being contained in the titanium alloy of the surface layer portions 3 and 4 in addition to Pd that is a platinum group element.

In Comparative Example 2, because the intermediate layer was thin and cracks partially occurred in the hot-rolled sheet and the pure titanium of the intermediate layer was exposed, the corrosion resistance deteriorated even though Comparative Example 2 contained a large amount of Y.

Inventive Examples 17 to 26 of the present invention were provided with excellent corrosion resistance as a result of Y, Dy, La, didymium, Pr, Ce or Mm that are rare earth elements being contained in the titanium alloy of the surface layer portions 3 and 4 in addition to Pd or Ru that are platinum group elements.

Inventive Examples 27 and 28 of the present invention were provided with excellent corrosion resistance as a result of Nd or Sm that are rare earth elements and furthermore Co being contained in the titanium alloy of the surface layer portions 3 and 4 in addition to Pd that is a platinum group element.

Inventive Examples 29 and 30 of the present invention were provided with excellent corrosion resistance as a result of Ni being contained in the titanium alloy of the surface layer portions 3 and 4 in addition to Ru that is a platinum group element.

Inventive Example 31 of the present invention was provided with excellent corrosion resistance as a result of Y that is a rare earth element and furthermore Ni being contained in the titanium alloy of the surface layer portions 3 and 4 in addition to Pd that is a platinum group element.

Inventive Example 32 of the present invention was provided with excellent corrosion resistance as a result of Co and Ni being contained in the surface layer portion titanium alloy in addition to Pd that is a platinum group element.

Inventive Example 33 of the present invention was provided with excellent corrosion resistance as a result of Y that is a rare earth element and furthermore Co and Ni being added in addition to Pd that is a platinum group element in the surface layer portion titanium alloy.

Example 1-3

Rectangular slabs containing predetermined alloying components were prepared by vacuum arc remelting and breakdown and forging (VAR+breakdown and forging) to form the slabs 6 illustrated in FIG. 4. The thickness of each slab 6 was 200 mm. A commercially alloy sheet composed of Ti-0.06% Pd (ASTM Grade 17) was used for the titanium alloy sheets 7 to be attached to the surfaces of the respective slabs 6.

Using the same method as in the above Example 1-2, welding, hot rolling and pickling of the slab 6 and titanium alloy sheets 7 were performed to thereby produce the titanium composite material 2. The method for evaluating the titanium composite material 1 was the same as in Examples 1-1 and 1-2. Table 4 shows a summary of the results.

TABLE 4

| Test Number | Slab Type | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
| --- | --- | --- | --- | --- | --- | --- |
| Conventional Material 3 | ASTM Gr17 | — | 100 | — | 0.36 | VAR + breakdown and forging slab; commercially product |
| Conventional Material 6 | JIS Class 1 | — | — | — | 4.15 | VAR + breakdown and forging slab; commercially product |
| Conventional Material 7 | JIS Class 2 | — | — | — | 4.26 | VAR + breakdown and forging slab; commercially product |
| Conventional Material 8 | JIS Class 3 | — | — | — | 4.31 | VAR + breakdown and forging slab; commercially product |
| Conventional Material 9 | JIS Class 4 | — | — | — | 4.33 | VAR + breakdown and forging slab; commercially product |
| Inventive Example 34 | JIS Class 1 | 200 | 5.6 | 10.0 | 0.37 | VAR + breakdown and forging slab |
| Inventive Example 35 | JIS Class 2 | 220 | 6.0 | 7.0 | 0.35 | VAR + breakdown and forging slab |
| Inventive Example 36 | JIS Class 3 | 230 | 6.2 | 5.0 | 0.36 | VAR + breakdown and forging slab |
| Inventive Example 37 | JIS Class 4 | 255 | 6.7 | 1.0 | 0.34 | VAR + breakdown and forging slab |

TABLE 4-continued

| Test Number | Slab Type | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
|---|---|---|---|---|---|---|
| Inventive Example 38 | Ti—1.0Cu | 220 | 6.0 | 11.0 | 0.36 | VAR + breakdown and forging slab |
| Inventive Example 39 | Ti—1.0Cu—1.0Sn | 230 | 6.2 | 15.0 | 0.35 | VAR + breakdown and forging slab |
| Inventive Example 40 | Ti—0.5Al | 220 | 6.0 | 3.0 | 0.45 | VAR + breakdown and forging slab |
| Inventive Example 41 | Ti—0.9Al | 240 | 6.4 | 7.0 | 0.54 | VAR + breakdown and forging slab |
| Inventive Example 42 | Ti—3Al—2.5V | 270 | 7.0 | 9.0 | 0.41 | VAR + breakdown and forging slab |
| Inventive Example 43 | Ti—1Fe—0.35O | 230 | 6.2 | 10.0 | 0.34 | VAR + breakdown and forging slab |
| Inventive Example 44 | Ti—1.5Fe—0.5O | 260 | 6.8 | 11.0 | 0.33 | VAR + breakdown and forging slab |
| Inventive Example 45 | Ti—0.5Cu | 215 | 5.9 | 5.0 | 0.36 | VAR + breakdown and forging slab |
| Inventive Example 46 | Ti—5Al—1Fe | 295 | 7.5 | 10.0 | 0.40 | VAR + breakdown and forging slab |
| Inventive Example 47 | Ti—6Al—4V | 310 | 7.8 | 10.0 | 0.36 | VAR + breakdown and forging slab |
| Inventive Example 48 | Ti—20V—4Al—1Sn | 195 | 5.5 | 10.0 | 0.35 | VAR + breakdown and forging slab |
| Inventive Example 49 | Ti—15V—3Al—3Cr—3Sn | 200 | 5.6 | 10.0 | 0.32 | VAR + breakdown and forging slab |

Conventional material 3 was a commercially corrosion-resistant titanium material (Ti-0.06Pd, ASTM Grade 17) produced through melting, breakdown and forging processes, and conventional materials 6 to 9 were commercially pure titanium materials (JIS Classes 1 to 4) produced through melting, breakdown and forging processes. These conventional materials were adopted as benchmarks for the titanium composite material of the present invention that is described later.

Inventive Examples 34 to 49 of the present invention were titanium composite materials produced using a titanium alloy as a base metal slab, in which excellent corrosion resistance was obtained which was of the same level as the corrosion resistance of conventional material 3 that was a commercially corrosion-resistant titanium material produced through melting, breakdown and forging processes, and also having the same chemical composition as the titanium alloy layer of surface layer portions 3 and 4.

Further, in the titanium composite material for which pure titanium was used as the base metal of Inventive Examples 34 to 37 of the present invention, a Pd-containing alloy layer was formed in a surface layer portion, and as a result the titanium composite materials of Inventive Examples 34 to 37 had superior corrosion resistance in comparison to the pure titanium materials of conventional materials 6 to 9 that were produced through melting, breakdown and forging processes.

Example 1-4

Rectangular slabs composed of pure titanium of JIS Class 1 were prepared by vacuum arc remelting and breakdown and forging (VAR+breakdown and forging), electron beam remelting and direct casting (EBR+DC), or plasma arc melting and direct casting (PAR+DC), and adopted as starting material. The thickness of each rectangular slab was 35 to 250 mm.

Pd powder (machining dust or chips) was arranged on the slab surface so that a melting and resolidification region of the outer layer became Ti-0.06Pd, and the outer layer of the slab was subjected to a melting and resolidification process using an electron beam under a vacuum atmosphere. After the melting and resolidification process, except for one portion of the material, control was performed so as to maintain the material for one hour or more in a state in which the surface temperature was in a range of 100° C. to less than 500° C. The material whose outer layer had undergone the melting and resolidification process was heated to 850° C. in atmosphere, and thereafter was subjected to hot rolling to form a hot-rolled sheet having a thickness of approximately 5 mm. Thereafter, the front and back surfaces were each subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 750° C. in vacuum or in an inert gas atmosphere and holding at that temperature for 240 minutes was performed to thereby produce the specimen of the present invention. A test specimen with dimensions of 1 mm×30 mm×40 mm (thickness×width×length) was cut out from the specimen, the cut surface and faces to which a corrosion-resistant titanium alloy sheet was not stuck were covered with a corrosion prevention tape so as not to be exposed to a corrosive environment, and thereafter the test specimen was immersed for 96 hours in a 3% boiling hydrochloric acid solution (pH≈0 at normal temperature), and the corrosion rate was then calculated based on the change in weight between before and after the corrosion test.

Further, to enable cross-sectional observation, the produced titanium material was embedded in resin and subjected to polishing and etching, and thereafter was observed with an optical microscope and the thickness of the outer layers was measured. The measured thickness of the outer layers was divided by the overall thickness of the titanium material, and the calculated value was taken as the outer layer occupancy ratio.

In addition, with respect to the alloying element concentration of the outer layers 3 and 4, line analysis was performed using EPMA, and the alloying element concentration was determined as the average value of measurement results in a range from the surface to the lower end of the alloy layer.

For comparison with the titanium material of the present invention, the aforementioned corrosion test was performed using 1-mm sheets composed of a commercially pure titanium (JIS Class 1) and a corrosion resistant titanium alloy (Ti-0.06% Pd, ASTM Grade 17). Table 5 shows a summary of the results of the tests.

TABLE 5

| Test Number | Slab Type | Surface layer Portion Thickness (mm) | Temperature Maintained After Surface Melting and Resolidification Process | Surface layer Portion Pd Concentration (mass %) | Outer Layer Thickness (μm) | Outer Layer Occupancy Ratio (%) | Intermediate Layer Thickness (μm) |
|---|---|---|---|---|---|---|---|
| Conventional Material 1 | JIS Class 1 | — | — | — | — | — | — |
| Conventional Material 2 | ASTM Gr.17 | — | — | 0.06 | — | — | — |
| Inventive Example 50 | JIS Class 1 | 15.0 | Yes | 0.06 | 428 | 42.8 | 9.0 |
| Inventive Example 51 | JIS Class 1 | 15.0 | Yes | 0.06 | 298 | 29.8 | 9.0 |
| Inventive Example 52 | JIS Class 1 | 15.0 | Yes | 0.06 | 146 | 14.6 | 2.0 |
| Inventive Example 53 | JIS Class 1 | 15.0 | Yes | 0.06 | 70 | 7.0 | 3.0 |
| Inventive Example 54 | JIS Class 1 | 8.0 | Yes | 0.06 | 26 | 2.6 | 2.0 |
| Inventive Example 55 | JIS Class 1 | 2.1 | Yes | 0.06 | 2.4 | 0.2 | 2.0 |
| Inventive Example 56 | JIS Class 1 | 11.3 | Yes | 0.06 | 39 | 3.9 | 6.0 |
| Inventive Example 57 | JIS Class 1 | 10.8 | Yes | 0.07 | 37 | 3.7 | 5.0 |
| Inventive Example 58 | JIS Class 1 | 10.4 | Yes | 0.06 | 146 | 14.6 | 5.0 |
| Comparative Example 4 | JIS Class 1 | 10.4 | No | 0.06 | 36 | 3.6 | 0.1 |

| Test Number | Corrosion Rate (mm/year) 3% Boiling Hydrochloric Acid Solution | Remarks |
|---|---|---|
| Conventional Material 1 | 4.12 | VAR + breakdown and forging slab; commercially product |
| Conventional Material 2 | 0.37 | VAR + breakdown and forging slab; commercially product |
| Inventive Example 50 | 0.35 | EBR + DC slab |
| Inventive Example 51 | 0.36 | EBR + DC slab |
| Inventive Example 52 | 0.34 | EBR + DC slab |
| Inventive Example 53 | 0.34 | EBR + DC slab |
| Inventive Example 54 | 0.34 | EBR + DC slab |
| Inventive Example 55 | 0.35 | EBR + DC slab |
| Inventive Example 56 | 0.35 | PAR + DC slab |
| Inventive Example 57 | 0.34 | VAR + breakdown and forging slab |
| Inventive Example 58 | 0.35 | EBR + DC slab, only one side subjected to surface remelting treatment |
| Comparative Example 4 | 1.98 | EBR + DC slab |

Note that, although elements originating from the slab (base metal) were contained in the surface layer portion, only the contents of elements which were not contained in the slab are shown in the table.

Conventional materials 1 and 2 shown in Table 5 were a pure titanium material (JIS Class 1) and a corrosion-resistant titanium material (Ti-0.06Pd, ASTM Grade 17), respectively, which are commercially available that are produced through melting, breakdown and forging processes, and the results for these conventional materials 1 and 2 were adopted as benchmarks for the titanium material of the present invention that is described later.

Inventive Examples 50 to 58 of the present invention are each exhibited corrosion resistance superior to the corrosion resistance of the commercially pure titanium material produced through melting, breakdown and forging processes that is shown as conventional material 1 in the aforementioned Table 5, and had corrosion resistance that was equal to the corrosion resistance of the commercially corrosion-resistant titanium material that is produced through melting, breakdown and forging processes that is shown as conventional material 2. At this time, an influence caused by the method of producing the rectangular slabs of material was not observed, and titanium materials excellent in corrosion resistance were obtained when any of the rectangular slabs was used as a starting material to produce a titanium material.

Note that, with respect to Inventive Example 50 of the present invention, although no problem existed regarding the corrosion rate, the percentage content of the outer layer was large, and hence the proportion occupied by a titanium alloy portion was relatively large, which is not preferable as the cost of the material increases.

In Comparative Example 3, the corrosion resistance was superior to the corrosion resistance of the pure titanium material of conventional material 1. However, because the intermediate layer was thin, a large number of cracks were observed in the surface of the sheet. If rapidly cooled is performed after melting and resolidification, fine cracks occur in the outer layer due to strain during solidification. If such fine cracks occur in the outer layer, in a subsequent hot rolling process or cold rolling process, the cracks that occur at this time become the origin of peeling on the outer layer, and regions arise in which the outer layer is partially thin or the internal pure titanium is exposed to a corrosive environment, and hence the corrosion rate falls to the same level as the corrosion rate of pure titanium.

Example 1-5

Rectangular slabs composed of pure titanium of JIS Class 1 were prepared by electron beam remelting and direct casting, and adopted as starting material. The thickness of each rectangular slab was 200 mm. Alloying element material (machining dust, chips or the like) of a predetermined amount for causing a melting and resolidification region of the outer layer to have a predetermined alloying element content was arranged on the slab surface, and thereafter the outer layer of the slab was subjected to a melting and resolidification process using an electron beam under a vacuum atmosphere.

After the melting and resolidification process, control was performed so as to maintain the material for one hour or more in a state in which the surface temperature was in a range of 100° C. to less than 500° C. The material whose outer layer had undergone the melting and resolidification process was heated to 850° C. in atmosphere, and thereafter was subjected to hot rolling to form a hot-rolled sheet having a thickness of approximately 5 mm.

Thereafter, the front and back surfaces were each subjected to a descaling treatment using shot blasting and nitric-hydrofluoric acid. A test specimen with dimensions of 5×30×40 mm (thickness×width×length) was cut out from the obtained hot-rolled pickled sheet.

The same method as in Examples 1 to 4 was performed as the test evaluation method.

For comparison with the titanium material of the present invention, the aforementioned corrosion test was performed using 5-mm sheets composed of a commercially pure titanium (JIS Class 1) and corrosion resistant titanium alloys (ASTM Grade 17, Grade 19, and Grade 7). Table 6 shows a summary of the results of the tests.

TABLE 6

| Test Number | Slab Type | Surface Layer Portion Thickness (mm) | Composition of Surface layer Portion (mass %) Platinum Group Element(s) | Rare Earth Element | Co | Ni | Ti | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
|---|---|---|---|---|---|---|---|---|---|---|---|---|
| Conventional Material 3 | ASTM Gr17 | — | Pd: 0.06 | — | <0.01 | — | Balance | — | 100 | — | 0.36 | VAR + breakdown and forging slab; commercially product |
| Conventional Material 4 | ASTM Gr19 | — | Pd: 0.06 | — | 0.31 | — | Balance | — | 100 | — | 0.22 | VAR + breakdown and forging slab; commercially product |
| Conventional Material 5 | ASTM Gr7 | — | Pd: 0.14 | — | — | — | Balance | — | 100 | — | 0.04 | VAR + breakdown and forging slab; commercially product |
| Conventional Material 6 | JIS Class 1 | — | — | — | — | — | Balance | — | — | — | 4.15 | VAR + breakdown and forging slab; commercially product |
| Inventive Example 59 | JIS Class 1 | 11.1 | Pd: 0.25 | — | — | — | Balance | 195 | 5.6 | 5.0 | 0.03 | EBR + DC slab |
| Inventive Example 60 | JIS Class 1 | 11.2 | Pd: 0.14 | — | — | — | Balance | 165 | 4.9 | 7.0 | 0.05 | EBR + DC slab |
| Inventive Example 61 | JIS Class 1 | 11.0 | Pd: 0.06 | — | — | — | Balance | 200 | 5.6 | 5.0 | 0.38 | EBR + DC slab |
| Inventive Example 62 | JIS Class 1 | 11.0 | Pd: 0.02 | — | — | — | Balance | 205 | 5.7 | 7.0 | 0.70 | EBR + DC slab |
| Inventive Example 63 | JIS Class 1 | 11.0 | Pd: 0.01, Ru: 0.03 | — | — | — | Balance | 195 | 5.5 | 3.0 | 0.40 | EBR + DC slab |
| Inventive Example 64 | JIS Class 1 | 11.0 | Pd: 0.05 | — | 0.30 | — | Balance | 200 | 5.6 | 0.5 | 0.22 | EBR + DC slab |
| Inventive Example 65 | JIS Class 1 | 11.0 | Pd: 0.02 | — | 0.80 | — | Balance | 190 | 5.4 | 6.0 | 0.15 | EBR + DC slab |
| Inventive Example 66 | JIS Class 1 | 11.2 | Pd: 0.02 | Y: 0.25 | — | — | Balance | 220 | 6.0 | 6.0 | 0.36 | EBR + DC slab |
| Inventive Example 67 | JIS Class 1 | 11.0 | Pd: 0.02 | Y: 0.19 | — | — | Balance | 230 | 6.2 | 8.0 | 0.30 | EBR + DC slab |
| Inventive Example 68 | JIS Class 1 | 11.0 | Pd: 0.01 | Y: 0.02 | — | — | Balance | 215 | 5.9 | 2.0 | 0.29 | EBR + DC stab |
| Inventive Example 69 | JIS Class 1 | 10.9 | Pd: 0.02 | Y: 0.003 | — | — | Balance | 190 | 5.4 | 7.0 | 0.30 | EBR + DC slab |
| Inventive Example 70 | JIS Class 1 | 11.0 | Pd: 0.03 | Dy: 0.10 | — | — | Balance | 205 | 5.7 | 5.0 | 0.23 | EBR + DC slab |
| Inventive Example 71 | JIS Class 1 | 11.2 | Pd: 0.03 | La: 0.08 | — | — | Balance | 210 | 5.8 | 7.0 | 0.25 | EBR + DC slab |
| Inventive Example 72 | JIS Class 1 | 11.1 | Pd: 0.03 | Di: 0.04 | — | — | Balance | 215 | 5.9 | 3.0 | 0.24 | EBR + DC slab |
| Inventive Example 73 | JIS Class 1 | 11.0 | Pd: 0.03 | Pr: 0.04 | — | — | Balance | 200 | 5.6 | 8.0 | 0.23 | EBR + DC slab |

TABLE 6-continued

| Test Number | Slab Type | Surface Layer Portion Thickness (mm) | Composition of Surface layer Portion (mass %) | | | | | Outer Layer Thickness (μm) | Outer Layer Occupancy Ratio (%) | Intermediate Layer Thickness (μm) | Corrosion Rate (mm/year) 3% Boiling Hydrochloric Acid Solution | Remarks |
| --- | --- | --- | --- | --- | --- | --- | --- | --- | --- | --- | --- | --- |
| | | | Platinum Group Element(s) | Rare Earth Element | Co | Ni | Ti | | | | | |
| Inventive Example 74 | JIS Class 1 | 11.0 | Pd: 0.02 | Ce: 0.09 | — | — | Balance | 215 | 5.9 | 9.0 | 0.24 | EBR + DC slab |
| Inventive Example 75 | JIS Class 1 | 11.1 | Pd: 0.02 | Mm: 0.05 | — | — | Balance | 215 | 5.9 | 5.0 | 0.25 | EBR + DC slab |
| Inventive Example 76 | JIS Class 1 | 10.9 | Ru: 0.04 | Y: 0.02 | — | — | Balance | 180 | 5.2 | 1.0 | 0.29 | EBR + DC slab |
| Inventive Example 77 | JIS Class 1 | 11.0 | Pd: 0.02 | Nd: 0.05 | 0.21 | — | Balance | 230 | 6.2 | 7.0 | 0.20 | EBR + DC slab |
| Inventive Example 78 | JIS Class 1 | 11.2 | Pd: 0.01 | Sm: 0.06 | 0.30 | — | Balance | 225 | 6.1 | 8.0 | 0.22 | EBR + DC slab |
| Inventive Example 79 | JIS Class 1 | 11.0 | Ru: 0.05 | — | — | 0.50 | Balance | 210 | 5.8 | 2.0 | 0.32 | EBR + DC slab |
| Inventive Example 80 | JIS Class 1 | 11.0 | Ru: 0.05 | — | — | 0.20 | Balance | 195 | 5.5 | 8.0 | 0.43 | EBR + DC slab |
| Inventive Example 81 | JIS Class 1 | 11.1 | Ru: 0.04 | Y: 0.02 | — | 0.30 | Balance | 210 | 5.8 | 4.0 | 0.31 | EBR + DC slab |
| Inventive Example 82 | JIS Class 1 | 11.0 | Pd: 0.02 | — | 0.30 | 0.19 | Balance | 230 | 6.2 | 8.0 | 0.25 | EBR + DC slab |
| Inventive Example 83 | JIS Class 1 | 11.0 | Pd: 0.02 | Y: 0.02 | 0.20 | 0.20 | Balance | 240 | 6.4 | 6.0 | 0.19 | EBR + DC slab |

Note that, although elements originating from the slab (base metal) were contained in the surface layer portion, only the contents of elements which were not contained in the slab are shown in the table.

Conventional materials 3 to 5 were commercially corrosion-resistant titanium materials produced through melting, breakdown and forging processes, and conventional material 6 was a commercially pure titanium material (JIS Class 1) produced through melting, breakdown and forging processes. The results for these conventional materials were adopted as benchmarks for the titanium composite material of the present invention that is described later.

Inventive Examples 59 to 83 of the present invention are example s of the present invention, and each had corrosion resistance equal to the corrosion resistance of the commercially corrosion-resistant titanium materials produced through melting, breakdown and forging processes that are shown as the conventional materials 3 to 5, and also exhibited superior corrosion resistance to the corrosion resistance of the commercially pure titanium material produced through melting, breakdown and forging processes that is shown as the conventional material 6.

Inventive Examples 59 to 62 of the present invention exhibited excellent corrosion resistance as a result of Pd that is a platinum group element being contained in the outer layer.

Inventive Example 63 of the present invention exhibited excellent corrosion resistance as a result of Pd and Ru that are platinum group elements being contained in the outer layer.

Inventive Examples 64 and 65 of the present invention exhibited excellent corrosion resistance as a result of Co being contained in the outer layer in addition to Pd that is a platinum group element.

In Inventive Example 66 of the present invention, although the content of Y that is a rare earth element was large, excellent corrosion resistance was exhibited. However, because the added amount was large, the cost was high and the economic efficiency decreased.

Inventive Examples 67 to 76 of the present invention exhibited excellent corrosion resistance as a result of Y, Dy, La, didymium, Pr, Ce or Mm that are rare earth elements being contained in the outer layer in addition to Pd or Ru that are platinum group elements.

Inventive Examples 77 and 78 of the present invention exhibited excellent corrosion resistance as a result of Nd or Sm that are rare earth elements and furthermore Co being contained in the outer layer in addition to Pd that is a platinum group element.

Inventive Examples 79 and 80 of the present invention exhibited excellent corrosion resistance as a result of Ni being contained in the outer layer in addition to Ru that is a platinum group element.

Inventive Example 81 of the present invention exhibited excellent corrosion resistance as a result of Y that is a rare earth element and furthermore Ni being contained in the outer layer in addition to Pd that is a platinum group element.

Inventive Example 82 of the present invention exhibited excellent corrosion resistance as a result of Co and Ni being contained in the outer layer in addition to Pd that is a platinum group element.

In addition, Inventive Example 83 of the present invention exhibited excellent corrosion resistance as a result of Y that is a rare earth element and furthermore Co and Ni being contained in the outer layer in addition to Pd that is a platinum group element.

Example 1-6

Rectangular slabs containing predetermined alloying components were prepared by vacuum arc remelting and breakdown and forging (VAR+breakdown and forging), and adopted as starting material. The thickness of each rectangular slab was 200 mm. Alloying element material (machining dust, chips or the like) of a predetermined amount for causing a melting and resolidification region of the outer layer to have a predetermined alloying element content was arranged on the slab surface, and thereafter the outer layer of the slab was subjected to a melting and resolidification process using an electron beam under a vacuum atmosphere.

After the melting and resolidification process, control was performed so as to maintain the material for one hour or more in a state in which the surface temperature was in a range of 100° C. to less than 500° C. The material whose outer layer had undergone the melting and resolidification process was heated to a temperature in the range of 850 to 1050° C. in atmosphere, and thereafter was subjected to hot rolling to form a hot-rolled sheet having a thickness of approximately 5 mm.

Note that, 5-mm sheets composed of commercially pure titanium (JIS Classes 1 to 4) and corrosion resistant titanium alloys (ASTM Grade 17, Grade 19, and Grade 7) were used for comparison with the titanium material of the present invention.

The method for evaluating the respective titanium materials was the same as in Examples 1-4 and 1-5. Table 7 shows a summary of the results.

TABLE 7

| Test Number | Slab Type | Surface layer Portion Thickness (mm) | Composition of Surface layer Portion (mass %) | | | | | | | | | Outer Layer Thickness (μm) | Outer Layer Occupancy Ratio (%) |
|---|---|---|---|---|---|---|---|---|---|---|---|---|---|
| | | | Pd | Al | V | Fe | Cu | Cr | Sn | O | Ti | | |
| Conventional Material 3 | ASTM Br17 | — | 0.06 | — | — | — | — | — | — | 0.05 | Balance | — | 100 |
| Conventional Material 6 | JIS Class 1 | — | — | — | — | — | — | — | — | 0.05 | Balance | — | — |
| Conventional Material 7 | JIS Class 2 | — | — | — | — | — | — | — | — | 0.10 | Balance | — | — |
| Conventional Material 8 | JIS Class 3 | — | — | — | — | — | — | — | — | 0.15 | Balance | — | — |
| Conventional Material 9 | JIS Class 4 | — | — | — | — | — | — | — | — | 0.20 | Balance | — | — |
| Inventive Example 84 | JIS Class 1 | 10.2 | 0.06 | — | — | — | — | — | — | 0.06 | Balance | 168 | 3.4 |
| Inventive Example 85 | JIS Class 2 | 10.1 | 0.06 | — | — | — | — | — | — | 0.11 | Balance | 189 | 3.8 |

TABLE 7-continued

| | | | | | | | | | | | | |
|---|---|---|---|---|---|---|---|---|---|---|---|---|
| Inventive Example 86 | JIS Class 3 | 10.5 | 0.06 | — | — | — | — | — | — | 0.16 | Balance | 200 | 4.1 |
| Inventive Example 87 | JIS Class 4 | 10.1 | 0.06 | — | — | — | — | — | — | 0.21 | Balance | 226 | 4.8 |

| Test Number | Intermediate Layer Thickness (μm) | Corrosion Rate (mm/year) 3% Boiling Hydrochloric Acid Solution | Remarks |
|---|---|---|---|
| Conventional Material 3 | — | 0.36 | VAR + breakdown and forging slab; commercially product |
| Conventional Material 6 | — | 4.15 | VAR + breakdown and forging slab; commercially product |
| Conventional Material 7 | — | 4.26 | VAR + breakdown and forging slab; commercially product |
| Conventional Material 8 | — | 4.31 | VAR + breakdown and forging slab; commercially product |
| Conventional Material 9 | — | 4.33 | VAR + breakdown and forging slab; commercially product |
| Inventive Example 84 | 6.0 | 0.36 | VAR + breakdown and forging slab |
| Inventive Example 85 | 7.0 | 0.34 | VAR + breakdown and forging slab |
| Inventive Example 86 | 9.0 | 0.35 | VAR + breakdown and forging slab |
| Inventive Example 87 | 9.0 | 0.33 | VAR + breakdown and forging slab |

Conventional material 3 was a commercially corrosion-resistant titanium material (Ti-0.06Pd, ASTM Grade 17) produced through melting, breakdown and forging processes, and conventional materials 6 to 9 were commercially pure titanium materials (JIS Classes 1 to 4) produced through melting, breakdown and forging processes. These conventional materials were adopted as benchmarks for the titanium composite material of the present invention that is described later.

Inventive Examples 84 to 87 of the present invention were corrosion resistant titanium alloys produced using pure titanium as a base metal slab, in which a titanium alloy portion of an outer layer contained approximately 0.06% of Pd. In these titanium materials, excellent corrosion resistance was obtained that was of the same level as the corrosion resistance of conventional material 16 that was a commercially corrosion-resistant titanium material produced through melting, breakdown and forging processes and which had a Pd content of the same level.

Further, in the titanium composite material for which pure titanium was used as the base metal of Inventive Examples 84 to 87 of the present invention, a Pd-containing alloy layer was formed in the outer layer, and as a result the titanium composite materials of Inventive Examples 84 to 87 of the present invention had superior corrosion resistance in comparison to the pure titanium materials of conventional materials 6 to 9 that were produced through melting, breakdown and forging processes.

EXAMPLE 2

Example 2-1

The titanium composite material 2 illustrated in FIG. 2 was produced by the following procedure.

That is, by performing electron beam remelting, titanium alloy sheets 7 containing at least one type of element among Si, Nb and Ta were welded in vacuum onto the surfaces of the slab 6 illustrated in FIG. 4 having dimensions of 200 mm×1000 mm×4500 mm (thickness×width×length) that was cast in a rectangular mold. In examples No. 3 and 4, the titanium alloy sheet 8 was also welded in vacuum to the side faces of the slab 6. Thereafter, the slab 6 to which the titanium alloy sheets 7 and 8 were welded was heated to 820° C. and subjected to hot rolling to a thickness of 5 mm, and the front and back surfaces were then both subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 750° C. in vacuum or in an inert gas atmosphere and holding at that temperature for 240 minutes was performed to thereby produce titanium composite materials 2 as the specimens of examples (Inventive Examples of the present invention) Nos. 1 to 20 and the Comparative Examples shown in Table 8.

TABLE 8

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m²) | | Producibility | Remarks |
|---|---|---|---|---|---|---|---|---|---|---|---|---|
| | | Si | Nb | Al | Ta | | | | 700° C. | 750° C. | | |
| 1 | JIS Class 2 | — | — | — | — | | | — | 45 | 130 | Favorable | Comparative Example |
| 2 | JIS Class 2 | 0.25 | — | — | — | 1 | 0.1 | 0.1 | 40 | 110 | Favorable | Comparative Example |
| 3 | JIS Class 1 | 0.31 | — | — | — | 48 | 4.8 | 5.0 | 19 | 55 | Favorable | Inventive Example |

TABLE 8-continued

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m$^2$) | | Producibility | Remarks |
|---|---|---|---|---|---|---|---|---|---|---|---|---|
| | | Si | Nb | Al | Ta | | | | 700° C. | 750° C. | | |
| 4 | JIS Class 2 | 0.45 | — | — | — | 52 | 5.2 | 1.0 | 18 | 50 | Favorable | Inventive Example |
| 5 | JIS Class 3 | 0.22 | — | — | — | 42 | 4.2 | 4.0 | 18 | 52 | Favorable | Inventive Example |
| 6 | JIS Class 4 | 0.32 | — | — | — | 66 | 6.6 | 2.0 | 21 | 75 | Favorable | Inventive Example |
| 8 | JIS Class 2 | — | 0.90 | — | — | 20 | 2.0 | 2.0 | 17 | 50 | Favorable | Inventive Example |
| 9 | JIS Class 2 | — | — | — | 0.55 | 42 | 4.2 | 5.0 | 18 | 60 | Favorable | Inventive Example |
| 10 | JIS Class 2 | — | — | 1.20 | — | 58 | 5.8 | 1.0 | 23 | 70 | Favorable | Inventive Example |
| 11 | JIS Class 2 | 0.25 | 0.35 | — | — | 36 | 3.6 | 4.0 | 15 | 55 | Favorable | Inventive Example |
| 12 | JIS Class 2 | 0.31 | 0.44 | — | 0.44 | 52 | 5.2 | 1.0 | 15 | 40 | Favorable | Inventive Example |
| 13 | JIS Class 2 | 0.35 | — | 0.90 | — | 34 | 3.4 | 4.0 | 25 | 59 | Favorable | Inventive Example |
| 14 | JIS Class 2 | — | 0.35 | — | 0.85 | 46 | 4.6 | 1.0 | 22 | 53 | Favorable | Inventive Example |
| 15 | JIS Class 2 | — | 0.80 | 0.29 | — | 56 | 5.6 | 4.0 | 17 | 43 | Favorable | Inventive Example |
| 16 | JIS Class 2 | — | — | 0.81 | 0.35 | 32 | 3.2 | 4.0 | 21 | 55 | Favorable | Inventive Example |
| 17 | JIS Class 2 | 0.23 | 0.45 | — | 0.31 | 52 | 5.2 | 2.0 | 16 | 42 | Favorable | Inventive Example |
| 18 | JIS Class 2 | — | 0.80 | 0.29 | 0.40 | 50 | 5.0 | 5.0 | 16 | 42 | Favorable | Inventive Example |
| 19 | JIS Class 2 | 0.45 | 0.25 | 0.50 | — | 41 | 4.1 | 5.0 | 18 | 40 | Favorable | Inventive Example |
| 20 | JIS Class 2 | 0.20 | — | 0.30 | 0.55 | 42 | 4.2 | 3.0 | 18 | 42 | Favorable | Inventive Example |
| 21 | JIS Class 2 | 0.20 | 0.30 | 0.30 | 0.35 | 10 | 1.0 | 0.5 | 13 | 39 | Favorable | Inventive Example |

A test specimen measuring 20 mm×20 mm was cut out from each of the specimens 1 to 21, and after polishing the surface and edges of each test specimen with #400 sandpaper, the test specimens were exposed in atmosphere for 200 hours at temperatures of 700° C. and 750° C., respectively, a change in weight between before and after the test was measured, and the amount of oxidation increase per unit cross-sectional area was determined. The results are shown collectively in Table 8. Note that, with respect to the element concentration of outer layers 3 and 4 in Table 8, the values shown were obtained by averaging measurement results in a range from the surface to the lower end of the alloy layer after performing line analysis using EPMA.

In the Comparative Example of No. 1 in Table 8, an inner part 5 was composed of commercially pure titanium of JIS Class 2, and the specimen did not have outer layers 3 and 4. Therefore, the amount of oxidation increase caused by heating for 200 hours at 700° C. was 40 g/m$^2$ or more, and the amount of oxidation increase caused by heating for 200 hours at 750° C. was an extremely high amount of 100 g/m$^2$ or more.

In the Comparative Example of No. 2, the inner part 5 was composed of commercially pure titanium of JIS Class 2, and although the outer layers 3 and 4 contained Si, the outer layers 3 and 4 had an extremely thin thickness of 1 μm. The thickness of the intermediate layer was also extremely thin. Therefore, the amount of oxidation increase caused by heating for 200 hours at 700° C. was 40 g/m$^2$ or more, and the amount of oxidation increase caused by heating for 200 hours at 750° C. was an extremely high amount of 100 g/m$^2$ or more.

In the Inventive Example of the present invention of No. 3, the inner part 5 was composed of commercially pure titanium of JIS Class 1, and the outer layers 3 and 4 contained Si. Therefore, the Inventive Example of the present invention of No. 3 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

In the Inventive Example of the present invention of No. 4, the inner part 5 was composed of commercially pure titanium of JIS Class 2, and the outer layers 3 and 4 contained Si. Therefore, the Inventive Example of the present invention of No. 4 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

In the Inventive Example of the present invention of No. 5, the inner part 5 was composed of commercially pure titanium of JIS Class 3, and the outer layers 3 and 4 contained Si. Therefore, the Inventive Example of the present invention of No. 5 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

In the Inventive Example of the present invention of No. 6, the inner part 5 was composed of commercially pure titanium of JIS Class 3, and the outer layers 3 and 4 contained Si. Therefore, the Inventive Example of the present invention of No. 6 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Examples of the present invention of Nos. 8 to 21, the inner part 5 was composed of commercially pure titanium of JIS Class 2, and the outer layers 3 and 4 contained one or more types of element among Si, Nb, Ta and Al. Therefore, the Inventive Example of the present invention of Nos. 8 to 21 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-2

The titanium composite material 2 illustrated in FIG. 2 was produced by the following procedure.

That is, in the Inventive Examples of the present invention of Nos. 22 and 23, after the slab 6 was subjected to electron beam remelting and cast with a rectangular mold, a titanium alloy sheet 7 containing at least one type of element among Si, Nb, Ta and Al was welded in vacuum to the surface of the slab 6 illustrated in FIG. 3 having dimensions of 200 mm×1000 mm×4500 mm (thickness×width×length) in which faces corresponding to rolling surfaces were cut and finished. Further, in the Inventive Example of the present invention of No. 24, after performing electron beam remelting and casting with a rectangular mold, titanium alloy sheets 7 containing at least one type of element among Si, Nb, Ta and Al were welded in vacuum to the surfaces of the slab 6 illustrated in FIG. 4 having dimensions of 100 mm×1000 mm×4500 mm (thickness×width×length) in which faces corresponding to rolling surfaces were cut and finished, after performing the finishing by cutting.

Thereafter, the slab 6 to which the titanium alloy sheets 7 were welded was heated to 820° C. and subjected to hot rolling to a thickness of 5 mm, and the front and back surfaces were both then subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 700° C. in vacuum or in an inert gas atmosphere and holding at that temperature for 240 minutes was performed to thereby produce titanium composite materials 2 as the specimens of the Inventive Examples of the present invention of Nos. 22 to 24 shown in Table 9.

For each of these specimens, the amount of oxidation increase per unit cross-sectional area was determined in a similar manner to Example 2-1. The results are shown collectively in Table 9. Note that, with respect to the values for an element concentration in a surface layer portion in Table 9, the values shown were obtained by performing line analysis using EPMA and averaging the measurement results in a range from the surface to the lower end of the alloy layer.

In the Inventive Example of the present invention of No. 22, the inner part 5 was composed of commercially pure titanium of JIS Class 1, and the outer layers 3 and 4 contained Si. Therefore, the Inventive Example of the present invention of No. 22 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 23, the inner part 5 was composed of commercially pure titanium of JIS Class 2, and the outer layers 3 and 4 contained Nb. Therefore, the Inventive Example of the present invention of No. 23 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 24, the inner part 5 was composed of commercially pure titanium of JIS Class 3, and the outer layers 3 and 4 contained Si and Al. Therefore, the Inventive Example of the present invention of No. 24 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-3

The titanium composite material 2 illustrated in FIG. 2 was produced by the following procedure.

That is, after performing plasma arc melting and casting with a rectangular mold, titanium alloy sheets containing respective elements were welded in vacuum onto the surfaces of the slab 6 illustrated in FIG. 4 having dimensions of 200 mm×1000 mm×4500 mm (thickness×width×length) in which faces corresponding to rolling surfaces were cut and finished. Thereafter, the slab was heated to 820° C. and subjected to hot rolling to a thickness of 5 mm, and the front and back surfaces were both then subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 750° C. in vacuum or in an inert gas atmosphere and holding at that temperature

TABLE 9

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m²) | | Producibility | Remarks |
| --- | --- | --- | --- | --- | --- | --- | --- | --- | --- | --- | --- | --- |
| | | Si | Nb | Al | Ta | | | | 700° C. | 750° C. | | |
| 22 | JIS Class 1 | 0.25 | — | — | — | 106 | 10.6 | 2.0 | 18 | 55 | Favorable | Inventive Example |
| 23 | JIS Class 2 | — | 0.50 | — | — | 98 | 9.8 | 5.0 | 16 | 45 | Favorable | Inventive Example |
| 24 | JIS Class 3 | 0.31 | — | 0.35 | — | 310 | 31.0 | 2.0 | 17 | 45 | Favorable | Inventive Example | for 240 minutes was performed to thereby produce titanium composite materials 2 as the specimens of examples (Inventive Examples of the present invention) Nos. 25 to 27 shown in Table 10.

For each of these specimens, the amount of oxidation increase per unit cross-sectional area was determined in a similar manner to Example 2-1. The results are shown collectively in Table 10. Note that, with respect to the values for an element concentration in a surface layer portion in Table 10, the values shown were obtained by performing line analysis using EPMA and averaging the measurement results in a range from the surface to the lower end of the alloy layer.

TABLE 10

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m$^2$) | | Producibility | Remarks |
|---|---|---|---|---|---|---|---|---|---|---|---|---|
| | | Si | Nb | Al | Ta | | | | 700° C. | 750° C. | | |
| 25 | JIS Class 1 | 0.25 | — | — | — | 100 | 10.0 | 4.0 | 15 | 50 | Favorable | Inventive Example |
| 26 | JIS Class 2 | — | 0.50 | — | — | 25 | 2.5 | 1.0 | 16 | 65 | Favorable | Inventive Example |
| 27 | JIS Class 3 | 0.20 | — | 0.25 | — | 75 | 7.5 | 4.0 | 13 | 48 | Favorable | Inventive Example |

In the Inventive Example of the present invention of No. 25, the inner part 5 was composed of commercially pure titanium of JIS Class 1, the outer layers 3 and 4 contained Si, and the thickness thereof was an adequate thickness of 5 μm or more. Therefore, the Inventive Example of the present invention of No. 25 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

In the Inventive Example of the present invention of No. 26, the inner part 5 was composed of commercially pure titanium of JIS Class 2, the outer layers 3 and 4 contained Nb, and the thickness thereof was an adequate thickness of 5 μm or more. Therefore, the Inventive Example of the present invention of No. 26 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

In the Inventive Example of the present invention of No. 27, the inner part 5 was composed of commercially pure titanium of JIS Class 3, the outer layers 3 and 4 contained Si and Al, and the thickness thereof was an adequate thickness of 5 μm or more. Therefore, the Inventive Example of the present invention of No. 27 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

Example 2-4

The titanium composite material 2 illustrated in FIG. 2 was produced by the following procedure.

That is, after forming a titanium ingot into a rectangular shape by breaking down the titanium ingot, titanium alloy sheets 7 containing alloying elements were welded in vacuum onto the surfaces of the slab 6 illustrated in FIG. 4 having dimensions of 200 mm×1000 mm×4500 mm (thickness×width×length) in which faces corresponding to rolling surfaces were cut and finished. Thereafter, the slab 6 to which the titanium alloy sheets 7 were welded was heated to 820° C. and subjected to hot rolling to a thickness of 5 mm, and the front and back surfaces were then both subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 750° C. in vacuum or in an inert gas atmosphere and holding at that temperature for 240 minutes was performed to thereby produce titanium composite materials 2 as the specimens of the Inventive Examples of the present invention of Nos. 28 and 29 shown in Table 11.

TABLE 11

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m$^2$) | | Producibility | Remarks |
|---|---|---|---|---|---|---|---|---|---|---|---|---|
| | | Si | Nb | Al | Ta | | | | 700° C. | 750° C. | | |
| 28 | JIS Class 1 | 0.31 | — | — | — | 100 | 10.0 | 4.0 | 20 | 59 | Favorable | Inventive Example |
| 29 | JIS Class 2 | 0.24 | — | — | — | 95 | 9.5 | 3.0 | 21 | 60 | Favorable | Inventive Example |

For each of these specimens, the amount of oxidation increase per unit cross-sectional area was determined in a similar manner to Example 2-1. The results are shown collectively in Table 11. Note that, with respect to the values for an element concentration in a surface layer portion in Table 11, the values shown were obtained by performing line analysis using EPMA and averaging the measurement results in a range from the surface to the lower end of the alloy layer.

In the Inventive Example of the present invention of No. 28, the inner part 5 was composed of commercially pure titanium of JIS Class 1, the outer layers 3 and 4 contained Si, and the thickness thereof was an adequate thickness of 5 μm or more. Therefore, the Inventive Example of No. 28 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 29, the inner part 5 was composed of commercially pure titanium of JIS Class 2, the outer layers 3 and 4 contained Si, and the thickness thereof was an adequate thickness of 5 μm or more. Therefore, the Inventive Example of No. 29 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-5

The titanium composite material 2 illustrated in FIG. 2 was produced by the following procedure.

That is, an ingot having dimensions of 220 mm×1000 mm×4500 mm (thickness×width×length) in which faces corresponding to rolling surfaces were cut and finished which was obtained after performing electron beam remelting and casting with a rectangular mold was used as the slab 6.

As the titanium alloy sheets 7 that were welded in vacuum to the surfaces of the slab 6, a titanium alloy sheet consisting of Ti-1.0Cu-1.0Sn-0.45Si-0.2Nb, a titanium alloy sheet consisting of Ti-1.0Cu-0.5Nb, a titanium alloy sheet consisting of Ti-0.25Fe-0.45Si and a titanium alloy sheet consisting of Ti-0.35Fe-0.45Si were used for No. 30, No. 31, No. 32 and No. 33 in Table 12, respectively.

Thereafter, each slab was heated to 820° C. and subjected to hot rolling to a thickness of 5 mm, and the front and back surfaces were then both subjected to a descaling treatment using shot blasting and nitric-hydrofluoric acid. In addition, cold rolling was performed to form a titanium sheet having a thickness of 1 mm, and as an annealing treatment, a heat treatment of heating to 600 to 700° C. in vacuum or in an inert gas atmosphere and holding at that temperature for 240 minutes was performed to thereby produce titanium composite materials 2 as specimens of the Inventive Examples of the present invention of Nos. 30 to 33 shown in Table 12.

For each of these specimens, the amount of oxidation increase per unit cross-sectional area was determined in a similar manner to Example 2-1. The results are shown collectively in Table 12. Note that, with respect to the values for an element concentration in a surface layer portion in Table 12, the values shown were obtained by performing line analysis using EPMA and averaging the measurement results in a range from the surface to the lower end of the alloy layer.

In the Inventive Examples of the present invention of Nos. 30 to 33, the inner part 5 was composed of commercially pure titanium of JIS Class 2, the outer layers 3 and 4 contained one or more types of element among Si, Nb, Ta and Al, and the thickness thereof was an adequate thickness of 5 μm or more. In addition, although other alloys were also contained, the content thereof was less than 2.5%. Further, Inventive Examples of Nos. 30 to 33 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-6

The titanium composite material 2 illustrated in FIG. 2 was produced by the following procedure.

That is, a titanium alloy ingot having dimensions of 200 mm×1000 mm×4500 mm (thickness×width×length) in which faces corresponding to rolling surfaces were cut and finished which was obtained after performing electron beam remelting and casting with a rectangular mold was used as the slab 6.

Titanium sheets 7 containing one or more types of element among Si, Nb, Ta and Al were welded in vacuum onto surfaces of slabs 6 of Nos. 34 to 45 in Table 13 that consisted of: Ti-1.0Cu-1.0Sn for No. 34, Ti-1.0Cu-1.0Sn for No. 35, Ti-0.5Al for No. 36, Ti-0.9Al for No. 37, Ti-3Al-2.5V for No. 38, Ti-1Fe-0.35O for No. 39, Ti-1.5Fe-0.5O for No. 40, Ti-0.5Cu for No. 41, Ti-5Al-1Fe for No. 42, Ti-6Al-4V for No. 43, Ti-20V-4Al-1Sn for No. 44, and Ti-15V-3Al-3Cr-

TABLE 12

| No. | Slab Type | Composition of Surface layer Portion (mass %) | | | | | | | Outer Layer Thickness (μm) | Outer Layer Occupancy Ratio (%) |
| --- | --- | --- | --- | --- | --- | --- | --- | --- | --- | --- |
| | | Si | Nb | Al | Ta | Cu | Sn | Fe | Total | | |
| 30 | JIS Class 2 | 0.35 | 0.25 | — | — | 1.00 | 1.00 | — | 2.00 | 48 | 4.8 |
| 31 | JIS Class 2 | — | 0.5 | — | — | 1.00 | — | — | 1.00 | 55 | 5.5 |
| 32 | JIS Class 2 | 0.45 | — | — | — | — | — | 0.25 | 0.25 | 44 | 4.4 |
| 33 | JIS Class 2 | 0.45 | — | — | — | — | — | 0.35 | 0.35 | 48 | 4.8 |

| No. | Intermediate Layer Thickness (μm) | 200 Hours Oxidation Increase Amount (g/m²) | | Producibility | Remarks |
| --- | --- | --- | --- | --- | --- |
| | | 700° C. | 750° C. | | |
| 30 | 9.0 | 20 | 59 | Favorable | Inventive Example |
| 31 | 10.0 | 16 | 60 | Favorable | Inventive Example |
| 32 | 5.0 | 17 | 55 | Favorable | Inventive Example |
| 33 | 9.0 | 17 | 53 | Favorable | Inventive Example |

3Sn for No. 45. Thereafter, each slab was heated to 950° C. and subjected to hot rolling to a thickness of 5 mm, and the front and back surfaces were then both subjected to a descaling treatment using shot blasting and nitric-hydrofluoric acid. In addition, for Nos. 34 to 41, cold rolling was performed to form a titanium sheet having a thickness of 1 mm, and as an annealing treatment, a heat treatment of heating to 600 to 700° C. in vacuum or in an inert gas atmosphere and holding at that temperature for 240 minutes was performed to thereby produce titanium composite materials 2 as specimens of the Inventive Examples of the present invention of Nos. 34 to 41 shown in Table 13. In addition, with respect to Nos. 42 to 45, as an annealing treatment after the descaling treatment, a heat treatment of heating to 600 to 700° C. in vacuum or in an inert gas atmosphere and holding at that temperature for 240 minutes was performed to thereby produce titanium composite materials 2 as specimens of the Inventive Examples of the present invention of Nos. 42 to 45 shown in Table 13.

For each of these specimens, the amount of oxidation increase per unit cross-sectional area was determined in a similar manner to Example 2-1. The results are shown collectively in Table 13. Note that, with respect to the values for an element concentration in a surface layer portion in Table 13, the values shown were obtained by performing line analysis using EPMA and averaging the measurement results in a range from the surface to the lower end of the alloy layer.

In each of the Inventive Examples of the present invention of Nos. 34 to 45, the outer layers 3 and 4 contained one or more types of element among Si, Nb, Ta and Al, and the thickness thereof was an adequate thickness of 5 μm or more. In addition, the Inventive Examples of Nos. 34 to 45 exhibited excellent oxidation resistance, with respect to which the amount of oxidation increase caused by heating for 200 hours at 700° C. was 25 g/m$^2$ or less and the amount of oxidation increase caused by heating for 200 hours at 750° C. was 70 g/m$^2$ or less.

Example 2-7

Titanium material for hot rolling was used that was subjected to electron beam remelting and cast with a rectangular mold to have dimensions of 200 mm×1000 mm×4500 mm (thickness×width×length). The surface of the titanium material for hot rolling was subjected to surface layer melting together with material consisting of one or more types of element among Nb, Si, Ta and Al. Thereafter,

TABLE 13

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase (g/m$^2$) | | Producibility | Remarks |
|---|---|---|---|---|---|---|---|---|---|---|---|---|
| | | Si | Nb | Al | Ta | | | | 700° C. | 750° C. | | |
| 34 | Ti—1.0Cu | — | 0.5 | — | — | 55 | 5.5 | 3.0 | 18 | 52 | Favorable | Inventive Example |
| 35 | Ti—1.0Cu—1.0Sn | 0.45 | 0.2 | — | — | 48 | 4.8 | 4.0 | 16 | 50 | Favorable | Inventive Example |
| 36 | Ti—0.5Al | 0.45 | 0.25 | 0.5 | — | 48 | 4.8 | 1.0 | 17 | 53 | Favorable | Inventive Example |
| 37 | Ti—0.9Al | 0.35 | — | 0.9 | — | 51 | 5.1 | 4.0 | 17 | 53 | Favorable | Inventive Example |
| 38 | Ti—3Al—2.5V | 0.35 | 0.25 | — | — | 60 | 6.0 | 4.0 | 19 | 53 | Favorable | Inventive Example |
| 39 | Ti—1Fe—0.35O | 0.35 | 0.25 | — | — | 40 | 4.0 | 1.0 | 19 | 60 | Favorable | Inventive Example |
| 40 | Ti—1.5Fe—0.5O | 0.35 | 0.25 | — | — | 42 | 4.2 | 3.0 | 19 | 59 | Favorable | Inventive Example |
| 41 | Ti—0.5Cu | 0.35 | 0.25 | — | — | 38 | 3.8 | 3.0 | 20 | 61 | Favorable | Inventive Example |
| 42 | Ti—5Al—1Fe | — | — | — | 0.7 | 310 | 31.0 | 2.0 | 18 | 58 | Favorable | Inventive Example |
| 43 | Ti—6Al—4V | 0.35 | 0.25 | — | — | 275 | 27.5 | 0.5 | 19 | 59 | Favorable | Inventive Example |
| 44 | Ti—20V—4Al—1Sn | 0.35 | 0.25 | — | — | 265 | 26.5 | 11.0 | 20 | 61 | Favorable | Inventive Example |
| 45 | Ti—15V—3Al—3Cr—3Sn | 0.35 | 0.25 | — | — | 250 | 25.0 | 7.0 | 21 | 60 | Favorable | Inventive Example | the surface temperature of the titanium material for hot rolling was maintained for one hour or more at a temperature of 150° C. Thereafter, the titanium material for hot rolling was heated to 820° C. and subjected to hot rolling to a thickness of 5 mm, and the front and back surfaces were then both subjected to a descaling treatment using shot blasting and nitric-hydrofluoric acid. In addition, cold rolling was performed to form a titanium sheet having a thickness of 1.0 mm, and as an annealing treatment, a heat treatment of heating to 600 to 750° C. in vacuum or in an inert gas atmosphere and holding at that temperature for 240 minutes was performed to thereby produce specimens of Reference Examples and Inventive Examples of the present invention of Nos. 46 to 66 in Table 14. Many of these specimens had the structure of the titanium composite material 1 or 2 shown in FIG. 1 and FIG. 2.

A test specimen measuring 20 mm×20 mm was taken from each of these specimens, and after polishing the surface and edges of each test specimen with #400 sandpaper, the test specimens were exposed in atmosphere for 200 hours at temperatures of 700° C. and 750° C., respectively, a change in weight between before and after the test was measured, and the amount of oxidation increase per unit cross-sectional area was determined. The results are shown collectively in Table 14. Note that, with respect to the element concentration of a surface layer portion in Table 14, the values shown were obtained by performing line analysis using EPMA and averaging the measurement results in a range from the surface to the lower end of the alloy layer.

the amount of oxidation increase caused by heating for 200 hours at 750° C. was 100 g/m² or more, which were extremely high amounts.

In the Comparative Example of No. 47, the inner part 5 was composed of commercially pure titanium of JIS Class 2, and although the outer layers 3 and 4 contained Si, the outer layers 3 and 4 had an extremely thin thickness of 1 μm. Therefore, the amount of oxidation increase caused by heating for 200 hours at 700° C. was 40 g/m² or more and the amount of oxidation increase caused by heating for 200 hours at 750° C. was 100 g/m² or more, which were extremely large amounts.

In the Inventive Example of the present invention of No. 48, the inner part 5 was composed of commercially pure titanium of JIS Class 1, the outer layers 3 and 4 contained Si, and the thickness thereof was also an adequate thickness of 5 μm or more. Therefore, the Inventive Example of No. 48 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 49, the inner part 5 was composed of commercially pure titanium of JIS Class 2, the outer layers 3 and 4 contained Si, and the thickness thereof was also an adequate thickness of 5 μm or more. Therefore, the Inventive Example of No. 49 exhibited excellent oxidation resistance, with respect to which the amount of oxidation increase caused by heating

TABLE 14

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase Amount (g/m²) | | Producibility | Remarks |
|---|---|---|---|---|---|---|---|---|---|---|---|---|
| | | Si | Nb | Al | Ta | | | | 700° C | 750° C | | |
| 46 | JIS Class 2 | — | — | — | — | — | — | — | 45 | 130 | Favorable | Comparative Example |
| 47 | JIS Class 2 | 0.25 | — | — | — | 1 | 0.1 | 5.0 | 40 | 110 | Favorable | Comparative Example |
| 48 | JIS Class 1 | 0.29 | — | — | — | 35 | 3.5 | 5.0 | 19 | 55 | Favorable | Example |
| 49 | JIS Class 2 | 0.45 | — | — | — | 31 | 3.1 | 2.0 | 18 | 50 | Favorable | Example |
| 50 | JIS Class 3 | 0.31 | — | — | — | 25 | 2.5 | 2.5 | 18 | 52 | Favorable | Example |
| 51 | JIS Class 4 | 0.40 | — | — | — | 30 | 3.0 | 1.0 | 21 | 75 | Favorable | Example |
| 53 | JIS Class 2 | — | 0.85 | — | — | 20 | 2.0 | 2.0 | 17 | 50 | Favorable | Example |
| 54 | JIS Class 2 | — | — | — | 0.55 | 39 | 3.9 | 2.0 | 18 | 60 | Favorable | Example |
| 55 | JIS Class 2 | — | — | 1.20 | — | 40 | 4.0 | 1.0 | 23 | 70 | Favorable | Example |
| 56 | JIS Class 2 | 0.25 | 0.35 | — | — | 35 | 3.5 | 3.0 | 15 | 55 | Favorable | Example |
| 57 | JIS Class 2 | 0.25 | 0.42 | — | 0.44 | 32 | 3.2 | 1.0 | 15 | 40 | Favorable | Example |
| 58 | JIS Class 2 | 0.35 | — | 0.90 | — | 15 | 1.5 | 0.5 | 25 | 59 | Favorable | Example |
| 59 | JIS Class 2 | — | 0.35 | — | 0.75 | 35 | 3.5 | 1.0 | 22 | 53 | Favorable | Example |
| 60 | JIS Class 2 | — | 0.75 | 0.30 | — | 41 | 4.1 | 5.0 | 17 | 43 | Favorable | Example |
| 61 | JIS Class 2 | — | — | 0.81 | 0.35 | 25 | 2.5 | 3.0 | 21 | 55 | Favorable | Example |
| 62 | JIS Class 2 | 0.23 | 0.45 | — | 0.31 | 25 | 2.5 | 5.0 | 16 | 42 | Favorable | Example |
| 63 | JIS Class 2 | — | 0.75 | 0.29 | 0.40 | 41 | 4.1 | 2.0 | 16 | 42 | Favorable | Example |
| 64 | JIS Class 2 | 0.45 | 0.20 | 0.50 | — | 31 | 3.1 | 5.0 | 18 | 40 | Favorable | Example |
| 65 | JIS Class 2 | 0.20 | — | 0.30 | 0.51 | 41 | 4.1 | 3.0 | 18 | 42 | Favorable | Example |
| 66 | JIS Class 2 | 0.25 | 0.25 | 0.20 | 0.30 | 35 | 3.5 | 2.0 | 13 | 39 | Favorable | Example |

Note that, although elements originating from the slab (base metal) were contained in the surface layer portion, only the contents of elements which were not contained in the slab are shown in the table.

In the Comparative Example of No. 46, the inner part 5 was composed of commercially pure titanium of JIS Class 2, and the specimen did not have outer layers 3 and 4. Therefore, the amount of oxidation increase caused by heating for 200 hours at 700° C. was 40 g/m² or more and for 200 hours at 700° C. was 25 g/m² or less and the amount of oxidation increase caused by heating for 200 hours at 750° C. was 70 g/m² or less.

In the Inventive Example of the present invention of No. 50, the inner part 5 was composed of commercially pure titanium of JIS Class 3, the outer layers 3 and 4 contained Si, and the thickness thereof was also an adequate thickness of 5 μm or more. Therefore, the Inventive Example of No. 50 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 51, the inner part 5 was composed of commercially pure titanium of JIS Class 4, the outer layers 3 and 4 contained Si, and the thickness thereof was also an adequate thickness of 5 μm or more. Therefore, the Inventive Example of No. 51 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Examples of the present invention of Nos. 53 to 66, the inner part 5 was composed of commercially pure titanium of JIS Class 2, the outer layers 3 and 4 contained one or more types of element among Si, Nb, Ta and Al, and the thickness thereof was also an adequate thickness of 5 μm or more. Therefore, Inventive Examples of Nos. 53 to 66 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-8

In Inventive Examples of the present invention shown in Nos. 67 to 69, titanium material for hot rolling having dimensions of 100 mm×1000 mm×4500 mm (thickness×width×length) in which faces corresponding to rolling surfaces were cut and finished which was obtained after performing electron beam remelting and casting with a rectangular mold was used. Material consisting of one or more types of element among Nb, Si and Al was spread on the titanium material for hot rolling, and thereafter surface layer melting was performed, after which the slab was held at a temperature of 300° C. for one hour or more.

Thereafter, each slab was heated to 820° C. and subjected to hot rolling to a thickness of 5 mm, and the front and back surfaces were then both subjected to a descaling treatment using shot blasting and nitric-hydrofluoric acid. In addition, cold rolling was performed to form a titanium sheet having a thickness of 1.0 mm, and as an annealing treatment, a heat treatment of heating to 600 to 750° C. in vacuum or in an inert gas atmosphere and holding at that temperature for 240 minutes was performed to thereby produce titanium composite materials 2 as Inventive Examples of the present invention of Nos. 67 to 69 shown in Table 15.

A test specimen measuring 20 mm×20 mm was taken from each of these specimens, and after polishing the surface and edges of each test specimen with #400 sandpaper, the test specimens were exposed in atmosphere for 200 hours at temperatures of 700° C. and 750° C., respectively, a change in weight between before and after the test was measured, and the amount of oxidation increase per unit cross-sectional area was determined. The results are shown collectively in Table 15. Note that, with respect to the values for an element concentration of a surface layer portion in Table 15, the values shown were obtained by performing line analysis using EPMA and averaging the measurement results in a range from the surface to the lower end of the alloy layer.

TABLE 15

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation increase Amount (g/m²) | | Producibility | Remarks |
| --- | --- | --- | --- | --- | --- | --- | --- | --- | --- | --- | --- | --- |
| | | Si | Nb | Al | Ta | | | | 700° C. | 750° C. | | |
| 67 | JIS Class 1 | 0.30 | — | — | — | 210 | 18.0 | 1.0 | 17 | 51 | Favorable | Example |
| 68 | JIS Class 2 | — | 0.51 | — | — | 70 | 7.0 | 4.0 | 18 | 51 | Favorable | Example |
| 69 | JIS Class 3 | 0.31 | — | 0.30 | — | 100 | 10.0 | 4.0 | 19 | 55 | Favorable | Example |

Note that, although elements originating from the slab (base metal) were contained in the surface layer portion, only the contents of elements which were not contained in the slab are shown in the table.

In the Inventive Example of the present invention of No. 67, the inner part 5 was composed of commercially pure titanium of JIS Class 1, the outer layers 3 and 4 contained Si, and the thickness thereof was also an adequate thickness of 5 μm or more. Therefore, the Inventive Example of No. 67 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 68, the inner part 5 was composed of commercially pure titanium of JIS Class 2, the outer layers 3 and 4 contained Nb, and the thickness thereof was also an adequate thickness of 5μm or more. Therefore, the Inventive Example of No. 68 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 69, the inner part 5 was composed of commercially pure titanium of JIS Class 3, the outer layers 3 and 4 contained Si and Al, and the thickness thereof was also an adequate thickness of 5 μm or more. Therefore, the Inventive Example of No. 69 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-9

In Inventive Examples of the present invention shown in Nos. 70 to 72 in Table 16, titanium material for hot rolling having dimensions of 200 mm×1000 mm×4500 mm (thickness×width×length) obtained by performing plasma melting and casting with a rectangular mold was used. Material consisting of one or more types of element among Nb, Si and Al was spread on the titanium material for hot rolling, and thereafter surface layer melting was performed, after which the material surface temperature was held at a temperature of 300° C. for one hour or more. Further, in the Inventive Example of the present invention shown in No. 27, titanium material for hot rolling having dimensions of 200 mm×1000 mm×4500 mm (thickness×width×length) in which faces corresponding to rolling surfaces were cut and finished which was obtained after performing plasma melting and casting with a rectangular mold was used. Material consisting of one or more types of element among Nb, Si and Al was spread on the titanium material for hot rolling, and thereafter surface layer melting was performed, after which the material surface temperature was held at a temperature of 250° C. for one hour or more.

Thereafter, each slab was heated to 820° C. and subjected to hot rolling to a thickness of 5 mm, and the front and back surfaces were then both subjected to a descaling treatment using shot blasting and nitric-hydrofluoric acid. In addition, as an annealing treatment, a heat treatment of heating to 600 to 700° C. in vacuum or in an inert gas atmosphere and holding at that temperature for 240 minutes was performed.

A test specimen measuring 20 mm×20 mm was taken from each of these specimens, and after polishing the surface and edges of each test specimen with #400 sandpaper, the test specimens were exposed in atmosphere for 200 hours at temperatures of 700° C. and 750° C., respectively, a change in weight between before and after the test was measured, and the amount of oxidation increase per unit cross-sectional area was determined. The results are shown collectively in Table 16. Note that, with respect to the value of an element concentration of a surface layer portion in Table 16, the values shown were obtained by performing line analysis using EPMA and averaging the measurement results in a range from the surface to the lower end of the alloy layer.

In the Inventive Example of the present invention of No. 72, the inner part 5 was composed of commercially pure titanium of JIS Class 3, the outer layers 3 and 4 contained Si and Al, and the thickness thereof was also an adequate thickness of 5 μm or more. Therefore, the Inventive Example of No. 72 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Example 2-10

In an Inventive Example of the present invention shown in No. 73 that is described in Table 17, titanium material for hot rolling was used that had dimensions of 200 mm×1000 mm×4500 mm (thickness×width×length) in which, after the titanium material for hot rolling was broken down into a rectangular shape, faces corresponding to rolling surfaces were cut and finished. Material containing Si was spread on the titanium material for hot rolling, after which surface layer melting was performed, and thereafter the surface temperature of the titanium material for hot rolling was held at a temperature of 150° C. for one hour or more. Further, in the Inventive Example of the present invention shown in No. 74, titanium material for hot rolling was used that had dimensions of 50 mm×1000 mm×4500 mm (thickness× width×length) in which, after the titanium material for hot rolling was broken down into a rectangular shape, faces corresponding to rolling surfaces were cut and finished.

TABLE 16

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase Amount (g/m) | | Producibility | Remarks |
|---|---|---|---|---|---|---|---|---|---|---|---|---|
| | | Si | Nb | Al | Ta | | | | 700° C. | 750° C. | | |
| 70 | JIS Class 1 | 0.21 | — | — | — | 45 | 4.5 | 2.0 | 21 | 60 | Favorable | Example |
| 71 | JIS Class 2 | — | 0.50 | — | — | 30 | 3.0 | 2.0 | 17 | 59 | Favorable | Example |
| 72 | JIS Class 3 | 0.20 | — | 0.25 | — | 30 | 3.0 | 4.0 | 22 | 60 | Favorable | Example |

Note that, although elements originating from the slab (base metal) were contained in the surface layer portion, only the contents of elements which were not contained in the slab are shown in the table.

In the Inventive Example of the present invention of No. 70, the inner part 5 was composed of commercially pure titanium of JIS Class 1, the outer layers 3 and 4 contained Si, and the thickness thereof was also an adequate thickness of 5 μm or more. Therefore, the Inventive Example of No. 70 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 71, the inner part 5 was composed of commercially pure titanium of JIS Class 2, the outer layers 3 and 4 contained Nb, and the thickness thereof was also an adequate thickness of 5 μm or more. Therefore, the Inventive Example of No. 71 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

Material containing respective elements consisting of Si was spread on the titanium material for hot rolling, after which surface layer melting was performed, and thereafter the surface temperature of the titanium material for hot rolling was held at a temperature of 350° C. for one hour or more.

Thereafter, each slab was heated to 820° C. and subjected to hot rolling to a thickness of 5 mm, and the front and back surfaces were then both subjected to a descaling treatment using shot blasting and nitric-hydrofluoric acid. In addition, as an annealing treatment, a heat treatment of heating to 600 to 700° C. in vacuum or in an inert gas atmosphere and holding at that temperature for 240 minutes was performed.

A test specimen measuring 20 mm×20 mm was taken from each of these specimens, and after polishing the surface and edges of each test specimen with #400 sandpaper, the test specimens were exposed in atmosphere for 200 hours at temperatures of 700° C. and 750° C., respectively, a change in weight between before and after the test was measured, and the amount of oxidation increase per unit cross-sectional area was determined. The results are shown collectively in Table 17. Note that, with respect to the value of an element concentration of the outer layers 3 and 4 in Table 17, the values shown were obtained by performing line analysis using EPMA and averaging the measurement results in a range from the surface to the lower end of the alloy layer.

TABLE 17

| No. | Slab Type | Composition of Surface layer Portion (mass %) | | | | Outer Layer Thickness (μm) | Outer Layer Occupancy Ratio (%) | Intermediate Layer Thickness (μm) | 200 Hours Oxidation Increase Amount (g/m²) | | Producibility | Remarks |
|---|---|---|---|---|---|---|---|---|---|---|---|---|
| | | Si | Nb | Al | Ta | | | | 700° C. | 750° C. | | |
| 73 | JIS Class 1 | 0.25 | — | — | — | 140 | 2.8 | 1.0 | 15 | 50 | Favorable | Example |
| 74 | JIS Class 2 | 0.31 | — | — | — | 310 | 31.0 | 3.0 | 13 | 55 | Favorable | Example |

Note that, although elements originating from the slab (base metal) were contained in the surface layer portion, only the contents of elements which were not contained in the slab are shown in the table.

In the Inventive Example of the present invention of No. 73, the inner part 5 was composed of commercially pure titanium of JIS Class 1, the outer layers 3 and 4 contained Si, and the thickness thereof was also an adequate thickness of 5 μm or more. Therefore, the Inventive Example of No. 73 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

In the Inventive Example of the present invention of No. 74, the inner part 5 was composed of commercially pure titanium of JIS Class 2, the outer layers 3 and 4 contained Si, and the thickness thereof was also an adequate thickness of 5 μm or more. Therefore, the Inventive Example of No. 74 exhibited excellent oxidation resistance, with respect to which the amount of oxidation increase caused by heating for 200 hours at 700° C. was 25 g/m² or less and the amount of oxidation increase caused by heating for 200 hours at 750° C. was 70 g/m² or less.

EXAMPLE 3

Example 3-1

Hereunder, a test specimen manufacturing process is described as an example of the present invention. As material for hot rolling, slabs were prepared under the conditions for melting, breakdown, and surface finishing described hereunder. The respective slabs are denoted by the symbols S1, S2, S3, S4 and S5.

S1: Slab that was cast using an electron beam remelting process; surface was subjected to mechanical cutting.

S2: Slab that was cast using an electron beam remelting process; surface was as cast.

S3: Rectangular ingot that was cast using an electron beam remelting process, and broken down into a slab shape; surface was subjected to mechanical cutting.

S4: Cylindrical ingot that was cast using a vacuum arc remelting process, and broken down into a slab shape; surface was subjected to mechanical cutting.

S5: Slab that was cast using a plasma arc melting process; surface was subjected to mechanical cutting.

S6: Slab obtained by subjecting the surface of the slab described in S2 to melting and resolidification using an electron beam.

Note that, Example 3-1 is an example in which a material for hot rolling consisting of commercially pure titanium was used, and the chemical composition thereof was O: 0.030 to 0.33%, Fe: in a range of 0.027 to 0.090%, C: 0.01% or less, H: 0.003 or less, and N: 0.006% or less.

Pure titanium sheets 7 having a higher concentration of Fe, Cr, Ni, Al and Zr than the above slabs 6 were attached to the surfaces of the slabs 6 by a method which attached the pure titanium sheets 7 to the slabs 6 by welding in vacuum, that is, pure titanium sheets of various thicknesses containing Fe and the like were superposed on the surfaces of the slabs 6 and the peripheries thereof were joined by electron beam welding. For some of the slabs 6, pure titanium sheets 8 having a higher concentration of Fe and the like than the slab 6 were joined by electron beam welding to the side faces of the slabs.

Note that, the thickness of a standard slab was made 125 mm. Some of the slabs used were made with a thickness of 75 mm, 40 mm or the like in order to adjust the proportion occupied by the outer layer thickness with respect to the overall thickness.

Each titanium slab was heated to 850° C. and subjected to hot rolling to a thickness of 5 mm, and the front and back surfaces were then both subjected to a descaling treatment using shot blasting and nitric-hydrofluoric acid, which was further followed by cold rolling to form a titanium sheet having a thickness of 0.5 to 1.0 mm and subsequently annealing in vacuum or in an inert gas atmosphere to thereby produce test specimens as Inventive Examples of the present invention.

In addition to the Inventive Examples of the present invention, the processes up to cold rolling were similarly performed using titanium slabs which were not joined to titanium sheets 7, and a heat treatment was performed in which the titanium slabs were heated to 580 to 780° C. in vacuum or in an inert gas atmosphere and held at that temperature for 240 minutes to produce test specimens as Comparative Examples.

For each test specimen, the α-phase grain size, tensile strength, elongation, fatigue strength, and formability at respective locations were evaluated under conditions described below.

With respect to each test specimen as the titanium composite material 2, the α-phase grain size, tensile strength, elongation, fatigue strength, and formability at respective locations were evaluated under conditions described below.

(α-Phase Grain Size)

The thickness of an additional element concentrated region of the outer layer was measured by EPMA. A central position with respect to the sheet thickness and an average grain size of the α-phase within the thickness of the additional element concentrated region of the outer layer in a micro-structure photograph that was photographed by an optical microscope were calculated by an intercept method according to JIS G 0551 (2005).

(Tensile Strength, Elongation)

Tensile test specimens were prepared in which a parallel portion was 6.25×32 mm, a distance between gauge points was 25 mm, a chuck portion was 10 mm in width and an overall length was 80 mm (size that was half the size of a JIS13-B tensile test specimen), and a tensile test was carried out under conditions of an elastic stress rate of 0.5%/min between gauge points until a 0.2% yield stress measurement and 30%/min from the yield stress onward. In this case, the tensile strength and total elongation in a direction perpendicular to the rolling direction were evaluated.

(Fatigue Strength)

Figure 8:
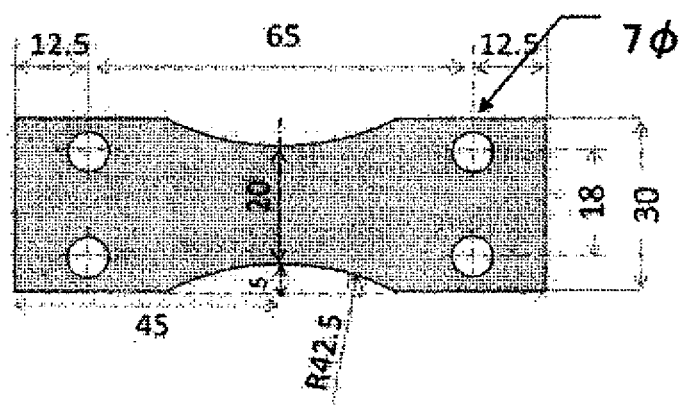
FIG. 8 is an explanatory drawing illustrating a plane bending fatigue test specimen.

A fatigue test was performed under conditions of a stress ratio R=−1 and a frequency of 25 Hz using the plane bending fatigue test specimen illustrated in FIG. 8 and a plane bending fatigue testing machine manufactured by Tokyo Koki Co. Ltd. The number of repetitions until rupturing at respective stress amplitudes was determined to prepare a stress fatigue curve, and a fatigue limit (fatigue strength) at which rupturing did not occur even when bending was repeated $10^7$ times was evaluated.

(Formability)

A titanium sheet that was worked into a shape of 90 mm×90 mm×0.5 mm was subjected to a spherical stretch forming test using a spherical punch of ϕ40 mm using a deep drawing testing machine of model number SAS-350D manufactured by Tokyo Testing Machine Inc. For the punch stretch forming test, a high viscosity oil (#660) manufactured by Nihon Kohsakuyu Co., Ltd. was applied and a polyethylene sheet was placed thereon so that the punch and titanium sheet did not directly contact, and evaluation was performed by comparison with a bulge height at a time when the test specimen ruptured. Because a bulge height in a spherical stretch forming test is strongly affected by the oxygen concentration, it can be said that the formability is more favorable when the bulge height is 21.0 mm or more with respect to JIS Class 1, is 19.0 mm or more with respect to JIS Class 2, and is 13.0 mm or more with respect to JIS Class 3.

Figure 9:
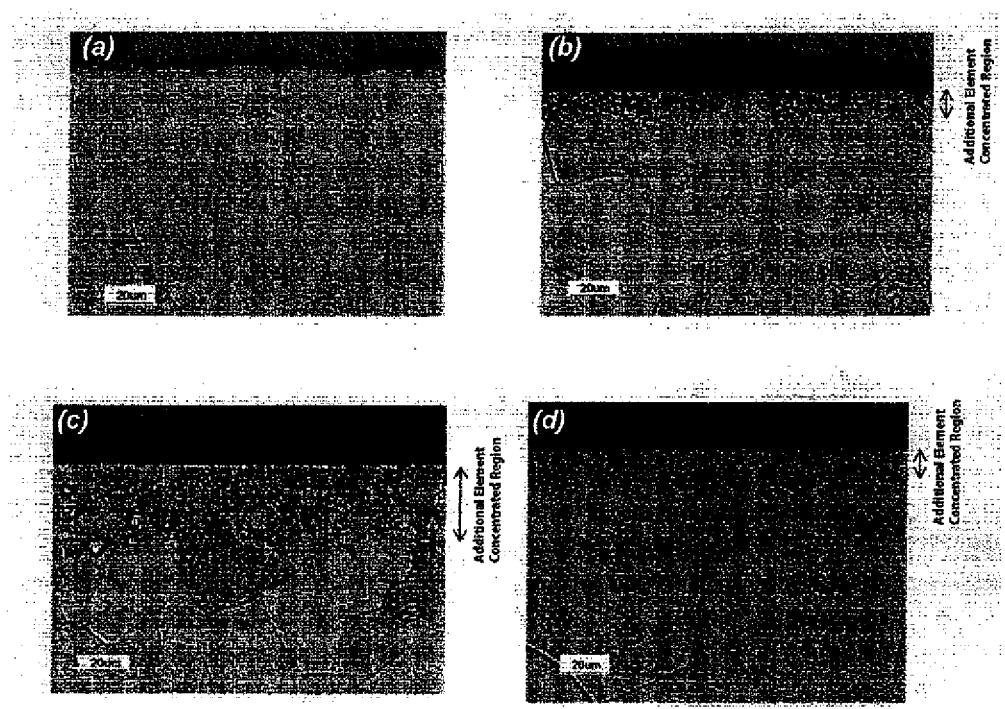
FIG. 9 is a view showing photographs of an example of micro-structures in a case where test specimens were manufactured by a melting and resolidifying method.

FIG. 9 shows examples of micro-structure photographs in a case where test specimen was manufactured by the hot-rolled cladding method. FIG. 9(*a*) is a micro-structure photograph of test specimen No. Al, FIG. 9(*b*) is a micro-structure photograph of test specimen No. A14, FIG. 9(*c*) is a micro-structure photograph of test specimen No. A15, and FIG. 9(*d*) is a micro-structure photograph of test specimen No. A16. Note that, the test specimen shown in FIG. 9(*a*) is a common titanium material as a Comparative Example, and the test specimens shown in FIG. 9(*b*) to FIG. 9(*d*) are each Inventive Examples of the present invention.

The test results are shown collectively in Tables 18 and 19. Table 18 shows results for a case in which material for hot rolling consisting of commercially pure titanium equivalent to JIS Class 1 was used, and Table 19 shows results for a case in which material for hot rolling consisting of commercially pure titanium equivalent to JIS Classes 2 and 3 were used.

TABLE 18

| Test Material No. | Material for Hot Rolling Material Symbol (melting method, surface state) | Material for Hot Rolling Main Components Type JIS | Material for Hot Rolling Main Components (mass %) O | Material for Hot Rolling Main Components (mass %) Fe | Titanium Sheet Welded to Surface of Material for Hot Rolling Type JIS | Titanium Sheet Welded - Alloy Component Elements (components adjustably added to Material) Components | Titanium Sheet Welded - Alloy Component Elements Mass % | Titanium Sheet Welded - Oxygen Concentration Mass % | Conditions After Hot Rolling - Final Sheet Thickness After Cold Rolling (mm) | Conditions After Hot Rolling - Final Annealing Conditions Temperature (°C.) | Conditions After Hot Rolling - Final Annealing Conditions Time (min) | Characteristics of End product (Titanium Composite/Material Sheet Product) Grain Size of Inner Layer (Sheet thickness center) (μm) |
|---|---|---|---|---|---|---|---|---|---|---|---|---|
| A 1 | S1 | Class 1 | 0.043 | 0.028 | Class 1 | — | — | — | 1.0 | 580 | 240 | 14 |
| A 2 | S1 | Class 1 | 0.043 | 0.028 | Class 1 | — | — | — | 1.0 | 660 | 240 | 55 |
| A 3 | S1 | Class 1 | 0.043 | 0.020 | Class 1 | — | — | — | 1.0 | 780 | 240 | 300 |
| A 5 | S1 | Class 1 | 0.043 | 0.090 | Class 1 | Fe | 0.10 | 0.043 | 0.5 | 630 | 240 | 7 |
| A 6 | S1 | Class 1 | 0.043 | 0.028 | Class 1 | Fe | 0.10 | 0.045 | 1.0 | 660 | 240 | 55 |
| A 7 | S1 | Class 1 | 0.043 | 0.028 | Class 1 | Fe | 0.10 | 0.043 | 1.0 | 630 | 240 | 31 |
| A 8 | S1 | Class 1 | 0.043 | 0.028 | Class 1 | Fe | 0.10 | 0.043 | 1.0 | 580 | 240 | 14 |
| A 9 | S1 | Class 1 | 0.043 | 0.028 | Class 1 | Fe | 0.10 | 0.043 | 1.0 | 630 | 240 | 31 |
| A 10 | S1 | Class 1 | 0.043 | 0.028 | Class 1 | Fe | 0.10 | 0.043 | 1.0 | 660 | 240 | 55 |
| A 11 | S1 | Class 1 | 0.043 | 0.028 | Class 1 | Fe | 0.10 | 0.043 | 1.0 | 660 | 240 | 55 |
| A 12 | S1 | Class 1 | 0.043 | 0.028 | Class 1 | Fe | 0.10 | 0.043 | 0.5 | 660 | 240 | 55 |
| A 13 | S1 | Class 1 | 0.043 | 0.028 | Class 1 | Fe | 0.10 | 0.044 | 0.5 | 660 | 240 | 55 |
| A 14 | S1 | Class 1 | 0.043 | 0.028 | Class 1 | Fe | 0.21 | 0.044 | 0.5 | 630 | 240 | 31 |
| A 15 | S1 | Class 1 | 0.043 | 0.028 | Class 1 | Fe | 0.21 | 0.044 | 0.5 | 640 | 240 | 35 |
| A 16 | S1 | Class 1 | 0.043 | 0.028 | Class 1 | Fe | 0.10 | 0.043 | 0.5 | 700 | 240 | 74 |
| A 17 | S1 | Class 1 | 0.043 | 0.028 | Class 1 | Fe | 0.21 | 0.044 | 0.5 | 700 | 240 | 96 |
| A 18 | S1 | Class 1 | 0.043 | 0.028 | Class 1 | Fe | 0.41 | 0.044 | 0.5 | 730 | 240 | 31 |
| A 19 | S1 | Class 1 | 0.043 | 0.028 | Class 1 | Fe | 0.10 | 0.043 | 0.5 | 730 | 240 | 31 |
| A 20 | S1 | Class 1 | 0.043 | 0.028 | Class 1 | Fe | 0.10 | 0.043 | 0.5 | 660 | 240 | 55 |
| A 21 | S1 | Class 1 | 0.043 | 0.028 | Class 1 | Fe | 0.10 | 0.043 | 0.5 | 630 | 240 | 31 |
| A 22 | S1 | Class 1 | 0.043 | 0.028 | Class 1 | Fe | 0.10 | 0.043 | 0.5 | 650 | 240 | 31 |
| A 23 | S1 | Class 1 | 0.043 | 0.028 | Class 1 | Fe | 0.15 | 0.043 | 0.5 | 650 | 240 | 31 |
| A 24 | S1 | Class 1 | 0.043 | 0.028 | Class 1 | Fe | 0.47 | 0.043 | 1.0 | 630 | 240 | 31 |
| A 25 | S1 | Class 1 | 0.044 | 0.028 | Class 1 | Fe | 0.10 | 0.043 | 1.0 | 660 | 240 | 56 |
| A 26 | S2 | Class 1 | 0.043 | 0.028 | Class 1 | Fe | 0.10 | 0.043 | 1.0 | 630 | 240 | 55 |
| A 27 | S3 | Class 1 | 0.045 | 0.030 | Class 1 | Fe | 0.10 | 0.043 | 1.0 | 660 | 240 | 54 |
| A 28 | S5 | Class 1 | 0.044 | 0.027 | Class 1 | Fe | 0.10 | 0.043 | 1.0 | 650 | 240 | 55 |

TABLE 18-continued

| | | | | | | | | | | | |
|---|---|---|---|---|---|---|---|---|---|---|---|
| A 31 | S1 | Class 1 | 0.043 | 0.028 | Class 1 | Al | 0.21 | 0.043 | 0.5 | 650 | 30 | 35 |
| A 32 | S1 | Class 1 | 0.043 | 0.028 | Class 1 | Al | 0.21 | 0.043 | 0.5 | 700 | 30 | 44 |
| A 33 | S1 | Class 1 | 0.043 | 0.028 | Class 1 | Cr | 0.40 | 0.044 | 0.5 | 660 | 240 | 55 |
| A 34 | S1 | Class 1 | 0.043 | 0.028 | Class 1 | N | 0.20 | 0.042 | 0.5 | 680 | 240 | 55 |
| A 35 | S1 | Class 1 | 0.043 | 0.028 | Class 1 |  | 0.21 | 0.042 | 0.5 | 680 | 240 | 55 |
| A 36 | S1 | Class 1 | 0.043 | 0.028 | Class 1 | Zr |  | 0.041 | 0.5 | 660 | 240 | 55 |
| A 37 | S1 | Class 1 | 0.043 | 0.028 | Class 1 | Fe0.75Cr0.018, Fe0.008/Total 0.10 |  | 0.041 | 0.5 | 660 | 240 | 55 |
| A 38 | S1 | Class 1 | 0.043 | 0.028 | Class 1 | Fe0.15 10.037, N0.017/Total 0.21 |  | 0.043 | 0.5 | 60 | 240 | 55 |
| A 39 | S1 | Class 1 | 0.043 | 0.028 | Class 1 | Fe0.062, A10.09, Cr0.015, Zr0.05/ Total 0.22 | Fe | 0.10 | 0.043 | 1.0 | 660 | 240 | 55 |

Characteristics of End product
(Titanium Composite/Material Sheet Product)

| Test Material No. | Outer Layer (additional element concentrated region) Yes/No | Thickness (μm) | Sheet Thickness (%) | Intermediate Layer Thickness (μm) | Average Grain Size (μm) | Elongation (%) | Tensile Strength (MPa) | Fatigue Strength (MPa) | Fatigue Strength Ratio | Bulge Height (mm) | Remarks |
|---|---|---|---|---|---|---|---|---|---|---|---|
| A 1 | No | — | — | — | — | 45 | 349 | 221 | 0.53 | 20.3 | Comparison |
| A 2 | No | — | — | — | — | 49 | 289 | 182 | 0.63 | 21.9 | Comparison |
| A 3 | No | — | — | — | — | 56 | 284 | 187 | 0.55 | 19.9 | Comparison |
| A 5 | Yes | 20 | 4.0 | 0.2 | 5 | 22 | 390 | 265 | 0.65 | 18.2 | Comparison |
| A 6 | Yes | 46 | 4.5 | 2.0 | 14 | 45 | 294 | 223 | 0.75 | 21.8 | Present Invention |
| A 7 | Yes | 22 | 2.2 | 2.0 | 5 | 39 | 308 | 235 | 0.76 | 21.4 | Present Invention |
| A 8 | Yes | 60 | 5.0 | 0.5 | 5 | 33 | 384 | 250 | 0.73 | 20.4 | Present Invention |
| A 9 | Yes | 60 | 5.0 | 1.0 | 5 | 42 | 390 | 238 | 0.77 | 21.5 | Present Invention |
| A 10 | Yes | 15 | 1.5 | 2.0 | 5 | 40 | 300 | 229 | 0.75 | 21.4 | Present Invention |
| A 11 | Yes | 41 | 4.1 | 2.0 | 5 | 39 | 304 | 235 | 0.76 | 21.5 | Present Invention |
| A 12 | Yes | 38 | 7.5 | 2.0 | 5 | 39 | 311 | 235 | 0.76 | 21.4 | Present Invention |
| A 13 | Yes | 29 | 3.9 | 1.0 | 5 | 41 | 301 | 228 | 0.76 | 21.4 | Present Invention |
| A 14 | Yes | 11 | 2.1 | 2.0 | 5 | 40 | 287 | 227 | 0.78 | 21.3 | Present Invention |
| A 15 | Yes | 36 | 7.5 | 1.0 | 5 | 43 | 289 | 226 | 0.76 | 21.7 | Present Invention |
| A 16 | Yes | 11 | 2.2 | 3.0 | 12 | 44 | 287 | 202 | 0.70 | 21.5 | Present Invention |
| A 17 | Yes | 36 | 7.0 | 3.0 | 10 | 46 | 296 | 227 | 0.77 | 21.6 | Present Invention |
| A 18 | Yes | 1 | 0.2 | 1.0 | 3 | 45 | 294 | 184 | 0.63 |  | Comparison |

TABLE 18-continued

| | | | | | | | | | | | |
|---|---|---|---|---|---|---|---|---|---|---|---|
| A 19 | Yes | 5 | 1.0 | 1.0 | 6 | 36 | 285 | 184 | 0.67 | 21.2 | Present Invention |
| A 20 | Yes | 8 | 1.0 | 2.0 | 9 | 38 | 286 | 203 | 0.69 | 21.4 | Present Invention |
| A 21 | Yes | 20 | 10.0 | 1.0 | 6 | 34 | 324 | 234 | 0.70 | 21.3 | Present Invention |
| A 22 | Yes | 74 | 14.6 | 1.0 | 5 | 29 | 335 | 241 | 0.72 | 21.2 | Present Invention |
| A 23 | Yes | 30 | 5.0 | 1.0 | 4 | 34 | 325 | 244 | 0.75 | 21.2 | Present Invention |
| A 24 | Yes | 51 | 5.1 | 1.0 | 3 | 33 | 327 | 250 | 0.78 | 21.1 | Present Invention |
| A 25 | Yes | 51 | 5.1 | 2.0 | 9 | 37 | 305 | 230 | 0.75 | 21.3 | Present Invention |
| A 26 | Yes | 51 | 5.1 | 2.0 | 9 | 37 | 306 | 234 | 0.78 | 21.4 | Present Invention |
| A 27 | Yes | 49 | 4.9 | 2.0 | 10 | 38 | 307 | 232 | 0.78 | 21.3 | Present Invention |
| A 28 | Yes | 50 | 5.0 | 2.0 | 9 | 37 | 305 | 233 | 0.76 | 21.4 | Present Invention |
| A 31 | Yes | 22 | 4.4 | 3.0 | 3 | 38 | 310 | 231 | 0.75 | 21.1 | Present Invention |
| A 32 | Yes | 22 | 4.4 | 3.0 | 10 | 34 | 305 | 228 | 0.75 | 21.4 | Present Invention |
| A 33 | Yes | 22 | 4.3 | 2.0 | 3 | 37 | 312 | 234 | 0.75 | 21.0 | Present Invention |
| A 34 | Yes | 22 | 4.3 | 2.0 | 9 | 36 | 316 | 239 | 0.78 | 21.2 | Present Invention |
| A 35 | Yes | 22 | 4.5 | 2.0 | 8 | 42 | 301 | 227 | 0.75 | 21.3 | Present Invention |
| A 36 | Yes | 23 | 4.6 | 2.0 | 7 | 40 | 310 | 233 | 0.75 | 21.2 | Present Invention |
| A 37 | Yes | 23 | 4.5 | 2.0 | 7 | 39 | 317 | 237 | 0.75 | 21.1 | Present Invention |
| A 38 | Yes | 23 | 4.8 | 2.0 | 8 | 36 | 317 | 237 | 0.75 | 21.1 | Present Invention |
| A 39 | Yes | 49 | 4.8 | 2.0 | 9 | 36 | 305 | 234 | 0.77 | 21.4 | Present Invention |

Test specimens Nos. A8, 9 and 38 in Table 18 are examples in which titanium sheets 7 having a high concentration of Fe and the like were also welded and joined to side faces of the respective slabs 6.

Test specimens Nos. A1 to 3 are conventional examples that did not have the outer layers 3 and 4, for which the fatigue strength ratios were 0.63, 0.63 and 0.55 that are typical values as titanium materials.

All of the Inventive Examples of the present invention were excellent in both formability and fatigue strength.

In test specimen No. A5 that is a Comparative Example, because the thickness of the intermediate layer was lower than the range of the present invention, peeling of the outer layer occurred, and the elongation was not favorable.

In test specimen No. A18 that is a Comparative Example, because the thickness of the outer layers 3 and 4 was lower than the range of the present invention, the fatigue strength ratio was a typical value as a titanium material.

TABLE 19

| Test Material No. | Material for Hot Rolling | | | | | | Titanium Sheet Welded to Surface of Material for Hot Rolling | | | | Conditions After Hot Rolling | | | Characteristics of End product (Titanium Composite Material/Sheet Product) | |
|---|---|---|---|---|---|---|---|---|---|---|---|---|---|---|---|
| | Material Symbol (melting method, surface state) | Type | Main Components (mass %) | | | | Type | Alloy Component Elements (components adjustably added to Material) | | Oxygen Concentration | Final Sheet Thickness After Cold Rolling | Final Annealing Conditions | | Grain Size of Inner Layer | (Sheet thickness center) (μm) |
| | | JIS | O | | | Fe | JIS | Components | Mass % | Mass % | (mm) | Temperature (° C.) | Time (min) | | |
| B 1 | S1 | Class 2 | 0.082 | | | 0.058 | Class 2 | — | — | — | 1.0 | 600 | 240 | | 30 |
| B 2 | S1 | Class 2 | 0.082 | | | 0.056 | Class 2 | — | — | — | 1.0 | 700 | 240 | | 65 |
| B 3 | S1 | Class 2 | 0.082 | | | 0.056 | Class 2 | Fe | 0.10 | 0.090 | 1.0 | 600 | 240 | | 30 |
| B 4 | S1 | Class 2 | 0.082 | | | 0.068 | Class 2 | Fe | 0.10 | 0.090 | 1.0 | 700 | 240 | | 65 |
| B 5 | S1 | Class 2 | 0.082 | | | 0.056 | Class 2 | Fe | 0.10 | 0.090 | 1.0 | 700 | 240 | | 65 |
| B 6 | S2 | Class 2 | 0.083 | | | 0.055 | Class 2 | Fe | 0.10 | 0.000 | 1.0 | 680 | 240 | | 39 |
| B 7 | S1 | Class 2 | 0.082 | | | 0.059 | Class 2 | Fe | 0.46 | 0.000 | 1.0 | 700 | 240 | | 65 |
| B 8 | S1 | Class 2 | 0.082 | | | 0.056 | Class 2 | Fe | 0.10 | 0.090 | 1.0 | 700 | 240 | | 65 |
| B 9 | S1 | Class 2 | 0.082 | | | 0.056 | Class 2 | Al | 0.21 | 0.092 | 1.0 | 700 | 240 | | 65 |
| B 10 | S1 | Class 2 | 0.082 | | | 0.056 | Class 2 | Fe0.08,Al0.89 Cr0.015, Zr0.05/ Total 0.22 | | 0.089 | 1.0 | 700 | 240 | | 65 |
| B 11 | S1 | Class 3 | 0.180 | | | 0.050 | Class 3 | — | — | — | 1.0 | 660 | 240 | | 38 |
| B 12 | S1 | Class 3 | 0.280 | | | 0.049 | Class 3 | — | — | — | 1.0 | 660 | 240 | | 38 |
| B 14 | S1 | Class 3 | 0.180 | | | 0.050 | Class 3 | Fe | 0.10 | 0.181 | 1.0 | 660 | 240 | | 39 |
| B 15 | S1 | Class 3 | 0.180 | | | 0.050 | Class 3 | Fe | 0.10 | 0.181 | 1.0 | 660 | 240 | | 39 |
| B 16 | S2 | Class 3 | 0.179 | | | 0.048 | Class 3 | Fe | 0.10 | 0.181 | 1.0 | 660 | 240 | | 40 |
| B 17 | S1 | Class 3 | 0.178 | | | 0.050 | Class 3 | Fe | 0.10 | 0.181 | 1.0 | 660 | 240 | | 39 |
| B 18 | S1 | Class 3 | 0.180 | | | 0.050 | Class 3 | Fe | 0.46 | 0.181 | 1.0 | 660 | 240 | | 39 |
| B 19 | S1 | Class 3 | 0.200 | | | 0.049 | Class 3 | Fe | 0.25 | 0.278 | 1.0 | 660 | 240 | | 41 |
| B 20 | S1 | Class 3 | 0.180 | | | 0.050 | Class 3 | Al | 0.70 | 0.179 | 1.0 | 660 | 240 | | 39 |
| B 21 | S1 | Class 3 | 0.180 | | | 0.060 | Class 3 | Fe0.06,Al0.09, Cr0.016Zr0.05 Total 0.22 | | 0.182 | 1.0 | 660 | 240 | | 39 |

TABLE 19-continued

| | | Characteristics of End product (Titanium Composite Material/Sheet Product) | | | | | | | | | |
|---|---|---|---|---|---|---|---|---|---|---|---|
| | | Outer Layer (additional element concentrated region) | | Thickness/ Sheet Thickness (%) | Intermediate Layer Thickness (μm) | Average Grain Size (μm) | Mechanical Characteristics | | | | |
| Test Material No. | Yes/No | Thickness (μm) | | | | | Elongation (%) | Tensile Strength (MPa) | Fatigue Strength (MPa) | Fatigue Strength Ratio | Bulge Height (mm) | Remarks |
| B 1 | No | — | — | — | — | 38 | 356 | 207 | 0.58 | 19.2 | Comparison |
| B 2 | No | — | — | — | — | 38 | 339 | 198 | 0.59 | 20.1 | Comparison |
| B 3 | Yes | 46 | 4.1 | 2.0 | 7 | 33 | 371 | 281 | 0.78 | 19.8 | Present Invention |
| B 4 | Yes | 41 | 1.1 | 3.0 | 10 | 37 | 340 | 260 | 0.76 | 20.5 | Present Invention |
| B 5 | Yes | 45 | 4.5 | 3.0 | 12 | 37 | 391 | 273 | 0.76 | 20.1 | Present Invention |
| B 6 | Yes | 45 | 4.5 | 2.0 | 7 | 32 | 379 | 284 | 0.76 | 19.7 | Present Invention |
| B 7 | Yes | 45 | 4.5 | 3.0 | 5 | 25 | 387 | 279 | 0.76 | 20.2 | Present Invention |
| B 8 | Yes | 85 | 8.5 | 3.0 | 10 | 30 | 381 | 285 | 0.75 | 19.4 | Present Invention |
| B 9 | Yes | 43 | 4.3 | 3.0 | 10 | 29 | 385 | 277 | 0.75 | 20.1 | Present Invention |
| B 10 | Yes | 43 | 4.3 | 3.0 | 7 | 34 | 385 | 275 | 0.75 | 20.2 | Present Invention |
| B 11 | No | — | — | 2.0 | — | 29 | 541 | 321 | 0.59 | 13.6 | Comparison |
| B 12 | No | — | — | 2.0 | — | 29 | 601 | 348 | 0.58 | 13.1 | Comparison |
| B 14 | Yes | 41 | 1.1 | 2.0 | 8 | 29 | 545 | 387 | 0.71 | 13.5 | Present Invention |
| B 15 | Yes | 44 | 4.4 | 2.0 | 7 | 27 | 656 | 402 | 0.72 | 13.4 | Present Invention |
| B 16 | Yes | 44 | 4.4 | 2.0 | 7 | 28 | 652 | 403 | 0.73 | 13.5 | Present Invention |
| B 17 | Yes | 85 | 4.5 | 2.0 | 8 | 25 | 555 | 415 | 0.73 | 13.2 | Present Invention |
| B 18 | Yes | 42 | 1.2 | 2.0 | 6 | 27 | 555 | 420 | 0.76 | 13.3 | Present Invention |
| B 19 | Yes | 43 | 4.3 | 2.0 | 4 | 26 | 606 | 424 | 0.70 | 13.2 | Present Invention |
| B 20 | Yes | 43 | 4.3 | 2.0 | 5 | 26 | 557 | 410 | 0.74 | 13.2 | Present Invention |
| B 21 | Yes | 43 | 4.3 | 2.0 | 5 | 26 | 605 | 419 | 0.69 | 13.1 | Present Invention |

Test specimens Nos. B1 and B2 are conventional examples that did not have the outer layers 3 and 4, for which the fatigue strength ratio was 0.58 or 0.59 that are typical values as titanium materials.

All of the Inventive Examples of the present invention were excellent in both formability and fatigue strength.

Example 3-2

In Example 3-2, examples are shown in which the following titanium alloys M1 to M10 were used for the slabs 6.

M1: ASTM Grade 7
M2: ASTM Grade 11
M3: ASTM Grade 16
M4: ASTM Grade 26
M5: ASTM Grade 30
M6: 0.02% Pd-0.022% Mm-Ti (O: 0.050%, Fe: 0.041%). Here, "Mm" denotes a mixed rare earth element before separation and refining (misch metal), and the composition thereof was 55% of Ce, 51% of La, 10% of Nd and 4% of Pr.
M7: 0.03% Pd-0.002% Y—Ti (O: 0.049%, Fe: 0.033%)
M8: 0.5% Cu—Ti (O: 0.048%, Fe: 0.038%)
M9: 1.0% Cu—Ti (O: 0.048%, Fe: 0.033%)
M10: 1.0Cu-0.5% Nb—Ti (O: 0.044%, Fe: 0.040%)

With respect to the slabs 6 consisting of the above titanium alloys, a method was adopted in which titanium sheets 7 consisting of the same titanium alloys as the respective slabs 6 and which had higher concentrations of Fe, Cr, Ni, Al and Zr than the respective slabs 6 were attached by welding in vacuum to the surfaces of the slabs 6, that is, titanium alloy sheets 7 of various thicknesses containing Fe, Cr, Ni, Al and Zr in a total concentration of 0.1 to 0.5% were superimposed on the surfaces of the slabs 6 and the peripheries thereof were joined by electron beam welding. Note that, when the Comparative Examples are also included, the total concentrations of Fe, Cr, Ni, Al and Zr of the titanium alloy sheets 7 were in a range of 0.03 to 1.1%. The other processes of the production method and the evaluation method were the same as in Example 3-1.

The results are shown collectively in Table 20.

TABLE 20

| Test Material No. | Material for Hot Rolling | | | | | | Characteristics of End Titanium Sheet Welded to Surface of Material for Hot Rolling | | | Conditions After Hot Rolling | | | product (Titanium Composite/Material Sheet Product) | |
|---|---|---|---|---|---|---|---|---|---|---|---|---|---|---|
| | Material Symbol (melting method, surface state) | Type JIS | Main Components (mass %) | | | Type JIS | Alloy Component Elements added to Material (components adjustably) | | Oxygen Concentration | Final Sheet Thickness After Cold Rolling | Final Annealing Conditions | | Grain Size of Inner Layer | (Sheet thickness center) (μm) |
| | | | O | Fe | | | Components | Mass % | Mass % | (mm) | Temperature (°C.) | Time (min) | | |
| C 1 | S4 | M1 | 0.123 | 0.056 | | M1 | — | — | — | 1.0 | 700 | 240 | | 39 |
| C 2 | S4 | M2 | 0.042 | 0.029 | | M2 | — | — | — | 1.0 | 700 | 240 | | 50 |
| C 3 | S4 | M3 | 0.121 | 0.045 | | M3 | — | — | — | 1.0 | 700 | 240 | | 41 |
| C 4 | S4 | M4 | 0.115 | 0.048 | | M4 | — | — | — | 1.0 | 700 | 240 | | 41 |
| C 5 | S4 | M5 | 0.119 | 0.052 | | M5 | — | — | — | 1.0 | 700 | 240 | | 35 |
| C 6 | S4 | M6 | 0.045 | 0.034 | | M6 | — | — | — | 1.0 | 700 | 240 | | 35 |
| C 7 | S4 | M7 | 0.042 | 0.035 | | M7 | — | — | — | 1.0 | 700 | 240 | | 49 |
| C 8 | S4 | M8 | 0.043 | 0.034 | | M8 | — | — | — | 1.0 | 700 | 240 | | 41 |
| C 9 | S4 | M9 | 0.042 | 0.038 | | M9 | — | — | — | 1.0 | 700 | 240 | | 41 |
| C 10 | S4 | M10 | 0.044 | 0.040 | | M10 | — | — | — | 1.0 | 700 | 240 | | 35 |
| C 11 | S4 | M1 | 0.123 | 0.056 | | M1 | Fe | 0.11 | 0.120 | 1.0 | 700 | 240 | | 35 |
| C 12 | S4 | M2 | 0.042 | 0.029 | | M2 | Fe | 0.11 | 0.043 | 1.0 | 700 | 240 | | 50 |
| C 13 | S4 | M3 | 0.121 | 0.048 | | M3 | Fe | 0.10 | 0.119 | 1.0 | 700 | 240 | | 41 |
| C 14 | S4 | M4 | 0.115 | 0.048 | | M4 | Fe | 0.12 | 0.120 | 1.0 | 700 | 240 | | 41 |
| C 15 | S4 | M5 | 0.119 | 0.052 | | M5 | Fe | 0.11 | 0.117 | 1.0 | 700 | 240 | | 35 |
| C 16 | S4 | M6 | 0.045 | 0.034 | | M6 | Fe | 0.11 | 0.043 | 1.0 | 700 | 240 | | 35 |
| C 17 | S4 | M7 | 0.042 | 0.035 | | M7 | Fe | 0.10 | 0.043 | 1.0 | 700 | 240 | | 41 |
| C 18 | S4 | M8 | 0.043 | 0.034 | | M8 | Fe | 0.10 | 0.042 | 1.0 | 700 | 240 | | 41 |
| C 19 | S4 | M9 | 0.042 | 0.036 | | M9 | Fe | 0.12 | 0.044 | 1.0 | 700 | 240 | | 41 |
| C 20 | S4 | M10 | 0.044 | 0.034 | | M10 | Fe | 0.10 | 0.044 | 1.0 | 700 | 240 | | 35 |
| C 21 | S4 | M1 | 0.123 | 0.056 | | | Fe0.082 A10.89 Cr0.015, Zr0.05/Total 0.22 | | 0.120 | 1.0 | 700 | 240 | | 35 |
| C 22 | S4 | M2 | 0.042 | 0.029 | | M2 | * | | 0.044 | 1.0 | 700 | 240 | | 50 |
| C 23 | S4 | M3 | 0.121 | 0.048 | | M3 | * | | 0.120 | 1.0 | 700 | 240 | | 41 |
| C 24 | S4 | M4 | 0.115 | 0.048 | | M4 | * | | 0.118 | 1.0 | 700 | 240 | | 41 |
| C 25 | S4 | M5 | 0.119 | 0.052 | | M5 | * | | 0.118 | 1.0 | 700 | 240 | | 35 |
| C 26 | S4 | M6 | 0.045 | 0.034 | | M6 | * | | 0.044 | 1.0 | 700 | 240 | | 35 |
| C 27 | S4 | M7 | 0.042 | 0.035 | | M7 | * | | 0.044 | 1.0 | 700 | 240 | | 48 |
| C 28 | S4 | M8 | 0.043 | 0.034 | | M8 | * | | 0.042 | 1.0 | 700 | 240 | | 41 |
| C 29 | S4 | M9 | 0.042 | 0.038 | | M9 | * | | 0.043 | 1.0 | 700 | 240 | | 41 |
| C 30 | S4 | M10 | 0.044 | 0.040 | | M10 | * | | 0.044 | 1.0 | 700 | 240 | | 39 |

TABLE 20-continued

Characteristics of End product (Titanium Composite/Material Sheet Product)

| Test Material No. | Outer Layer (additional element concentrated region) Yes/No | Thickness (μm) | Thickness/ Sheet Thickness (%) | Intermediate Layer Thickness (μm) | Average Grain Size (μm) | Elongation (%) | Tensile Strength (MPa) | Fatigue Strength (MPa) | Fatigue Strength Ratio | Bulge Height (mm) | Remarks |
|---|---|---|---|---|---|---|---|---|---|---|---|
| C 1 | No | — | — | — | — | 30 | 410 | 200 | 0.61 | 17.5 | Comparison |
| C 2 | No | — | — | — | — | 48 | 290 | 181 | 0.62 | 21.0 | Comparison |
| C 3 | No | — | — | — | — | 32 | 410 | 253 | 0.62 | 19.2 | Comparison |
| C 4 | No | — | — | — | — | 29 | 425 | 253 | 0.62 | 17.9 | Comparison |
| C 5 | No | — | — | — | — | 29 | 424 | 253 | 0.61 | 17.0 | Comparison |
| C 6 | No | — | — | — | — | 42 | 203 | 254 | 0.62 | 17.1 | Comparison |
| C 7 | No | — | — | — | — | 41 | 202 | 282 | 0.62 | 19.8 | Comparison |
| C 8 | No | — | — | — | — | 41 | 202 | 189 | 0.62 | 20.5 | Comparison |
| C 9 | No | — | — | — | — | 40 | 202 | 188 | 0.62 | 20.2 | Comparison |
| C 10 | No | — | — | — | — | 39 | 305 | 182 | 0.62 | 20.1 | Comparison |
| C 11 | Yes | 42 | 4.2 | 2.0 | 8 | 27 | 417 | 306 | 0.73 | 17.4 | Present Invention |
| C 12 | Yes | 42 | 4.2 | 2.0 | 8 | 42 | 293 | 220 | 0.75 | 21.7 | Present Invention |
| C 13 | Yes | 43 | 4.3 | 2.0 | 8 | 27 | 415 | 310 | 0.74 | 19.1 | Present Invention |
| C 14 | Yes | 43 | 4.3 | 2.0 | 8 | 27 | 430 | 310 | 0.72 | 17.4 | Present Invention |
| C 15 | Yes | 43 | 4.3 | 2.0 | 8 | 27 | 427 | 310 | 0.73 | 14.6 | Present Invention |
| C 16 | Yes | 45 | 4.5 | 2.0 | 8 | 37 | 387 | 222 | 0.73 | 17.0 | Present Invention |
| C 17 | Yes | 45 | 4.5 | 2.0 | 8 | 38 | 387 | 222 | 0.73 | 20.7 | Present Invention |
| C 18 | Yes | 45 | 4.6 | 4.0 | 8 | 37 | 387 | 222 | 0.74 | 20.4 | Present Invention |
| C 19 | Yes | 43 | 4.3 | 4.0 | 8 | 37 | 307 | 222 | 0.72 | 20.2 | Present Invention |
| C 20 | Yes | 45 | 4.4 | 4.0 | 8 | 33 | 315 | 225 | 0.71 | 20.1 | Present Invention |
| C 21 | Yes | 42 | 4.2 | 3.0 | 5 | 35 | 425 | 312 | 0.74 | 17.4 | Present Invention |
| C 22 | Yes | 44 | 4.4 | 2.0 | 5 | 41 | 301 | 220 | 0.73 | 21.6 | Present Invention |
| C 23 | Yes | 43 | 4.3 | 3.0 | 6 | 27 | 422 | 302 | 0.72 | 19.1 | Present Invention |
| C 24 | Yes | 43 | 4.3 | 2.0 | 5 | 27 | 432 | 302 | 0.72 | 17.5 | Present Invention |
| C 25 | Yes | 42 | 4.2 | 2.0 | 4 | 37 | 433 | 310 | 0.72 | 17.5 | Present Invention |
| C 26 | Yes | 43 | 4.3 | 2.0 | 5 | 37 | 307 | 224 | 0.73 | 17.5 | Present Invention |
| C 27 | Yes | 44 | 4.4 | 2.0 | 5 | 36 | 307 | 210 | 0.70 | 19.6 | Present Invention |
| C 28 | Yes | 45 | 4.4 | 3.0 | 5 | 37 | 305 | 210 | 0.71 | 20.4 | Present Invention |
| C 29 | Yes | 45 | 4.4 | 4.0 | 6 | 37 | 305 | 210 | 0.72 | 20.2 | Present Invention |
| C 30 | Yes | 43 | 4.3 | 3.0 | 5 | 32 | 322 | 220 | 0.71 | 20.0 | Present Invention |

Test specimens Nos. C11 to 30 in Table 20 are Inventive Examples of the present invention that satisfied all the requirements of the present invention, and test specimens Nos. C1 to 10 are Comparative Examples that did not satisfy the requirements of the present invention.

Test specimens Nos. C1 to 10 are conventional examples that do not have the outer layers 3 and 4, for which the fatigue strength ratio was 0.61 or 0.62 that are typical values as titanium materials.

Test specimens Nos. C11 to 30 that are Inventive Examples of the present invention were all excellent in both formability and fatigue strength.

EXAMPLE 4

Example 4-1

The present invention will now be described more specifically while referring to examples.

Titanium alloy sheets having a thickness of 3 mm were attached by electron beam welding in a vacuum atmosphere of $3\times10^{-3}$ Torr or less to the top and bottom surfaces of slabs consisting of commercially pure titanium of JIS Class 2 having a sheet thickness of 60 mm, a width of 100 mm and a length of 120 mm. Thereafter, the resulting slabs were heated to 850° C., and subjected to hot rolling to a sheet thickness of 4.8 to 5.0 mm. Next, annealing was performed at 600 to 650° C. in a vacuum atmosphere for 4 to 10 hours. In addition, shot blasting and pickling were performed to remove a scale layer.

As Inventive Examples of the present invention, the titanium composite sheet 2 shown in FIG. 2 was used in which, by performing the aforementioned hot-rolled cladding, the outer layers 3 and 4 consisted of Ti alloy and the inner part 5 consisted of commercially pure titanium of JIS Class 2. As Comparative Examples, commercially pure titanium JIS Class 2 materials that did not have the outer layers 3 and 4 were used. The sheet thickness was from 4.8 to 5 mm for both the Inventive Examples and the Comparative Examples.

The titanium composite sheets 2 of the Inventive Examples of the present invention and the titanium sheets of the Comparative Examples were exposed for five hours at 400 to 500° C. in a 1 vol % $H_2$+99% Ar atmosphere as a hydrogen-absorbing environment.

An impact test specimen with a 2 mm V-notch having dimensions of 4.8 to 5 mm×10 mm×55 mm was prepared from the titanium composite sheets 2 of the Inventive Examples of the present invention and the titanium sheets of the Comparative Examples taking the sheet thickness penetrating direction as the notch direction. The impact energy value was calculated by dividing absorbed impact energy that was measured with the Charpy impact test by the cross-sectional area of the test specimen fracture portion, and the obtained value was evaluated as a hydrogen embrittlement characteristic.

Further, to enable cross-sectional observation, the produced titanium composite sheets were embedded in resin and subjected to polishing and etching, and thereafter observed with an optical microscope and the thickness of the outer layers was measured. The measured thickness of the outer layers was divided by the overall thickness of the titanium composite material, and the calculated value was taken as the outer layer occupancy ratio. In the present examples, the outer layer occupancy ratio was within a range of 3 to 5%.

Table 21 shows the exposure conditions, hydrogen concentration and absorbed impact energy with respect to the conventional commercially pure titanium that did not have the outer layers 3 and 4. In the case where the conventional commercially pure titanium was exposed at 450° C. or more, the impact energy value obtained by dividing the absorbed impact energy by the cross-sectional area of the test specimen decreased to less than $2.0\times10^2$ J/cm². The impact energy value in a case where the hydrogen concentration is sufficiently low is $2.7\times10^2$ J/cm², and therefore the aforementioned value of $2.0\times10^2$ J/cm² was 20% or more less than in a case where the hydrogen concentration is sufficiently low. Thus, a case where the impact energy value was 20% or more less than the impact energy value when the hydrogen concentration is sufficiently low was determined as a case where hydrogen embrittlement occurred.

TABLE 21

| No | Treatment Temperature (° C.) | Time (h) | Hydrogen Concentration (ppm) | Intermediate Layer Thickness (μm) | Impact Energy Value (×10² J/cm²) | Remarks |
|---|---|---|---|---|---|---|
| 1 | 400 | 5 | 11 | — | 2.7 | Comparative Example |
| 2 | 450 | 5 | 41 | — | 1.9 | Comparative Example |
| 3 | 500 | 5 | 84 | — | 1.5 | Comparative Example |

Next, Inventive Examples of the present invention as the titanium composite sheets 2 in which the outer layers 3 and 4 consisted of Ti alloy will be described. The test results are shown collectively in Table 22. With respect to the value of an element concentration of the surface layer portion in Table 22, the values shown were obtained by performing line analysis using EPMA and averaging the measurement results in a range from the surface to the lower end of the alloy layer. Further, the exposure conditions under a hydrogen environment were 500° C. for five hours for all of the Inventive Examples, which correspond to the exposure conditions for No. 3 in Table 21.

TABLE 22

| No | Slab Type | Composition of Surface layer Portion (mass %) | | | | Mo Equivalent | Outer Layer Thickness (μm) | Outer Layer Occupancy Ratio (%) | Intermediate layer Thickness (μm) | Impact Energy Value (×10² J/cm²) | Remarks |
|---|---|---|---|---|---|---|---|---|---|---|---|
| | | Mo | V | Nb | Other | | | | | | |
| 2 | JIS Class 2 | 9 | — | — | — | 9 | 170 | 7.2 | 5.0 | 2.8 | Inventive Example |
| 3 | JIS Class 2 | 15 | — | — | — | 15 | 173 | 7.2 | 2.0 | 2.7 | Inventive Example |
| 4 | JIS Class 2 | 18 | — | — | — | 18 | 175 | 7.2 | 2.0 | 2.5 | Inventive Example |
| 7 | JIS Class 2 | — | 13 | — | — | 9 | 170 | 7.2 | 3.0 | 2.7 | Inventive Example |
| 8 | JIS Class 2 | — | 20 | — | — | 13 | 173 | 7.2 | 6.0 | 2.5 | Inventive Example |
| 9 | JIS Class 2 | — | 28 | — | — | 19 | 177 | 7.2 | 6.0 | 2.7 | Inventive Example |
| 10 | JIS Class 2 | 15 | — | 3 | Al = 3% | 16 | 173 | 7.2 | 3.0 | 2.6 | Inventive Example |
| 11 | JIS Class 2 | 8 | 8 | — | Al = 3% | 13 | 177 | 7.2 | 5.0 | 2.7 | Inventive Example |
| 12 | JIS Class 2 | — | 15 | — | Al = 3% Cr = 3% Sn = 3% | 10 | 173 | 7.2 | 2.0 | 2.5 | Inventive Example |
| 13 | JIS Class 2 | 11 | — | — | Zr = 5% Sn = 4% | 11 | 173 | 7.2 | 4.0 | 2.4 | Inventive Example |
| 14 | JIS Class 2 | 3 | 8 | 5 | | 10 | 170 | 7.2 | 3.0 | 2.7 | Inventive Example |

In Nos. 1 to 5, the Ti alloy of the outer layers 3 and 4 contained solely Mo, in Nos. 6 to 9 the Ti alloy of the outer layers 3 and 4 contained solely V, and in Nos. 10 to 15 the Ti alloy of the outer layers 3 and 4 contained a combination of two or more types of element among Mo, V and Nb.

As illustrated in Table 22, it was found that for Nos. 2 to 4 and 7 to 14 that were Inventive Examples of the present invention, the respective values of impact energy were high values of 2.4 to 2.8×10² J/cm², and the titanium composite sheets 2 had excellent hydrogen embrittlement resistance characteristics.

As illustrated in Table 2, the titanium composite sheets 2 according to the present invention had extremely superior hydrogen embrittlement resistance characteristics compared to the titanium sheets of the Comparative Examples.

Example 4-2

Titanium alloy Ti-15V-3Cr-3Sn-3Al sheets having a thickness of 1 to 25 mm were attached by electron beam welding in a vacuum atmosphere of 3×10⁻³ Torr or less to the top and bottom surfaces of titanium slabs consisting of commercially pure titanium of Class 2 having a sheet thickness of 60 mm, a width of 100 mm and a length of 120 mm. Thereafter, the slabs were heated to 850° C., and subjected to hot rolling to a sheet thickness of 4.8 to 5.0 mm. Next, annealing was performed at 600 to 650° C. in a vacuum atmosphere for 4 to 10 hours. In addition, shot blasting and pickling were performed to remove a scale layer.

Thereafter, similarly to Example 4-1, the slabs were exposed for five hours at 400 to 500° C. in a 1 vol % $H_2$+99% Ar atmosphere as a hydrogen-absorbing environment, and thereafter Charpy impact test specimens were extracted, impact energy values were calculated, and hydrogen embrittlement characteristics were evaluated.

The results are shown collectively in Table 23.

TABLE 23

| No | Slab Type | Attached Sheet Thickness (mm) | Overall Thickness Before Hot Rolling (mm) | Outer Layer Thickness (μm) | Outer Layer Occupancy Ratio (%) | Intermediate Layer Thickness (μm) | Impact Energy Value (×10² J/cm²) | Remarks |
|---|---|---|---|---|---|---|---|---|
| 1 | JIS Class 2 | 2 | 64 | 110 | 2.1 | 3.0 | 2.6 | Inventive Example |
| 2 | JIS Class 2 | 10 | 80 | 760 | 11.5 | 5.0 | 2.1 | Inventive Example |
| 3 | JIS Class 2 | 18 | 96 | 1420 | 17.8 | 6.0 | 2.0 | Inventive Example |

In Nos. 1 to 3 that are Inventive Examples of the present invention, the chemical composition and outer layer occupancy ratio were both in the range of the present invention, and the impact energy value was 2.0×10² J/cm² or more.

Example 4-3

As an Inventive Example of the present invention, titanium alloy Ti-15V-3Cr-3Sn-3Al sheets having a thickness of 5 mm were attached by electron beam welding in a vacuum atmosphere of 3×10⁻³ Torr or less to the top and bottom surfaces of a titanium slab consisting of titanium alloy Ti-1Fe-0.35O having a sheet thickness of 60 mm, a width of 100 mm and a length of 120 mm. Thereafter, the slab was heated to 850° C., and subjected to hot rolling to a sheet thickness of 4.8 to 5.0 mm. Next, annealing was performed at 600 to 650° C. in a vacuum atmosphere for 4 to 10 hours. In addition, shot blasting and pickling were performed to remove a scale layer.

A commercially pure titanium material of JIS Class 4 material that did not have the outer layers 3 and 4 was used as a Comparative Example. The sheet thickness was from 4.8 to 5 mm in each case.

Thereafter, the slabs were exposed to a hydrogen environment in a similar manner to Example 4-2, and thereafter Charpy impact test specimens were extracted, impact energy values were calculated, and hydrogen embrittlement characteristics were evaluated.

For the Ti-1Fe-0.35O alloy that did not have the outer layers 3 and 4, the impact energy value in a case where the slab was not exposed to a hydrogen environment was $0.38 \times 10^2$ J/cm².

The results are shown collectively in Table 24.

with the molybdenum sheet was melted to a depth of 3 to 15 mm by electron beam heating to form a region in which Mo was dissolved to a depth of 3 to 15 mm over the whole surface of the slab outer layer.

The respective slabs were heated to 850° C. and subjected to hot rolling to a thickness of 5 mm, and thereafter the front and back surfaces were both subjected to a descaling treatment using shot blasting and nitric-hydrofluoric acid. A heat treatment of heating to 600 to 700° C. in vacuum or in an inert gas atmosphere and holding at that temperature for 240 minutes was then performed.

In addition to Inventive Examples of the present invention, Comparative Examples were prepared using a titanium slab that did not have the outer layers 3 and 4 by performing a process of hot rolling, descaling and heat treatment in a similar manner.

The respective titanium sheets produced as described above were exposed for five hours at 500° C. in a 1 vol % $H_2$+99 vol % Ar atmosphere as a hydrogen-absorbing environment.

An impact test specimen with a 2 mm V-notch which had dimensions of a sheet thickness of (4.8 to 5 mm)×10 mm×55

TABLE 24

| No | Slab Type | Attached Sheet Thickness (mm) | Overall Thickness Before Hot Rolling (mm) | Outer Layer Thickness (μm) | Outer Layer Occupancy Ratio (%) | Intermediate Layer Thickness (μm) | Impact Energy Value (×10² J/cm²) | Remarks |
|---|---|---|---|---|---|---|---|---|
| 1 | Titanium Alloy Ti—1Fe—0.35O | — | 60 | — | — | — | 0.25 | Comparative Example |
| 2 | Titanium Alloy Ti—1Fe—0.35O | 5 | 70 | 300 | 6.1 | 3.0 | 0.37 | Inventive Example |

For No. 1 that is the Comparative Example which did not have the outer layers 3 and 4, the impact energy value was a low value of $0.25 \times 10^2$ J/cm².

In No. 2 that is the Inventive Example of the present invention, the chemical composition and the outer layer occupancy ratio were within the range of the present invention, and the impact energy value was $0.37 \times 10^2$ J/cm², which was a value that hardly decreased from a case where the slab was not exposed to a hydrogen environment.

Example 4-4

A slab having a thickness of 124 mm prepared by subjecting a commercially pure titanium ingot produced by vacuum arc remelting to hot forging followed by cutting was used as a slab sewing as the base metal for producing the titanium composite material 2 having the outer layers 3 and 4 containing a predetermined alloy. Note that, the chemical composition of the titanium ingot in the present example was in the range of O: 0.030 to 0.090% and Fe: 0.020 to 0.060%.

A pure molybdenum sheet having a thickness of 1 mm was placed on the slab surface, and the slab surface together mm was prepared from each titanium sheet. The longitudinal direction of the test specimen was adopted as the rolling direction, and the direction of the notch was made the sheet thickness penetrating direction. The hydrogen brittleness was evaluated using the impact energy value.

First, when there was no alloying element concentrated region in the outer layers, the impact energy value after exposure in the aforementioned hydrogen environment decreased to $1.4 \times 10^2$ J/cm². The result is described in No. 1 in Table 25.

Next, the examples of the titanium composite material 2 that are Inventive Examples of the present invention having the outer layers 3 and 4 will be described.

The alloying element concentration of the outer layers 3 and 4 was the average value of results obtained by performing line analysis in a range from the surface to the lower end of an alloy concentrated portion using EPMA. The balance was components contained in the commercially pure titanium, excluding contamination components such as O and C. The results are shown collectively in Table 25.

TABLE 25

| No | Outer Layer Mo Equivalent (%) | Outer Layer Thickness (μm) | Outer Layer Occupancy Ratio (%) | Intermediate Layer Thickness (μm) | Impact Energy Value (×10² J/cm²) | Remarks |
|---|---|---|---|---|---|---|
| 1 | — | — | — | — | 1.4 | Comparative Example |

TABLE 25-continued

| No | Outer Layer Mo Equivalent (%) | Outer Layer Thickness (μm) | Outer Layer Occupancy Ratio (%) | Intermediate Layer Thickness (μm) | Impact Energy Value (×10² J/cm²) | Remarks |
|---|---|---|---|---|---|---|
| 3 | 17 | 20 | 4.0 | 11.0 | 2.6 | Inventive Example |
| 4 | 10 | 36 | 7.0 | 4.0 | 2.5 | Inventive Example |
| 5 | 8.3 | 46 | 9.0 | 5.0 | 2.4 | Inventive Example |

Note that, although elements originating from the slab (base metal) were contained in the surface layer portion, only the contents of elements which were not contained in the slab are shown in the table.

Nos. 3 to 5 are Inventive Examples in which solely Mo was concentrated in the outer layers 3 and 4.

In Nos. 3 to 5 that are Inventive Examples of the present invention, the Mo equivalent in the outer layers 3 and 4 was 8.3 to 17% and the ratio of the alloy layer thickness to the sheet thickness was 8.1 to 19%, thereby satisfying the range of the present invention, and the impact energy values were 2.4 to 2.6×10² J/cm², which were thus not less than 2.0 J/cm².

Example 4-5

Powder of Mo, V and Nb was scattered over the slab surface, and the slab surface together with the alloy powder was melted to a depth of 2 to 8 mm by electron beam heating to form a region in which alloying elements were dissolved to a depth of 2 to 8 mm over the whole surface of the slab outer layer.

The respective slabs were heated to 850° C. and subjected to hot rolling to a thickness of 5 mm, and thereafter the front and back surfaces were both subjected to a descaling treatment using shot blasting and nitric-hydrofluoric acid. A heat treatment of heating to 600 to 700° C. in vacuum or in an inert gas atmosphere and holding at that temperature for 240 minutes was then performed.

The respective titanium sheets produced as described above were exposed for five hours at 500° C. in a 1 vol % H₂+99 vol % Ar atmosphere as a hydrogen-absorbing environment.

An impact test specimen with a 2 mm V-notch which had dimensions of a sheet thickness of (4.8 to 5 mm)×10 mm×55 mm was prepared from each titanium sheet. The direction of the notch was made the sheet thickness penetrating direction. The hydrogen brittleness was evaluated using impact energy values of the Charpy impact test The alloying element concentration of the outer layers 3 and 4 was the average value of results obtained by performing line analysis in a range from the surface to an alloy concentrated portion using EPMA. The balance was components contained in the commercially pure titanium, excluding contamination components such as O and C. Further, the exposure conditions under a hydrogen environment were 500° C. for five hours for all of the test specimens, which correspond to the exposure conditions for No. 3 in Table 21. The results are shown collectively in Table 26.

TABLE 26

| | Composition of Surface layer Portion (mass %) | | | | Outer Layer Thickness (μm) | Outer Layer Occupancy Ratio (%) | Intermediate Layer Thickness (μm) | Impact Energy Value (×10² J/cm²) | Remarks |
|---|---|---|---|---|---|---|---|---|---|
| No | Mo | V | Nb | Mo Equivalent | | | | | |
| 1 | 8 | 5 | — | 11.3 | 16 | 3 | 0.6 | 2.5 | Inventive Example |
| 2 | 8 | — | 4 | 9.1 | 16 | 3 | 6.0 | 2.3 | Inventive Example |
| 3 | 4 | 10 | 2 | 11.2 | 20 | 4 | 4.0 | 2.6 | Inventive Example |
| 4 | — | 15 | — | 10.0 | 20 | 4 | 5.0 | 2.3 | Inventive Example |
| 5 | — | 15 | 6 | 11.7 | 20 | 4 | 3.0 | 2.4 | Inventive Example |
| 6 | 4 | 15 | — | 14.0 | 25 | 5 | 4.0 | 2.7 | Inventive Example |

Note that, although elements originating from the slab (base metal) were contained in the surface layer portion, only the contents of elements which were not contained in the slab are shown in the table.

The outer layer occupancy ratio (ratio of the thickness of the alloy layer to the overall thickness) in each of Nos. 1 to 6 was 3 to 5%, thus satisfying the range of the present invention.

No. 1 as an Inventive Example of the present invention contained Mo and V in an Mo equivalent of 11.3, and the impact energy value was 2.0×10² J/cm² or more.

No. 2 as an Inventive Example of the present invention contained Mo and Nb in an Mo equivalent of 9.1, and the impact energy value was 2.0×10² J/cm² or more.

No. 3 as an Inventive Example of the present invention contained Mo, V and Nb in an Mo equivalent of 11.2, and the impact energy value was $2.0\times10^2$ J/cm$^2$ or more.

No. 4 as an Inventive Example of the present invention contained V in an Mo equivalent of 10.0, and the impact energy value was $2.0\times10^2$ J/cm$^2$ or more.

No. 5 as an Inventive Example of the present invention contained V and Nb in an Mo equivalent of 11.7, and the impact energy value was $2.0\times10^2$ J/cm$^2$ or more.

No. 6 as an Inventive Example of the present invention contained Mo and Nb in an Mo equivalent of 14.0, and the impact energy value was $2.0\times10^2$ J/cm$^2$ or more.

EXAMPLE 5

Example 5-1

The present invention will now be described more specifically while referring to examples.

Neutron shielding sheets shown in FIGS. 1 and 2 and in Table 27 were produced by hot-rolled cladding described hereunder using the slabs 6 and titanium sheets 7 and 8 shown in FIGS. 3 and 4 as material.

First, titanium ingots 6 to serve as material were produced by electron beam remelting (EB remelting) and plasma arc melting (plasma melting) using a rectangular mold, or using a cylindrical mold by VAR remelting. The cylindrical ingots 6 had a size of 1200 mm×2500 mm (diameter×length), and the rectangular ingots 6 had a size of 100 mm×1000 mm×4500 mm (thickness×width×length). The types of material used were pure titanium of JIS Class 1, JIS Class 2 and JIS Class 3, and Ti-1Fe-0.350, Ti-0.5Cu, Ti-1Cu, Ti-1Cu-0.5Nb, Ti-5Al-1Fe, Ti-3Al-2.5V and Ti-3Al-5V.

The titanium sheets 7 were attached to almost all of the cast ingots 6 as cast or after cutting the casting skin on the surface of the ingot 6. The other ingots 6 were bloomed, and thereafter cutting was performed, followed by attachment of the titanium sheets 7.

Attachment of the titanium sheets 7 was performed by superposing (covering with) Ti—B alloy sheets of various thicknesses and an equal size to the rolling surface of the ingot or slab 6, welding the edges of the titanium sheets 7 by electron beam welding (vacuum degree of approximately $3\times10^{-3}$ Torr or less), and sealing the space between the titanium sheets 7 and the ingot (or slab) 6 in a vacuum state.

Attachment of the alloy sheets was performed mainly with respect to the rolling surfaces, and two kinds of structures were prepared, namely, a two-layer structure in which an alloy sheet was attached to only a surface on one side, and a three-layer structure in which an alloy sheet was attached to surfaces on both sides. With respect to the outer layers (B-concentrated layers) 3 and 4, the proportion per surface that the outer layers 3 and 4 occupied relative to the overall thickness in the end product is shown in Table 27, and in the three-layer structures the B-concentrated layers of both surfaces were adjusted to be the same thickness. A Ti—B alloy sheet was used as the titanium sheet 7 that was used for attaching to the slab 6, and was prepared by hot rolling an ingot to which B was added by means of TiB$_2$ or $^{10}$B enriched boron (H$_3$$^{10}$BO$_3$, $^{10}$B$_2$O$^{10}$B$_4$C) and dissolved in advance. Note that, after hot rolling, the Ti—B alloy sheets were allowed to pass through a continuous pickling line containing nitric hydrofluoric acid to perform descaling.

Using steel manufacture facilities, hot rolling of the slabs 6 was performed after the slabs 6 were heated at 800° C. for 240 minutes to produce band-shaped coils (titanium composite materials) 1 and 2 having a thickness of approximately 4 mm. By means of this hot rolling, the outer layers of the titanium composite materials 1 and 2 were made into Ti-0.1 to 3.8% B alloys.

Although the present examples include cases where a titanium alloy was used for the slab 6, in such cases also Ti-0.1 to 3.8% B alloys containing only Ti and B were used as the titanium sheets 7 that were attached.

Band-shaped coils 1 and 2 after hot rolling were allowed to pass through a continuous pickling line containing nitric hydrofluoric acid to perform descaling, and thereafter visual observation was performed to check the state of occurrence of cracks. The method for measuring the depth of the outer layers 3 and 4 (B-concentrated layers) involved cutting out specimens from the hot-rolled sheets (extracting specimens from a central portion in the width direction at each of three locations, namely, the front end, center and rear end in the longitudinal direction) and polishing the specimens, and then subjecting the specimens to SEM/EDS analysis to determine the ratio of the B-concentrated layers with respect to the sheet thickness and also determine the B concentration of the B-concentrated layers (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×4 min thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen and the test specimen, and the neutron shielding effect was evaluated based on the ratio between the measured values (the value for each test specimen is described for a case where the neutron shielding effect of commercially pure titanium of JIS Class 1 is taken as "1").

The results are shown collectively in Table 27.

TABLE 27

| No. | Ingot Type | Type | Production History | Outer Layer Layer Structure | Thickness (μm) | Thickness Ratio Per Side (%) | B content (mass %) | Intermediate Layer Thickness (μm) | Crack Evaluation of Titanium Composite Material 1 | Crack Occurrence Rate During Bending Test (%) | Neutron Shielding Effect | Remarks |
|---|---|---|---|---|---|---|---|---|---|---|---|---|
| 1 | EB ReMelted Ingot | Pure Titanium JIS Class 1 | As Cast | — | — | — | — | — | No Cracks | 0 | 1.0 | Comparative Example |
| 2 | EB ReMelted Ingot | Pure Titanium JIS Class 1 | As Cast | Two Layers | 200 | 5 | 3.8 | 0.1 | PartialCrack Occurrence | 60 | — | Comparative Example |
| 3 | EB ReMelted Ingot | Pure Titanium JIS Class 1 | As Cast | Three Layers | 1800 | 45 | 1.4 | 2.0 | PartialCrack Occurrence | 65 | — | Comparative Example |
| 4 | EB ReMelted Ingot | Pure Titanium JIS Class 1 | As Cast | Two Layers | 200 | 5 | 3.0 | 0.5 | No Cracks | 0 | 2.8 | Example |
| 5 | EB ReMelted Ingot | Pure Titanium JIS Class 1 | As Cast | Two Layers | 1600 | 40 | 0.2 | 2.0 | No Cracks | 0 | 1.9 | Example |
| 6 | EB ReMelted Ingot | Pure Titanium JIS Class 3 | As Cast | Two Layers | 600 | 15 | 2.1 | 1.0 | No Cracks | 0 | 7.2 | Example |
| 7 | EB ReMelted Ingot | Pure Titanium JIS Class 2 | As Cast | Three Layers | 600 | 15 | 1.2 | 2.0 | No Cracks | 0 | 10.1 | Example |
| 8 | EB ReMelted Ingot | Pure Titanium JIS Class 1 | As Cast | Two Layers | 400 | 10 | 2.0 | 3.0 | No Cracks | 0 | 5.0 | Example |
| 9 | EB ReMelted Ingot | Pure Titanium JIS Class 3 | As Cast | Two Layers | 200 | 5 | 1.5 | 3.0 | No Cracks | 0 | 2.3 | Example |
| 10 | Plasma Melted Ingot | Pure Titanium JIS Class 1 | As Cast | Two Layers | 800 | 20 | 0.1 | 0.5 | No Cracks | 0 | 3.3 | Example |
| 11 | Plasma Melted Ingot | Pure Titanium JIS Class 2 | As Cast | Three Layers | 1600 | 40 | 2.4 | 1.0 | No Cracks | 0 | 38.2 | Example |
| 12 | EB ReMelted Ingot | Pure Titanium JIS Class 3 | Cut After Casting | Two Layers | 200 | 5 | 1.4 | 0.5 | No Cracks | 0 | 2.2 | Example |
| 13 | Plasma Melted Ingot | Pure Titanium JIS Class 2 | Cut After Casting | Three Layers | 1800 | 40 | 0.3 | 1.0 | No Cracks | 0 | 38.7 | Example |
| 14 | EB ReMelted Ingot | Pure Titanium JIS Class 1 | Cut After Casting | Two Layers | 600 | 15 | 2.6 | 1.0 | No Cracks | 0 | 7.7 | Example |
| 15 | Plasma Melted Ingot | Pure Titanium JIS Class 3 | Cut After Casting | Two Layers | 200 | 5 | 2.2 | 3.0 | No Cracks | 0 | 3.1 | Example |
| 16 | Plasma Melted Ingot | Pure Titanium JIS Class 2 | Cut After Casting | Two Layers | 1000 | 25 | 0.5 | 0.5 | No Cracks | 0 | 6.3 | Example |
| 17 | Plasma Melted Ingot | Pure Titanium JIS Class 1 | Cut After Casting | Three Layers | 1000 | 25 | 1.8 | 3.0 | No Cracks | 0 | 25.4 | Example |
| 18 | VAR Melted Ingot | Pure Titanium JIS Class 1 | Cut After Blooming | Two Layers | 200 | 5 | 1.0 | 0.5 | No Cracks | 0 | 2.3 | Example |
| 19 | EB ReMelted Ingot | Pure Titanium JIS Class 1 | Cut After Blooming | Three Layers | 800 | 15 | 2.1 | 2.0 | No Cracks | 0 | 13.1 | Example |
| 20 | Plasma Melted Ingot | Pure Titanium JIS Class 3 | Cut After Blooming | Two Layers | 1600 | 40 | 3.0 | 0.5 | No Cracks | 0 | 19.5 | Example |
| 21 | VAR Melted Ingot | Pure Titanium JIS Class 2 | Cut After Forging | Two Layers | 200 | 5 | 1.3 | 1.0 | No Cracks | 0 | 2.4 | Example |
| 22 | EB ReMelted Ingot | Pure Titanium JIS Class 1 | Cut After Forging | Two Layers | 1600 | 40 | 0.6 | 3.0 | No Cracks | 0 | 10.8 | Example |
| 23 | Plasma Melted Ingot | Pure Titanium JIS Class 3 | Cut After Forging | Three Layers | 800 | 20 | 2.4 | 1.0 | No Cracks | 0 | 17.9 | Example |
| 24 | VAR Ingot | Ti—1Fe—0.35O | Cut After Blooming | Two Layers | 200 | 5 | 2.3 | 1.0 | No Cracks | 0 | 3.2 | Example |
| 25 | VAR Ingot | Ti—1Fe—0.35O | Cut After Blooming | Three Layers | 800 | 20 | 0.8 | 3.0 | No Cracks | 0 | 6.0 | Example |
| 26 | VAR Ingot | Ti—0.5Cu | Cut After Blooming | Two Layers | 400 | 10 | 1.5 | 1.0 | No Cracks | 0 | 4.3 | Example |
| 27 | VAR Ingot | Ti—0.5Cu | Cut After Blooming | Three Layers | 800 | 20 | 2.1 | 3.0 | No Cracks | 0 | 17.0 | Example |
| 28 | VAR Ingot | Ti—1Cu | Cut After Blooming | Two Layers | 200 | 5 | 0.5 | 3.0 | No Cracks | 0 | 1.7 | Example |
| 29 | VAR Ingot | Ti—1Cu | Cut After Blooming | Three Layers | 600 | 15 | 1.6 | 2.0 | No Cracks | 0 | 6.3 | Example |
| 30 | VAR Ingot | Ti—1Cu—0.5Nb | Cut After Blooming | Two Layers | 400 | 10 | 1.5 | 0.5 | No Cracks | 0 | 4.3 | Example |
| 31 | VAR Ingot | Ti—1Cu—0.5Nb | Cut After Blooming | Three Layers | 800 | 20 | 1.8 | 2.0 | No Cracks | 0 | 15.7 | Example |
| 32 | VAR Ingot | Ti—5Al—1Fe | Cut After Blooming | Two Layers | 200 | 5 | 3.0 | 3.0 | No Cracks | 0 | 3.7 | Example |
| 33 | VAR Ingot | Ti—5Al—1Fe | Cut After Blooming | Three Layers | 600 | 15 | 0.1 | 3.0 | No Cracks | 0 | 5.4 | Example |
| 34 | VAR Ingot | Ti—3Al—2.5V | Cut After Blooming | Two Layers | 200 | 5 | 2.4 | 7.0 | No Cracks | 0 | 3.2 | Example |
| 35 | VAR Ingot | Ti—3Al—2.5V | Cut After Blooming | Three Layers | 800 | 20 | 1.4 | 2.0 | No Cracks | 0 | 14.3 | Example |
| 36 | VAR Ingot | Ti—3Al—5V | Cut After Blooming | Two Layers | 200 | 5 | 1.8 | 3.0 | No Cracks | 0 | 2.8 | Example |
| 37 | VAR Ingot | Ti—3Al—5V | Cut After Blooming | Three Layers | 600 | 15 | 0.7 | 3.0 | No Cracks | 0 | 8.2 | Example |

The Comparative Examples and Examples shown in No. 1 to No. 8 are cases where an EB remelted ingot (slab 6) was used as cast.

The Comparative Example of No. 1 is a case where pure titanium of JIS Class of the same kind as the slab 6 was used as the titanium sheet 7. Cracks did not occur in the hot-rolled sheet, and cracks also did not occur in the bending test.

The Comparative Example of No. 2 is a case where the intermediate layer was thin. Cracks partially occurred in the hot-rolled sheet, and the crack occurrence rate was also high in the bending test.

The Comparative Example of No. 3 is a case where the thickness ratio of the outer layers 3 and 4 was more than 40%. Cracks partially occurred in the hot-rolled sheet, and the crack occurrence rate was also high in the bending test.

The Examples of Nos. 4 to 7 are cases where the type of the inner part 5, the layer structure, and the thickness ratio and B content of the outer layers 3 and 4 were changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Example of No. 8 is a case where alloy sheets were also attached to side faces in the longitudinal direction, and not just to the rolling surfaces. Because the thickness ratio of the outer layers 3 and 4 was in the range of 5 to 40% and the B content of the outer layers 3 and 4 was in the range of 0.1 to 3.0%, cracks did not occur in the hot-rolled sheet, and cracks also did not occur in the bending test. Further, because alloy sheets were attached to the side faces in the longitudinal direction, surface defects at edge portions in the width direction attributable to side faces of the ingot (slab 6) going around to the rolling surfaces were also reduced.

The Examples of Nos. 9 to 11 are cases where a plasma melted ingot was used as cast, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 12 to 14 are cases in which an EB remelted ingot whose casting skin surface was cut was used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 15 to 17 are cases in which a plasma melted ingot whose casting skin surface was cut was used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 18 to 20 are cases in which various kinds of ingots which were subjected to blooming and whose surface was thereafter cut were used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 21 to 23 are cases in which various kinds of ingots which were forged and whose surface was thereafter cut were used, and the type of the inner part 5, the layer structure, and the thickness ratio and the B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 24 to 37 are cases in which a VAR ingot which was subjected to blooming and whose surface was thereafter cut was used, and in which various kinds of titanium alloys were used as the type of the inner part 5, and the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

Further, in the Inventive Examples of the present invention, when the alloy used for the inner part 5 was subjected in advance to a tensile test with a JIS 13B test specimen having a thickness of 1.5 mm, it was found that the 0.2% yield stress was no more than 1000 MPa.

In addition, as the result of evaluation by the method described above, although a neutron shielding effect could not be confirmed for the Comparative Example of No. 1, the neutron shielding effect for each of the Examples of No. 4 to 37 was 1 or more and thus a neutron shielding effect could be confirmed.

Note that, the neutron shielding effect of a stainless steel sheet (4 mm thick) having a B content of 0.5% that is used in a nuclear fuel storage rack is 23.7, and in the Examples of Nos. 11, 13 and 17 a neutron shielding effect that was higher than the neutron shielding effect of the aforementioned stainless steel sheet was obtained.

Example 5-2

Neutron shielding sheets shown as respective Examples (Inventive Examples of the present invention) in Table 28 were produced by the following method.

Slabs 6 for which attachment of sheets was performed by the same procedure as in Example 1 were heated to 800° C. for 240 minutes and thereafter subjected to hot rolling using steel manufacture facilities to thereby produce band-shaped coils (titanium composite materials) 1 and 2 having a thickness of approximately 20 mm. By means of the hot rolling, the outer layers of the titanium composite materials 1 and 2 were made Ti-0.1 to 3.8% B alloy. The band-shaped coils 1 and 2 after hot rolling were allowed to pass through a continuous pickling line containing nitric hydrofluoric acid to perform descaling, and thereafter visual observation was performed to check the state of occurrence of cracks. The method for measuring the depth of the outer layers 3 and 4. (B-concentrated layers) involved cutting out specimens from the hot-rolled sheet (extracting specimens from a central portion in the width direction at each of three locations, namely, the front end, center and rear end in the longitudinal direction) and polishing the specimens, and then subjecting the specimens to SEM/EDS analysis to determine the ratio of the B-concentrated layers with respect to the sheet thickness and also determine the B concentration of the B-concentrated layers (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×20 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen and the test specimen, and the neutron shielding effect was evaluated based on the ratio between the measured values (the value for each test specimen is described for a case where the neutron shielding effect of commercially pure titanium of JIS Class 1 is taken as "1").

The results are shown collectively in Table 28.

TABLE 28

| No. | Ingot Type | Type | Production History | Outer Layer Layer Structure | Outer Layer Thickness (μm) | Outer Layer Thickness Ratio Per Side (%) | Outer Layer B content (mass %) |
|---|---|---|---|---|---|---|---|
| 38 | EB ReMelted Ingot | Pure Titanium JIS Class 1 | As Cast | — | — | — | — |
| 39 | EB ReMelted Ingot | Pure Titanium JIS Class 1 | As Cast | Three Layers | 9000 | 45 | 1.5 |
| 40 | EB ReMelted Ingot | Pure Titanium JIS Class 1 | As Cast | Three Layers | 2000 | 10 | 1.5 |
| 41 | EB ReMelted Ingot | Pure Titanium JIS Class 2 | As Cast | Two Layers | 4000 | 20 | 2.1 |
| 42 | EB ReMelted Ingot | Pure Titanium JIS Class 3 | As Cast | Two Layers | 8000 | 40 | 0.8 |
| 43 | Plasma Melted Ingot | Pure Titanium JIS Class 1 | As Cast | Two Layers | 1000 | 5 | 3.0 |
| 44 | Plasma Melted Ingot | Pure Titanium JIS Class 2 | As Cast | Two Layers | 4000 | 20 | 1.2 |
| 45 | Plasma Melted Ingot | Pure Titanium JIS Class 3 | As Cast | Three Layers | 8000 | 40 | 0.4 |
| 46 | EB ReMelted Ingot | Pure Titanium JIS Class 1 | Cut After Casting | Two Layers | 1000 | 5 | 1.9 |
| 47 | EB ReMelted Ingot | Pure Titanium JIS Class 2 | Cut After Casting | Three Layers | 4000 | 20 | 2.3 |
| 48 | EB ReMelted Ingot | Pure Titanium JIS Class 3 | Cut After Casting | Two Layers | 8000 | 40 | 0.1 |
| 49 | Plasma Melted Ingot | Pure Titanium JIS Class 1 | Cut After Casting | Two Layers | 2000 | 10 | 2.9 |
| 50 | Plasma Melted Ingot | Pure Titanium JIS Class 2 | Cut After Casting | Two Layers | 4000 | 20 | 1.1 |
| 51 | Plasma Melted Ingot | Pure Titanium JIS Class 3 | Cut After Casting | Three Layers | 8000 | 40 | 0.5 |
| 52 | VAR Melted Ingot | Pure Titanium JIS Class 3 | Cut After Blooming | Two Layers | 1000 | 5 | 2.7 |
| 53 | EB ReMelted Ingot | Pure Titanium JIS Class 1 | Cut After Blooming | Three Layers | 4000 | 20 | 1.7 |
| 54 | Plasma Melted Ingot | Pure Titanium JIS Class 2 | Cut After Blooming | Two Layers | 8000 | 40 | 0.7 |
| 55 | VAR Melted Ingot | Pure Titanium JIS Class 2 | Cut After Forging | Two Layers | 1000 | 5 | 0.3 |
| 56 | EB ReMelted Ingot | Pine Titanium JIS Class 3 | Cut After Forging | Two Layers | 4000 | 20 | 2.2 |
| 57 | Plasma Melted Ingot | Pure Titanium JIS Class 1 | Cut After Forging | Three Layers | 8000 | 40 | 1.7 |

| No. | Intermediate Layer Thickness (μm) | Crack Evaluation of Titanium Composite Material 1 | Crack Occurrence Rate During Bending Test (%) | Neutron Shielding Effect | Remarks |
|---|---|---|---|---|---|
| 38 | — | No Cracks | 0 | 1.0 | Comparative Example |
| 39 | 0.1 | Partial Crack Occurrence | 70 | — | Comparative Example |
| 40 | 2.0 | No Cracks | 0 | 8.0 | Example |
| 41 | 3.0 | No Cracks | 0 | 9.5 | Example |
| 42 | 2.0 | No Cracks | 0 | 11.7 | Example |
| 43 | 0.5 | No Cracks | 0 | 3.7 | Example |
| 44 | 1.0 | No Cracks | 0 | 7.2 | Example |
| 45 | 3.0 | No Cracks | 0 | 18.0 | Example |
| 46 | 1.0 | No Cracks | 0 | 3.0 | Example |
| 47 | 2.0 | No Cracks | 0 | 17.4 | Example |
| 48 | 2.0 | No Cracks | 0 | 8.1 | Example |
| 49 | 3.0 | No Cracks | 0 | 6.2 | Example |
| 50 | 1.0 | No Cracks | 0 | 6.9 | Example |
| 51 | 4.0 | No Cracks | 0 | 19.3 | Example |
| 52 | 0.5 | No Cracks | 0 | 3.3 | Example |
| 53 | 2.0 | No Cracks | 0 | 15.5 | Example |
| 54 | 1.0 | No Cracks | 0 | 11.2 | Example |
| 55 | 2.0 | No Cracks | 0 | 1.4 | Example |
| 56 | 2.0 | No Cracks | 0 | 9.7 | Example |
| 57 | 2.0 | No Cracks | 0 | 29.7 | Example |

The Comparative Examples and Examples shown in No. 38 to No. 42 are cases where an EB remelted ingot (slab 6) was used as cast.

The Comparative Example of No. 38 is a ease where pure titanium of JIS Class 1 of the same kind as the slab 6 was used as the titanium sheet 7. Cracks did not occur in the hot-rolled sheet, and cracks also did not occur in the bending test.

The Comparative Example of No. 39 is a case where the intermediate layer was thin. Cracks partially occurred in the hot-rolled sheet, and the crack occurrence rate was also high in the bending test.

The Examples of Nos. 40 to 42 are cases where the type of the inner part 5, the layer structure, and the thickness ratio and B content of the outer layers 3 and 4 were changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 43 to 45 are cases where a plasma melted ingot was used as cast, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 46 to 48 are cases in which an EB remelted ingot whose casting skin surface was cut was used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 49 to 51 are cases in which a plasma melted ingot whose casting skin surface was cut was used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 52 to 54 are cases in which various kinds of ingots which were subjected to blooming and whose surfaces was thereafter cut were used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

The Examples of Nos. 55 to 57 are cases in which various kinds of ingots which were forged and whose surface was thereafter cut were used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the hot-rolled sheets, and cracks also did not occur in the bending tests.

Further, for each of the Examples of Nos. 40 to 57, the neutron shielding effect was 1 or more, and thus a neutron shielding effect could be confirmed.

Example 5-3

Neutron shielding sheets shown as respective Examples (Inventive Examples of the present invention) in Table 29 were produced by the following method.

Slabs 6 for which attachment of sheets was performed by the same procedure as in Example 1 were heated to 800° C. for 240 minutes and thereafter subjected to hot rolling using steel manufacture facilities to thereby produce band-shaped coils (titanium composite materials) 1 and 2 having a thickness of approximately 5 mm. In addition, cold rolling was performed to form titanium sheets having a thickness of 1 mm, and as an annealing treatment, a heat treatment of heating to 600 to 750° C. in vacuum or in an inert gas atmosphere and holding at that temperature for 240 minutes was performed. In a surface inspection process after annealing, the state of occurrence of cracks on the cold-rolled sheet was visually observed. Note that the method for measuring the depth of the outer layers 3 and 4 (B-concentrated layers) involved cutting out specimens from the cold-rolled sheet (extracting specimens from a central portion in the width direction at each of three locations, namely, the front end, center and rear end in the longitudinal direction) and polishing the specimens, and then subjecting the specimens to SEM/EDS analysis to determine the ratio of the B-concentrated layers with respect to the sheet thickness and also determine the B concentration of the B-concentrated layers (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed by the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×1 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen and the test specimen, and the neutron shielding effect was evaluated based on the ratio between the measured values (the value for each test specimen is described for a case where the neutron shielding effect of commercially pure titanium of JIS Class 1 is taken as "1").

The results are shown collectively in Table 29.

TABLE 29

| | | | | Outer Layer | | | |
| | | | | | | Thickness | |
| | | | Production | Layer | Thickness | Ratio Per Side | B content |
| No. | Ingot Type | Type | History | Structure | (μm) | (%) | (mass %) |
|---|---|---|---|---|---|---|---|
| 58 | EB ReMelted Ingot | Pure Titanium JIS Class 1 | As Cast | — | — | — | — |
| 60 | EB ReMelted Ingot | Pure Titanium JIS Class 1 | As Cast | Three Layers | 2250 | 45 | 3.5 |

TABLE 29-continued

| | | | | | | | |
|---|---|---|---|---|---|---|---|
| 61 | EB ReMelted Ingot | Pure Titanium JIS Class 1 | As Cast | Two Layers | 2000 | 40 | 1.2 |
| 62 | EB ReMelted Ingot | Pure Titanium JIS Class 2 | As Cast | Three Layers | 1000 | 20 | 0.5 |
| 63 | EB ReMelted Ingot | Pure Titanium JIS Class 3 | As Cast | Two Layers | 500 | 10 | 2.8 |
| 64 | Plasma Melted Ingot | Pure Titanium JIS Class 1 | As Cast | Three Layers | 250 | 5 | 1.5 |
| 65 | Plasma Melted Ingot | Pure Titanium JIS Class 2 | As Cast | Two Layers | 2000 | 40 | 0.9 |
| 66 | Plasma Melted Ingot | Pure Titanium JIS Class 3 | As Cast | Three Layers | 1000 | 20 | 1.7 |
| 67 | EB ReMelted Ingot | Pure Titanium JIS Class 3 | Cut After Casting | Two Layers | 250 | 5 | 3.0 |
| 68 | Plasma Melted Ingot | Pure Titanium JIS Class 1 | Cut After Casting | Three Layers | 2000 | 40 | 0.4 |
| 69 | VAR Malted Ingot | Pure Titanium JIS Class 3 | Cut After Blooming | Two Layers | 500 | 10 | 1.3 |
| 70 | EB ReMelted Ingot | Pure Titanium JIS Class 1 | Cut After Blooming | Three Layers | 2000 | 40 | 0.1 |
| 71 | Plasma Melted Ingot | Pure Titanium JIS Class 2 | Cut After Blooming | Two Layers | 1000 | 20 | 2.1 |
| 72 | VAR Malted Ingot | Pure Titanium JIS Class 2 | Cut After Forging | Three Layers | 250 | 5 | 0.7 |
| 73 | EB ReMelted Ingot | Pure Titanium JIS Class 3 | Cut After Forging | Two Layers | 2000 | 40 | 1.8 |
| 74 | Plasma Melted Ingot | Pure Titanium JIS Class 1 | Cut After Forging | Three Layers | 1000 | 20 | 2.5 |

| No. | Intermediate Layer Thickness (μm) | Crack Evaluation of Titanium composite material 1 | Crack Occurrence Rate During Bending Test (%) | Neutron Shielding Effect | Remarks |
|---|---|---|---|---|---|
| 58 | — | No Cracks | 0 | 1.0 | Comparative Example |
| 60 | 0.5 | Partial Crack Occurrence | 60 | — | Comparative Example |
| 61 | 3.0 | No Cracks | 0 | 13.4 | Example |
| 62 | 2.0 | No Cracks | 0 | 10.2 | Example |
| 63 | 1.0 | No Cracks | 0 | 6.0 | Example |
| 64 | 0.5 | No Cracks | 0 | 4.3 | Example |
| 65 | 1.0 | No Cracks | 0 | 12.2 | Example |
| 66 | 1.0 | No Cracks | 0 | 15.5 | Example |
| 67 | 2.0 | No Cracks | 0 | 3.8 | Example |
| 68 | 1.0 | No Cracks | 0 | 18.1 | Example |
| 69 | 2.0 | No Cracks | 0 | 3.9 | Example |
| 70 | 3.0 | No Cracks | 0 | 15.5 | Example |
| 71 | 1.0 | No Cracks | 0 | 9.4 | Example |
| 72 | 1.0 | No Cracks | 0 | 2.9 | Example |
| 73 | 2.0 | No Cracks | 0 | 15.8 | Example |
| 74 | 1.0 | No Cracks | 0 | 17.8 | Example |

The Comparative Examples and Examples shown in No. 58 to No. 63 are cases where an EB remelted ingot (slab 6) was used as cast.

The Comparative Example of No. 58 is a case where pure titanium of JIS Class 1 of the same kind as the slab 6 was used as the titanium sheet 7. Cracks did not occur in the cold-rolled sheet, and cracks also did not occur in the bending test.

The Comparative Example of No. 60 is a case where the thickness ratio of the outer layers 3 and 4 was more than 40%. Cracks partially occurred in the cold-rolled sheet, and the crack occurrence rate was also high in the bending test.

The Examples of Nos. 61 to 63 are cases where the type of the inner part 5, the layer structure, and the thickness ratio and B content of the outer layers 3 and 4 were changed and evaluated. Because the thickness ratio of the outer layers 3 and 4 was in the range of 5 to 40% and the B content of the outer layers 3 and 4 was in the range of 0.1 to 3.0%, cracks did not occur in any of the cold-rolled sheets, and cracks also did not occur in the bending tests.

The Examples of Nos. 64 to 66 are cases where a plasma melted ingot was used as cast, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the cold-rolled sheets, and cracks also did not occur in the bending tests.

The Examples of Nos. 67 and 68 are cases in which an EB remelted ingot or a plasma melted ingot whose casting skin surface was cut was used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in either of the cold-rolled sheets, and cracks also did not occur in the bending tests.

The Examples of Nos. 69 to 71 are cases in which various kinds of ingots which were subjected to blooming and whose surfaces were thereafter cut were used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the cold-rolled sheets, and cracks also did not occur in the bending tests.

The Examples of Nos. 72 to 74 are cases in which various kinds of ingots which were forged and whose surface was thereafter cut were used, and the type of the inner part 5, the layer structure, and the thickness ratio and B content of the outer layers 3 and 4 were respectively changed and evaluated. Because the thickness ratio of the outer layers 3 and 4 was in the range of 5 to 40% and the B content of the outer layers 3 and 4 was in the range of 0.1 to 3.0%, cracks did not occur in any of the cold-rolled sheets, and cracks also did not occur in the bending tests.

Further, for each of the Examples of Nos. 61 to 74, the neutron shielding effect was 1 or more, and thus a neutron shielding effect could be confirmed.

Example 5-4

In the neutron shielding sheet 1 that is a titanium composite material having a two-layer structure according to the present invention that is illustrated in FIG. 1, the outer layer 3 and inner part 5 are formed by subjecting a surface on one side of the base metal to melting and resolidification and thereafter performing hot rolling. Further, in the neutron shielding sheet 2 having a three-layer structure according to the present invention that is illustrated in FIG. 2, the outer layers 3 and 4 and the inner part 5 are formed by subjecting the surfaces on both sides of the base metal to melting and resolidification and thereafter performing hot rolling. The method for producing the neutron shielding sheets 1 and 2 will now be specifically described.

Neutron shielding sheets 1 and 2 shown as examples (Inventive Examples of the present invention) in Table 30 were produced by the following method.

TABLE 30

| No. | Ingot Type | Type | Production History | Element Addition Method | Outer Layer Layer Structure | Outer Layer Thickness (μm) | Outer Layer Thickness Ratio Per Side (%) |
|---|---|---|---|---|---|---|---|
| 76 | EB ReMelted Ingot | Pure Titanium JIS Class 1 | As Cast | — | — | — | — |
| 77 | EB ReMelted Ingot | Pure Titanium JIS Class 1 | As Cast | TiB$_2$ Powder | Three Layers | 1500 | <u>45</u> |
| 78 | EB ReMelted Ingot | Pure Titanium JIS Class 1 | As Cast | TiB$_2$ Powder | Two Layers | 200 | 5 |
| 79 | EB ReMelted Ingot | Pure Titanium JIS Class 1 | As Cast | TiB$_2$ Powder | Three Layers | 1600 | 40 |
| 80 | EB ReMelted Ingot | Pure Titanium JIS Class 2 | As Cast | Ti—B Alloy Chips | Two Layers | 800 | 20 |
| 81 | EB ReMelted Ingot | Pure Titanium JIS Class 3 | As Cast | Ti—B Alloy Wire | Three Layers | 1200 | 30 |
| 82 | EB ReMelted Ingot | Pure Titanium JIS Class 2 | As Cast | Ti—B Alloy Thin Film | Two Layers | 400 | 10 |
| 83 | EB ReMelted Ingot | Pure Titanium JIS Class 3 | As Cast | Ti—B Alloy Mesh | Two Layers | 400 | 10 |
| 84 | Plasma Melted Ingot | Pure Titanium JIS Class 3 | As Cast | TiB$_2$ Powder | Three Layers | 200 | 5 |
| 85 | Plasma Melted Ingot | Pure Titanium JIS Class 1 | As Cast | Ti—B Alloy Chips | Two Layers | 1000 | 25 |
| 86 | Plasma Melted Ingot | Pure Titanium JIS Class 2 | As Cast | Ti—B Alloy Wire | Three Layers | 1600 | 40 |
| 87 | Plasma Melted Ingot | Pure Titanium JIS Class 1 | As Cast | Ti—B Alloy Thin Film | Two Layers | 400 | 10 |
| 88 | Plasma Melted Ingot | Pure Titanium JIS Class 2 | As Cast | Ti—B Alloy Mesh | Two Layers | 400 | 10 |
| 89 | EB ReMelted Ingot | Pure Titanium JIS Class 2 | Cut After Casting | TiB$_2$ Powder | Two Layers | 200 | 5 |
| 90 | EB ReMelted Ingot | Pure Titanium JIS Class 3 | Cut After Casting | Ti—B Alloy Chips | Two Layers | 1600 | 40 |
| 91 | EB ReMelted Ingot | Pure Titanium JIS Class 1 | Cut After Casting | Ti—B Alloy Wire | Three Layers | 600 | 15 |
| 92 | EB ReMelted Ingot | Pure Titanium JIS Class 3 | Cut After Casting | Ti—B Alloy Thin Film | Two Layers | 400 | 10 |
| 93 | EB ReMelted Ingot | Pure Titanium JIS Class 1 | Cut After Casting | Ti—B Alloy Mesh | Three Layers | 1200 | 30 |
| 94 | Plasma Melted Ingot | Pure Titanium JIS Class 3 | Cut After Casting | TiB$_2$ Powder | Two Layers | 200 | 5 |
| 95 | Plasma Melted Ingot | Pure Titanium JIS Class 2 | Cut After Casting | Ti—B Alloy Chips | Two Layers | 800 | 20 |
| 96 | Plasma Melted Ingot | Pure Titanium JIS Class 1 | Cut After Casting | Ti—B Alloy Wire | Three Layers | 800 | 20 |
| 97 | Plasma Melted Ingot | Pure Titanium JIS Class 2 | Cut After Casting | Ti—B Alloy Thin Film | Two Layers | 400 | 10 |
| 98 | Plasma Melted Ingot | Pure Titanium JIS Class 1 | Cut After Casting | Ti—B Alloy Mesh | Two Layers | 400 | 10 |
| 99 | VAR Melted Ingot | Pure Titanium JIS Class 3 | Cut After Blooming | TiB$_2$ Powder | Two Layers | 200 | 5 |
| 100 | EB ReMelted Ingot | Pure Titanium JIS Class 1 | Cut After Blooming | TiB$_2$ Powder | Two Layers | 200 | 20 |
| 101 | Plasma Melted Ingot | Pure Titanium JIS Class 2 | Cut After Blooming | TiB$_2$ Powder | Three Layers | 1200 | 30 |
| 102 | VAR Melted Ingot | Pure Titanium JIS Class 2 | Cut After Forging | TiB$_2$ Powder | Two Layers | 200 | 5 |
| 103 | EB ReMelted Ingot | Pure Titanium JIS Class 3 | Cut After Forging | TiB$_2$ Powder | Three Layers | 400 | 10 |
| 104 | Plasma Melted Ingot | Pure Titanium JIS Class 1 | Cut After Forging | TiB$_2$ Powder | Three Layers | 800 | 20 |

| No. | Outer Layer B content (mass %) | Intermediate Layer Thickness (μm) | Crack Evaluation of Titanium Composite Material 1 | Crack Occurrence Rate During Bending Test (%) | Neutron Shielding Effect | Remarks |
|---|---|---|---|---|---|---|
| 76 | — | — | No Cracks | 0 | 1 | Comparative Example |
| 77 | 1.1 | 2.0 | Partial Crack Occurrence | <u>60</u> | — | Comparative Example |
| 78 | 3.0 | 0.5 | No Cracks | 0 | 3.6 | Example |
| 79 | 0.5 | 2.0 | No Cracks | 0 | 19.8 | Example |
| 80 | 1.2 | 1.0 | No Cracks | 0 | 7.1 | Example |
| 81 | 0.1 | 2.0 | No Cracks | 0 | 10.1 | Example |
| 82 | 0.5 | 3.0 | No Cracks | 0 | 2.6 | Example |
| 83 | 0.7 | 3.0 | No Cracks | 0 | 2.8 | Example |
| 84 | 2.1 | 0.5 | No Cracks | 0 | 5.2 | Example |
| 85 | 1.3 | 1.0 | No Cracks | 0 | 6.9 | Example |
| 86 | 1.5 | 0.5 | No Cracks | 0 | 28.8 | Example |
| 87 | 1.2 | 1.0 | No Cracks | 0 | 3.6 | Example |
| 88 | 0.9 | 1.0 | No Cracks | 0 | 3.3 | Example |
| 89 | 0.2 | 3.0 | No Cracks | 0 | 1.3 | Example |
| 90 | 2.4 | 0.5 | No Cracks | 0 | 17.8 | Example |
| 91 | 3.0 | 3.0 | No Cracks | 0 | 15.4 | Example |
| 92 | 2.4 | 0.5 | No Cracks | 0 | 5.6 | Example |
| 93 | 2.3 | 2.0 | No Cracks | 0 | 26.3 | Example |
| 94 | 2.7 | 0.5 | No Cracks | 0 | 3.2 | Example |
| 95 | 0.5 | 1.0 | No Cracks | 0 | 5.0 | Example |
| 96 | 0.4 | 3.0 | No Cracks | 0 | 9.8 | Example |
| 97 | 0.9 | 1.0 | No Cracks | 0 | 3.1 | Example |
| 98 | 1.7 | 1.0 | No Cracks | 0 | 4.5 | Example |
| 99 | 2.1 | 3.0 | No Cracks | 0 | 3.0 | Example |
| 100 | 1.1 | 1.0 | No Cracks | 0 | 6.9 | Example |
| 101 | 1.3 | 3.0 | No Cracks | 0 | 19.9 | Example |
| 102 | 1.8 | 3.0 | No Cracks | 0 | 2.5 | Example |
| 103 | 0.2 | 2.0 | No Cracks | 0 | 4.0 | Example |
| 104 | 1.3 | 0.5 | No Cracks | 0 | 13.7 | Example |

Note that, although elements originating from the slab (base metal) were contained in the surface layer portion, only the contents of elements which were not contained in the slab are shown in the table.

First, titanium ingots to serve as material were respectively produced by electron beam remelting (EB remelting) and plasma arc melting (plasma melting) using a rectangular mold, or using a cylindrical mold by VAR remelting.

The cylindrical ingots had a size of 1200 mm×2500 mm (diameter×length), and the rectangular ingots had a size of 100 mm×1000 mm×4500 mm (thickness×width×length), and the types of material used were pure titanium of JIS Class 1, JIS Class 2 and JIS Class 3.

Most of the cast ingots were subjected to melting and resolidification as cast or after cutting the casting skin on the ingot surface. The other ingots were bloomed, and thereafter cutting was performed, followed by the performance of melting and resolidification.

The melting and resolidification process was performed for at least one of the rolling surfaces, and as necessary was also performed on the side faces in the longitudinal direction. This process was performed by using electron beam welding under a vacuum atmosphere of approximately $3×10^{-3}$ Torr, adding any one of $TiB_2$ powder (100 μm or less), Ti—B alloy chips (2 mm square, 1 mm thick), Ti—B alloy wire (ϕ of 5 mm or less), Ti—B alloy thin film (20 μm or less) and Ti—B alloy mesh (mesh in which wire with ϕ of 1 mm is assembled in a lattice shape) when melting to thereby make the melted resolidified layer a Ti-0.1 to 3.5% B alloy and form a titanium slab having a two-layer structure or a three-layer structure. With respect to the outer layers 3 and 4 (B-concentrated layer), the proportion per surface that was occupied relative to the overall thickness in the titanium composite materials 1 and 2 is shown in Table 30, and in the three-layer structures the B-concentrated layers of both surfaces were adjusted to be the same thickness.

When adding the various kinds of material, the material containing B was uniformly dispersed over the entire rolling surface of the titanium cast piece so as to be uniformly added to the entire slab, and the melting and resolidification process was then performed. Note that, after the melting and resolidification process, the slab was held for one hour or more at a temperature from 100° C. to less than 500° C.

The titanium slabs that were melted and resolidified were heated to 800° C. for 240 minutes and thereafter subjected to hot rolling using steel manufacture facilities to thereby produce band-shaped coils having a thickness of approximately 4 mm. The band-shaped coils after hot rolling were allowed to pass through a continuous pickling line containing nitric hydrofluoric acid to perform descaling, and thereafter visual observation was performed to check the state of occurrence of cracks.

The method for measuring the depth of the outer layers 3 and 4. (B-concentrated layers) involved cutting out specimens from the hot-rolled sheet after pickling (extracting specimens from a central portion in the width direction at each of three locations, namely, the front end, center and rear end in the longitudinal direction) and polishing the specimens, and then subjecting the specimens to SEM/EDS analysis to determine the ratio of the outer layers 3 and 4 (B-concentrated layers) with respect to the sheet thickness and also determine the B concentration of the outer layers 3 and 4. (B-concentrated layers) (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×4 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen and the test specimen, and the neutron shielding effect was evaluated based on the ratio between the measured values (the value for each test specimen is described for a case where the neutron shielding effect of commercially pure titanium of JIS Class 1 is taken as "1").

The results are shown collectively together with the test conditions in Table 30. The Comparative Examples and Examples (Inventive Examples of the present invention) shown in Nos. 75 to 83 in Table 30 are cases where an EB remelted ingot was used as cast.

The Comparative Example of No. 75 is a case where material containing B was not added at the time of melting and resolidification. Cracks did not occur in the hot-rolled sheet, and cracks also did not occur in the bending test.

The Comparative Example of No. 77 is a case where the thickness ratio of the outer layers 3 and 4 was more than 40%. Cracks partially occurred in the hot-rolled sheet, and the crack occurrence rate was also high in the bending test.

The Examples (Inventive Examples of the present invention) of Nos. 78 to 83 are cases where the material containing B was changed between $TiB_2$ powder, Ti—B alloy chips, Ti—B alloy wire, Ti—B alloy thin film and Ti—B alloy mesh, respectively, and evaluated. In each case the thickness ratio of the outer layers 3 and 4 was within the range of 5 to 40% and the B concentration of the outer layers 3 and 4 was within the range of 0.1 to 3.0%, and therefore cracks did not occur in any of the hot-rolled sheets, and cracks also did not occur in the bending tests.

The Examples (Inventive Examples of the present invention) of Nos. 84 to 88 are cases where a plasma melted ingot was used as cast, and the material containing B was changed between $TiB_2$ powder, Ti—B alloy chips, Ti—B alloy wire, Ti—B alloy thin film and Ti—B alloy mesh, respectively, and evaluated. In each case the thickness ratio of the outer layers 3 and 4 was within the range of 5 to 40% and the B concentration of the outer layers 3 and 4 was within the range of 0.1 to 3.0%, and therefore cracks did not occur in any of the hot-rolled sheets, and cracks also did not occur in the bending tests.

The Examples (Inventive Examples of the present invention) of Nos. 89 to 93 are cases where an ER remelted ingot whose casting skin surface was subjected to cutting was used, and in which the material containing B was changed between $TiB_2$ powder, Ti—B alloy chips, Ti—B alloy wire, Ti—B alloy thin film and Ti—B alloy mesh, respectively, and evaluated. Note that, in the present examples, a melting and resolidification process was also conducted for the side faces in the longitudinal direction in a similar manner to the rolling surfaces. Because the thickness ratio of the outer layers 3 and 4 was within the range of 5 to 40% and the B concentration of the outer layers 3 and 4 was within the range of 0.1 to 3.0%, cracks did not occur in any of the hot-rolled sheets, and cracks also did not occur in the bending tests.

The Examples (Inventive Examples of the present invention) of Nos. 94 to 98 are cases where a plasma melted ingot whose casting skin surface was cut was used, and in which the material containing B was changed between TiB$_2$ powder, Ti—B alloy chips, Ti—B alloy wire, Ti—B alloy thin film and Ti—B alloy mesh, respectively, and evaluated. Note that, in the present examples, a melting and resolidification process was also conducted for the side faces in the longitudinal direction in a similar manner to the rolling surfaces. Because the thickness ratio of the outer layers 3 and 4 was within the range of 5 to 40% and the B concentration of the outer layers 3 and 4 was within the range of 0.1 to 3.0%, cracks did not occur in any of the hot-rolled sheets, and cracks also did not occur in the bending tests.

The Examples (Inventive Examples of the present invention) of Nos. 99 to 101 are cases in which various kinds of ingots which had been bloomed and whose surfaces were thereafter cut were used, and at the time of melting and resolidification, TiB$_2$ powder was used as material containing B. Because the thickness ratio of the outer layers 3 and 4 was within the range of 5 to 40% and the 13 concentration of the outer layers 3 and 4 was within the range of 0.1 to 3.0%, cracks did not occur in any of the hot-rolled sheets, and cracks also did not occur in the bending tests.

The Examples (Inventive Examples of the present invention) of Nos. 102 to 104 are cases in which various kinds of ingots which had been forged and whose surfaces were thereafter cut were used, and at the time of melting and resolidification, TiB$_2$ powder was used as material containing B. Because the thickness ratio of the outer layers 3 and 4 was within the range of 5 to 40% and the 13 concentration of the outer layers 3 and 4 was within the range of 0.1 to 3.0%, cracks did not occur in any of the hot-rolled sheets, and cracks also did not occur in the bending tests.

Further, in the Inventive Examples of the present invention, when the alloy used for the inner part 5 was subjected in advance to a tensile test with a JIS 13B test specimen having a thickness of 1.5 mm, it was found that the 0.2% yield stress was no more than 1000 MPa.

Further, for each of the Examples (Inventive Examples of the present invention) of Nos. 78 to 104, the neutron shielding effect was 1 or more, and thus a neutron shielding effect could be confirmed. Note that, the neutron shielding effect of a stainless steel sheet (4 mm thick) to which a B amount of 0.5% by mass is added that is used in a nuclear fuel storage rack is 23.7, and in the Examples of Nos. 86, 93, 106 and 108 a neutron shielding effect that was higher than the neutron shielding effect of the aforementioned stainless steel sheet was obtained.

Example 5-5

Neutron shielding sheets 1 and 2 shown as Examples (Inventive Examples of the present invention) in Table 31 were produced by the following method.

TABLE 31

| No. | Ingot Type | Type | Production History | Element Addition Method | Outer layer Layer Structure | Outer layer Thickness (μm) | Outer layer Thickness Ratio Per Side (%) |
|---|---|---|---|---|---|---|---|
| 106 | EB ReMelted Ingot | Pure Titanium JIS Class 1 | As Cast | — | — | — | — |
| 107 | EB ReMelted Ingot | Pure Titanium JIS Class 1 | As Cast | TiB$_2$ Powder | Three Layers | 9000 | 45 |
| 108 | EB ReMelted Ingot | Pure Titanium JIS Class 1 | As Cast | TiB$_2$ Powder | Two layers | 1000 | 5 |
| 109 | EB ReMelted Ingot | Pure Titanium JIS Class 2 | As Cast | Ti—B Alloy Chips | Two Layers | 8000 | 40 |
| 110 | EB ReMelted Ingot | Pure Titanium JIS Class 3 | As Cast | Ti—B Alloy Wire | Three Layers | 4000 | 20 |
| 111 | EB ReMelted Ingot | Pure Titanium JIS Class 2 | As Cast | Ti—B Alloy Thin film | Two Layers | 2000 | 10 |
| 112 | EB ReMelted Ingot | Pure Titanium JIS Class 3 | As Cast | Ti—B Alloy Mesh | Two Layers | 6000 | 30 |
| 113 | Plasma Melted Ingot | Pure Titanium JIS Class 1 | As Cast | TiB$_2$ Powder | Three Layers | 1000 | 5 |
| 114 | Plasma Melted Ingot | Pure Titanium JIS Class 2 | As Cast | Ti—B Alloy Chips | Two Layers | 2000 | 10 |
| 115 | Plasma Melted Ingot | Pure Titanium JIS Class 3 | As Cast | Ti—B Alloy Wire | Three Layers | 8000 | 30 |
| 116 | Plasma Melted Ingot | Pure Titanium JIS Class 1 | As Cast | Ti—B Alloy Thin film | Two Layers | 4000 | 20 |
| 117 | Plasma Melted Ingot | Pure Titanium JIS Class 2 | As Cast | Ti—B Alloy Mesh | Two Layers | 8000 | 40 |
| 118 | EB ReMelted Ingot | Pure Titanium JIS Class 1 | Cut After Casting | TiB$_2$ Powder | Three Layers | 1000 | 5 |
| 119 | Plasma Melted Ingot | Pure Titanium JIS Class 2 | Cut After Casting | TiB$_2$ Powder | Three Layers | 6000 | 40 |
| 120 | VAR Melted Ingot | Pure Titanium JIS Class 1 | Cut After Blooming | TiB$_2$ Powder | Two Layers | 2000 | 10 |
| 121 | EB ReMelted Ingot | Pure Titanium JIS Class 3 | Cut After Blooming | TiB$_2$ Powder | Two Layers | 4000 | 20 |
| 122 | Plasma Melted Ingot | Pure Titanium JIS Class 2 | Cut After Blooming | TiB$_2$ Powder | Three Layers | 6000 | 30 |
| 123 | VAR Melted Ingot | Pure Titanium JIS Class 3 | Cut After Forging | TiB$_2$ Powder | Two Layers | 6000 | 30 |
| 124 | EB ReMelted Ingot | Pure Titanium JIS Class 2 | Cut After Forging | TiB$_2$ Powder | Three Layers | 2000 | 10 |
| 125 | Plasma Melted Ingot | Pure Titanium JIS Class 1 | Cut After Forging | TiB$_2$ Powder | Three Layers | 4000 | 20 |

| No. | Outer Layer B content (mass %) | Intermediate Layar Thickness (μm) | Crack Evaluation of Titanium Composite Material 1 | Crack Occurrence Rate During Bending Test (%) | Neutron Shielding Effect | Remarks |
|---|---|---|---|---|---|---|
| 106 | — | — | No Cracks | 0 | 1.0 | Comparative Example |
| 107 | 1.5 | 3.0 | Partial Crack Occurrence | 65 | — | Comparative Example |
| 108 | 1.8 | 1.0 | No Cracks | 0 | 2.7 | Example |
| 109 | 2.3 | 1.0 | No Cracks | 0 | 17.6 | Example |
| 110 | 2.1 | 3.0 | No Cracks | 0 | 16.9 | Example |
| 111 | 1.8 | 1.0 | No Cracks | 0 | 4.6 | Example |
| 112 | 0.7 | 3.0 | No Cracks | 0 | 8.2 | Example |
| 113 | 2.7 | 3.0 | No Cracks | 0 | 5.9 | Example |
| 114 | 1.0 | 2.0 | No Cracks | 0 | 3.5 | Example |
| 115 | 0.5 | 1.0 | No Cracks | 0 | 14.0 | Example |

TABLE 31-continued

| | | | | | | | |
|---|---|---|---|---|---|---|---|
| 116 | 1.0 | 3.0 | No Cracks | 0 | 9.0 | Example |
| 117 | 0.9 | 1.0 | No Cracks | 0 | 12.2 | Example |
| 118 | 3.0 | 1.0 | No Cracks | 0 | 8.2 | Example |
| 119 | 2.7 | 3.0 | No Cracks | 0 | 16.7 | Example |
| 120 | 1.4 | 1.0 | No Cracks | 0 | 4.3 | Example |
| 121 | 1.1 | 3.0 | No Cracks | 0 | 6.9 | Example |
| 122 | 0.1 | 3.0 | No Cracks | 0 | 10.3 | Example |
| 123 | 2.2 | 2.0 | No Cracks | 0 | 13.3 | Example |
| 124 | 2.8 | 3.0 | No Cracks | 0 | 11.0 | Example |
| 125 | 1.4 | 2.0 | No Cracks | 0 | 14.3 | Example |

Note that, although elements originating from the slab (base metal) were contained in the surface layer portion, only the contents of elements which were not contained in the slab are shown in the table.

By the same procedure as in Example 5-4, the titanium slabs that were melted and resolidified were heated to 800° C. for 240 minutes and thereafter subjected to hot rolling using steel manufacture facilities to thereby produce band-shaped coils having a thickness of approximately 20 mm. The band-shaped coils after hot rolling were allowed to pass through a continuous pickling line containing nitric hydrofluoric acid to perform descaling, and thereafter visual observation was performed to check the state of occurrence of cracks.

The method for measuring the depth of the outer layers 3 and 4. (B-concentrated layers) involved cutting out specimens from the hot-rolled sheet after pickling (extracting specimens from a central portion in the width direction at each of three locations, namely, the front end, center and rear end in the longitudinal direction) and polishing the specimens, and then subjecting the specimens to SEM/EDS analysis to determine the ratio of the outer layers 3 and 4 (B-concentrated layers) with respect to the sheet thickness and also determine the B concentration of the outer layers 3 and 4. (B-concentrated layers) (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×20 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 as a control test specimen and the test specimen, and the neutron shielding effect was evaluated based on the ratio between the measured values (the value for each test specimen is described for a case where the neutron shielding effect of commercially pure titanium of JIS Class 1 is taken as "1").

The results are shown collectively together with the test conditions in Table 31.

The Comparative Examples and Examples (Inventive Examples of the present invention) shown in Nos. 105 to 112 in Table 31 are cases where an EB remelted ingot was used as cast.

The Comparative Example of No. 105 is a case where material containing B was not added at the time of melting and resolidification. Cracks did not occur in the hot-rolled sheet, and cracks also did not occur in the bending test.

The Comparative Example of No. 107 is a case where the thickness ratio of the outer layers 3 and 4 was more than 40%. Cracks partially occurred in the hot-rolled sheet, and the crack occurrence rate was also high in the bending test.

The Examples (Inventive Examples of the present invention) of Nos. 108 to 112 are cases where the material containing B was changed between $TiB_2$ powder, Ti—B alloy chips, Ti—B alloy wire, Ti—B alloy thin film and Ti—B alloy mesh, respectively, and evaluated. In each case the thickness ratio of the outer layers 3 and 4 was within the range of 5 to 40% and the B concentration of the outer layers 3 and 4 was within the range of 0.1 to 3.0%, and therefore cracks did not occur in any of the hot-rolled sheets, and cracks also did not occur in the bending tests.

The Examples (Inventive Examples of the present invention) of Nos. 113 to 117 are cases where a plasma melted ingot was used as cast, and the material containing B was changed between $TiB_2$ powder, Ti—B alloy chips, Ti—B alloy wire, Ti—B alloy thin film and Ti—B alloy mesh, respectively, and evaluated. In each case the thickness ratio of the outer layers 3 and 4 was within the range of 5 to 40% and the B concentration of the outer layers 3 and 4 was within the range of 0.1 to 3.0%, and therefore cracks did not occur in any of the hot-rolled sheets, and cracks also did not occur in the bending tests.

The Examples (Inventive Examples of the present invention) of Nos. 118 and 119 are cases where an EB remelted ingot or a plasma melted ingot whose casting skin surface was subjected to cutting was used, and in which $TiB_2$ powder was used as the material containing B at the time of melting and resolidifying. Because the thickness ratio of the outer layers 3 and 4 was within the range of 5 to 40% and the B concentration of the outer layers 3 and 4 was within the range of 0.1 to 3.0%, cracks did not occur in any of the hot-rolled sheets, and cracks also did not occur in the bending tests.

The Examples (Inventive Examples of the present invention) of Nos. 120 to 122 are cases in which various kinds of ingots which had been bloomed and whose surfaces were thereafter cut were used, and at the time of melting and resolidification, $TiB_2$ powder was used as material containing B. Because the thickness ratio of the outer layers 3 and 4 was within the range of 5 to 40% and the B concentration of the outer layers 3 and 4 was within the range of 0.1 to 3.0%, cracks did not occur in any of the hot-rolled sheets, and cracks also did not occur in the bending tests.

The Examples (Inventive Examples of the present invention) of Nos. 123 to 125 are cases in which various kinds of ingots which had been forged and whose surfaces were thereafter cut were used, and at the time of melting and resolidification, TiB$_2$ powder was used as material containing B. Because the thickness ratio of the outer layers 3 and 4 was within the range of 5 to 40% and the B concentration of the outer layers 3 and 4 was within the range of 0.1 to 3.0%, cracks did not occur in any of the hot-rolled sheets, and cracks also did not occur in the bending tests.

Further, for each of the Examples (Inventive Examples of the present invention) of Nos. 108 to 125, the neutron shielding effect was 1 or more, and thus a neutron shielding effect could be confirmed.

Example 5-6

Neutron shielding sheets 1 and 2 shown as respective Examples (Inventive Examples of the present invention) in Table 32 were produced by the following method.

through a continuous pickling line containing nitric hydrofluoric acid to perform descaling. In addition, cold rolling was performed to form titanium sheets having a thickness of 1 mm and, as an annealing treatment, a heat treatment of heating to 600 to 750° C. in vacuum or in an inert gas atmosphere and holding at that temperature for 240 minutes was performed. In a surface inspection process after annealing, the state of occurrence of cracks on the cold-rolled sheet was visually observed. Note that the method for measuring the depth of the outer layers 3 and 4 (B-concentrated layers) involved cutting out specimens from the cold-rolled sheet (extracting specimens from a central portion in the width direction at each of three locations, namely, the front end, center and rear end in the longitudinal direction) and polishing the specimens, and then subjecting the specimens to SEM/EDS analysis to determine the ratio of the outer layers

TABLE 32

| No. | Ingot Type | Type | Production History | Element Addition Method | Outer Layer Layer Structure | Outer Layer Thickness (μm) | Outer Layer Thickness Ratio Per Side (%) |
|---|---|---|---|---|---|---|---|
| 126 | EB ReMelted Ingot | Pure Titanium JIS Class 1 | As Cast | — | — | — | — |
| 128 | EB ReMelted Ingot | Pure Titanium JIS Class 1 | As Cast | TiB$_2$ Powder | Three Layers | 2250 | 45 |
| 129 | EB ReMelted Ingot | Pure Titanium JIS Class 1 | As Cast | TiB$_2$ Powder | Two Layers | 2000 | 40 |
| 130 | EB ReMelted Ingot | Pure Titanium JIS Class 2 | As Cast | Ti—B Alloy Chips | Three Layers | 250 | 5 |
| 131 | EB ReMelted Ingot | Pure Titanium JIS Class 3 | As Cast | Ti—B Alloy Wire | Two Layers | 1000 | 20 |
| 132 | Plasma Melted Ingot | Pure Titanium JIS Class 1 | As Cast | TiB$_2$ Powder | Three Layers | 250 | 5 |
| 133 | Plasma Melted Ingot | Pure Titanium JIS Class 2 | As Cast | Ti—B Alloy Thin Film | Two Layers | 500 | 10 |
| 134 | Plasma Melted Ingot | Pure Titanium JIS Class 3 | As Cast | Ti—B Alloy Mesh | Three Layers | 2000 | 40 |
| 135 | EB ReMelted Ingot | Pure Titanium JIS Class 1 | Cut After Casting | TiB$_2$ Powder | Two Layers | 2000 | 40 |
| 136 | Plasma Melted Ingot | Pure Titanium JIS Class 2 | Cut After Casting | TiB$_2$ Powder | Three Layers | 250 | 5 |
| 137 | VAR Melted Ingot | Pure Titanium JIS Class 1 | Cut After Blooming | TiB$_2$ Powder | Two Layers | 500 | 10 |
| 138 | EB ReMelted Ingot | Pure Titanium JIS Class 3 | Cut After Blooming | TiB$_2$ Powder | Three Layers | 1000 | 20 |
| 139 | Plasma Melted Ingot | Pure Titanium JIS Class 2 | Cut After Blooming | TiB$_2$ Powder | Two Layers | 2000 | 40 |
| 140 | VVAR Melted Ingot | Pure Titanium JIS Class 3 | Cut After Forging | TiB$_2$ Powder | Three Layers | 250 | 5 |
| 141 | EB ReMelted Ingot | Pure Titanium JIS Class 2 | Cut After Forging | TiB$_2$ Powder | Two Layers | 1000 | 20 |
| 142 | Plasma Melted Ingot | Pure Titanium JIS Class 1 | Cut After Forging | TiB$_2$ Powder | Three Layers | 2000 | 40 |

| No. | Outer Layer B content (mass %) | Intermediate Layer Thickness (μm) | Crack Evaluation of Titanium Composite Material 1 | Crack Occurrence Rate During Bending Test (%) | Neutron Shielding Effect | Remarks |
|---|---|---|---|---|---|---|
| 126 | — | — | No Cracks | 0 | 1.0 | Comparative Example |
| 128 | 1.7 | 0.5 | Partial Crack Occurrence | 65 | — | Comparative Example |
| 129 | 1.2 | 3.0 | No Cracks | 0 | 13.5 | Example |
| 130 | 2.6 | 2.0 | No Cracks | 0 | 6.0 | Example |
| 131 | 0.3 | 1.0 | No Cracks | 0 | 4.3 | Example |
| 132 | 3.0 | 0.5 | No Cracks | 0 | 6.2 | Example |
| 133 | 2.4 | 1.0 | No Cracks | 0 | 5.5 | Example |
| 134 | 0.1 | 1.0 | No Cracks | 0 | 15.5 | Example |
| 135 | 2.1 | 2.0 | No Cracks | 0 | 18.8 | Example |
| 136 | 2.7 | 1.0 | No Cracks | 0 | 5.9 | Example |
| 137 | 1.6 | 2.0 | No Cracks | 0 | 4.3 | Example |
| 138 | 0.8 | 3.0 | No Cracks | 0 | 11.7 | Example |
| 139 | 2.5 | 1.0 | No Cracks | 0 | 17.8 | Example |
| 140 | 1.5 | 1.0 | No Cracks | 0 | 4.2 | Example |
| 141 | 0.5 | 2.0 | No Cracks | 0 | 5.1 | Example |
| 142 | 1.4 | 1.0 | No Cracks | 0 | 27.8 | Example |

Note that, although elements originating from the slab (base metal) were contained in the surface layer portion, only the contents of elements which were not contained in the slab are shown in the table.

By the same procedure as in Example 5-4, the titanium slabs that were melted and resolidified were heated to 800° C. for 240 minutes and thereafter subjected to hot rolling using steel manufacture facilities to thereby produce band-shaped coils having a thickness of approximately 5 mm. The band-shaped coils after hot rolling were allowed to pass 3 and 4 (B-concentrated layers) with respect to the sheet thickness and also determine the B concentration of the outer layers 3 and 4 (B-concentrated layers) (an average value among the observation locations was adopted).

Further, with respect to the front end, center and rear end as the three locations in the longitudinal direction, a total of 20 bending test specimens in the L-direction were extracted from a central portion in the width direction, and a bending test was performed in accordance with JIS Z 2248 (metallic materials bend test method). The test temperature was room temperature, a bending test at bending angles up to 120 degrees was performed using the three-point bending test, and the presence or absence of crack occurrence was evaluated to determine the crack occurrence rate.

Furthermore, to evaluate the neutron shielding effect, Am—Be (4.5 MeV) was used as a radiation source, and a test specimen having dimensions of 500 mm×500 mm×1 mm thickness was fixed at a position that was 200 mm from the radiation source. A detector was installed at a position that was 300 mm from the radiation source, a radiation equivalent with respect to a peak value of target energy was measured respectively for commercially pure titanium of JIS Class 1 (1 mm thick) as a control test specimen and the test specimen (1 mm thick), and the neutron shielding effect was evaluated based on the ratio between the measured values (the value for each test specimen is described for a case where the neutron shielding effect of commercially pure titanium of JIS Class 1 is taken as "1").

The results are shown collectively together with the test conditions in Table 32. The Comparative Examples and Examples (Inventive Examples of the present invention) shown in Nos. 126 to 131 in Table 32 are cases where an EB remelted ingot was used as cast.

The Comparative Example of No. 126 is a case where material containing B was not added at the time of melting and resolidification. Cracks did not occur in the cold-rolled sheet, and cracks also did not occur in the bending test.

The Comparative Example of No. 128 is a case where the thickness ratio of the outer layers 3 and 4 was more than 40%. Cracks partially occurred in the cold-rolled sheet, and the crack occurrence rate was also high in the bending test.

The Examples (Inventive Examples of the present invention) of Nos. 129 to 131 are cases where the material containing B was changed between $TiB_2$ powder, Ti—B alloy chips and Ti—B alloy wire, respectively, and evaluated. In each case the thickness ratio of the outer layers 3 and 4 was within the range of 5 to 40% and the 13 concentration of the outer layers 3 and 4 was within the range of 0.1 to 3.0%, and therefore cracks did not occur in any of the cold-rolled sheets, and cracks also did not occur in the bending tests.

The Examples (Inventive Examples of the present invention) of Nos. 132 to 134 are cases where a plasma melted ingot was used as cast, and the material containing B was changed between $TiB_2$ powder, Ti—B alloy thin film and Ti—B alloy mesh, respectively, and evaluated. In each case the thickness ratio of the outer layers 3 and 4 was within the range of 5 to 40% and the B concentration of the outer layers 3 and 4 was within the range of 0.1 to 3.0%, and therefore cracks did not occur in any of the cold-rolled sheets, and cracks also did not occur in the bending tests.

The Examples (Inventive Examples of the present invention) of Nos. 135 and 136 are cases where an EB remelted ingot or a plasma melted ingot whose casting skin surface was subjected to cutting was used, and in which $TiB_2$ powder was used as the material containing B at the time of melting and resolidifying. Because the thickness ratio of the outer layers 3 and 4 was within the range of 5 to 40% and the B concentration of the outer layers 3 and 4 was within the range of 0.1 to 3.0%, cracks did not occur in any of the cold-rolled sheets, and cracks also did not occur in the bending tests.

The Examples (Inventive Examples of the present invention) of Nos. 137 to 139 are cases in which various kinds of ingots which had been bloomed and whose surfaces were thereafter cut were used, and at the time of melting and resolidification, $TiB_2$ powder was used as material containing B. Because the thickness ratio of the outer layers 3 and 4 was within the range of 5 to 40% and the B concentration of the outer layers 3 and 4 was within the range of 0.1 to 3.0%, cracks did not occur in any of the cold-rolled sheets, and cracks also did not occur in the bending tests.

The Examples (Inventive Examples of the present invention) of Nos. 140 to 142 are cases in which various kinds of ingots which had been forged and whose surfaces were thereafter cut were used, and at the time of melting and resolidification, $TiB_2$ powder was used as material containing B. Because the thickness ratio of the outer layers 3 and 4 was within the range of 5 to 40% and the B concentration of the outer layers 3 and 4 was within the range of 0.1 to 3.0%, cracks did not occur in any of the cold-rolled sheets, and cracks also did not occur in the bending tests.

Further, for each of the Examples (Inventive Examples of the present invention) of Nos. 129 to 142, the neutron shielding effect was 1 or more, and thus a neutron shielding effect could be confirmed.

REFERENCE SIGNS LIST 1, 2 Titanium composite material according to the present invention
3, 4 Outer layer
5 Inner layer
6 Base metal (slab)
7, 8 Outer layer material (titanium sheet)
9 Weld zone

The invention claimed is:

1. A titanium composite material, comprising:
an inner layer comprising a commercially pure titanium or a titanium alloy;
an outer layer formed on at least one rolling surface of the inner layer, the outer layer having a chemical composition that is different from a chemical composition of the inner layer; and
an intermediate layer formed between the inner layer and the outer layer, the intermediate layer having a chemical composition that is different from the chemical composition of the inner layer, the intermediate layer satisfying the following formula;
wherein:
the outer layer has a thickness of 2 μm or more, and a proportion of the outer layer with respect to the overall thickness is no more than 40% per side; and
a thickness of the intermediate layer is 0.5 μm or more;
$0<C_{MID} \leq 0.8 \times C_{AVE}$, wherein for the above formula, $C_{MID}$ means an amount of increased content from the inner layer, $C_{AVE}$ means an average of the increased content in the outer layer, and the amount of increased content means: in the case of an element that is not contained in the inner layer, the content thereof, and in the case of an element that is contained in the inner layer, the amount of increase in the content thereof from the inner layer.

2. The titanium composite material according to claim 1, wherein a chemical composition of the outer layer is, by mass %:
platinum group elements: 0.01 to 0.25%,
rare earth element: 0 to 0.2%,
Co: 0 to 0.8%,
Ni: 0 to 0.6%, and
a balance: titanium and impurities.

3. The titanium composite material according to claim 2, wherein:
the platinum group elements are Pd and/or Ru.

4. The titanium composite material according to claim 2, wherein the chemical composition contains, by mass %:
rare earth element: 0.001 to 0.2%.

5. The titanium composite material according to claim 2, wherein the chemical composition contains, by mass %:
Co: 0.05 to 0.8%, and/or
Ni: 0.05 to 0.6%.

6. The titanium composite material according to claim 2, wherein a chemical composition of the commercially pure titanium is, by mass %:
C: 0.1% or less,
H: 0.015% or less,
O: 0.4% or less,
N: 0.07% or less,
Fe: 0.5% or less, and
a balance: Ti and impurities.

7. The titanium composite material according to claim 2, wherein:
another outer layer is formed on a face other than a rolling surface of the inner layer, and
the other outer layer has a same chemical composition as the outer layer.

8. The titanium composite material according to claim 3, wherein a chemical composition of the commercially pure titanium is, by mass %:
C: 0.1% or less,
H: 0.015% or less,
O: 0.4% or less,
N: 0.07% or less,
Fe: 0.5% or less, and
a balance: Ti and impurities.

9. The titanium composite material according to claim 4, wherein a chemical composition of the commercially pure titanium is, by mass %:
C: 0.1% or less,
H: 0.015% or less,
O: 0.4% or less,
N: 0.07% or less,
Fe: 0.5% or less, and
a balance: Ti and impurities.

10. The titanium composite material according to claim 5, wherein a chemical composition of the commercially pure titanium is, by mass %:
C: 0.1% or less,
H: 0.015% or less,
O: 0.4% or less,
N: 0.07% or less,
Fe: 0.5% or less, and
a balance: Ti and impurities.

* * * * *